United States Patent [19]
Feller

[11] Patent Number: 6,085,599
[45] Date of Patent: *Jul. 11, 2000

[54] MAGNETIC FLOW SENSOR

[76] Inventor: Murray F. Feller, Rt. 2, Box 562A, Micanopy, Fla. 32667

[*] Notice: This patent is subject to a terminal disclaimer.

[21] Appl. No.: 09/166,349

[22] Filed: Oct. 5, 1998

Related U.S. Application Data

[63] Continuation-in-part of application No. 08/975,771, Nov. 21, 1997, abandoned, which is a continuation-in-part of application No. 08/681,765, Jul. 29, 1996, Pat. No. 5,691,484, which is a continuation-in-part of application No. 08/429,534, Apr. 26, 1995, abandoned.

[51] Int. Cl.$^7$ ........................................................ G01F 1/58
[52] U.S. Cl. ........................................ 73/861.13; 73/861.15
[58] Field of Search ........................... 73/861.11, 861.12, 73/861.13, 861.14, 861.15

[56] References Cited

U.S. PATENT DOCUMENTS

| | | |
|---|---|---|
| 3,696,674 | 10/1972 | Spencer . |
| 3,777,561 | 12/1973 | Lewis . |
| 3,802,262 | 4/1974 | Banks . |
| 3,897,684 | 8/1975 | Dewan . |
| 3,903,741 | 9/1975 | Greene . |
| 3,967,500 | 7/1976 | Forster . |
| 4,195,515 | 4/1980 | Smoll . |
| 4,346,605 | 8/1982 | Skladzien et al. . |
| 4,409,846 | 10/1983 | Ueno . |
| 4,488,438 | 12/1984 | Tomita ................................ 73/861.12 |
| 4,601,209 | 7/1986 | Amata ................................. 73/861.17 |
| 4,727,755 | 3/1988 | Schmoock ........................... 73/861.12 |
| 4,825,703 | 5/1989 | Kubota . |
| 5,691,484 | 11/1997 | Feller . |
| 5,935,077 | 8/1999 | Ogle ........................................ 600/504 |

FOREIGN PATENT DOCUMENTS

| | | |
|---|---|---|
| 0 069 456 A1 | 1/1983 | European Pat. Off. . |
| 1 231 447 | 12/1966 | Germany . |
| 1 648 143 | 3/1971 | Germany . |
| 30 00 965 A1 | 1/1980 | Germany . |
| 33 29 899 A1 | 8/1983 | Germany . |
| 37 00 165 A1 | 1/1987 | Germany . |
| 2-280012 | 11/1990 | Japan . |

*Primary Examiner*—Max Noori
*Attorney, Agent, or Firm*—Harness Dickey & Pierce P.L.C.

[57] ABSTRACT

Sensors for measuring the flow rate of fluids flowing through or around a chamber. The chamber is formed using electrically insulating material through which there is an orthogonal alternating magnetic field provided by a mechanically repositioned permanent magnet and at least a pair of electrodes in line with and orthogonal to the magnetic field. This provides an electrical potential with a magnitude proportional to flow rate. The alternating magnetic field may also be provided by a stationary multiple electromagnet. Various embodiments are disclosed which make use of electromagnetics, stepper motors and other modifications for adapting the flow sensor to a wide variety of applications and environmental conditions.

56 Claims, 29 Drawing Sheets

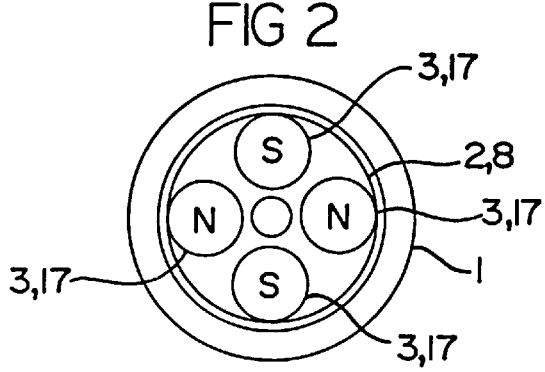
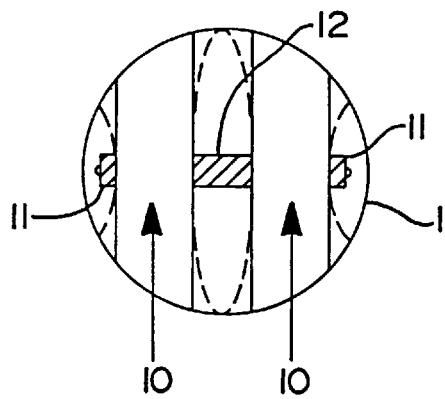
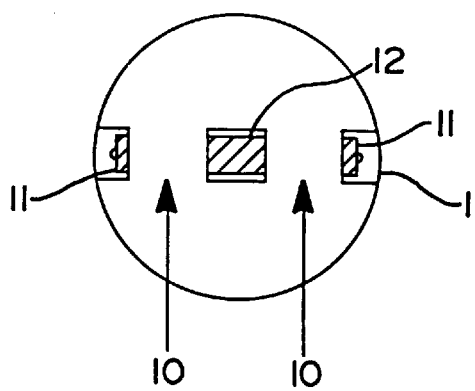
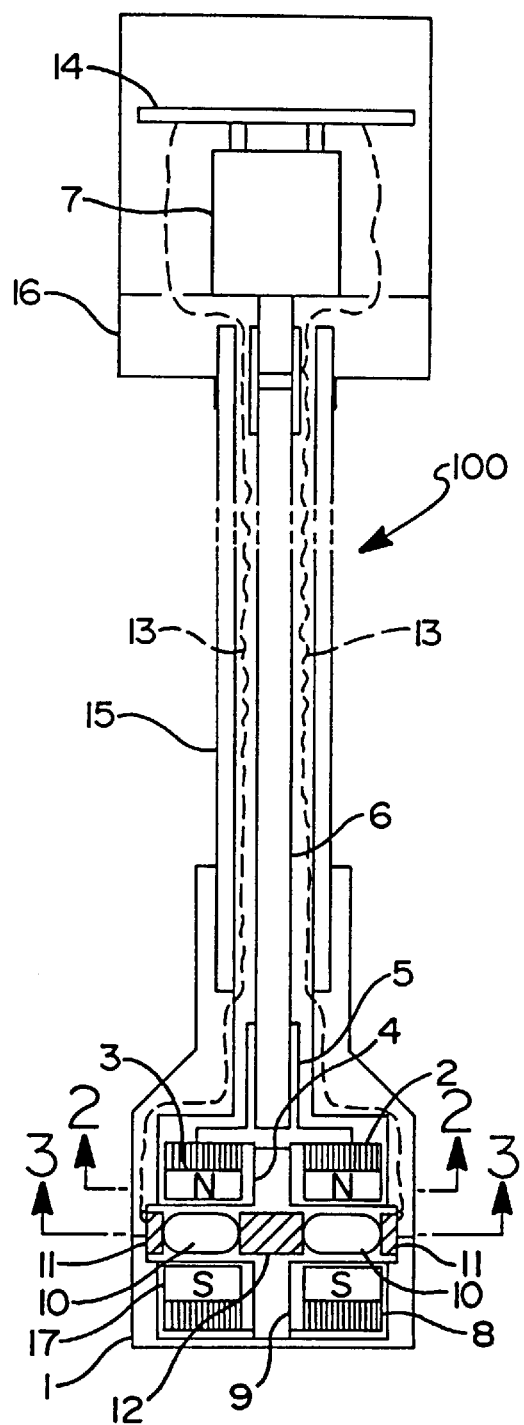

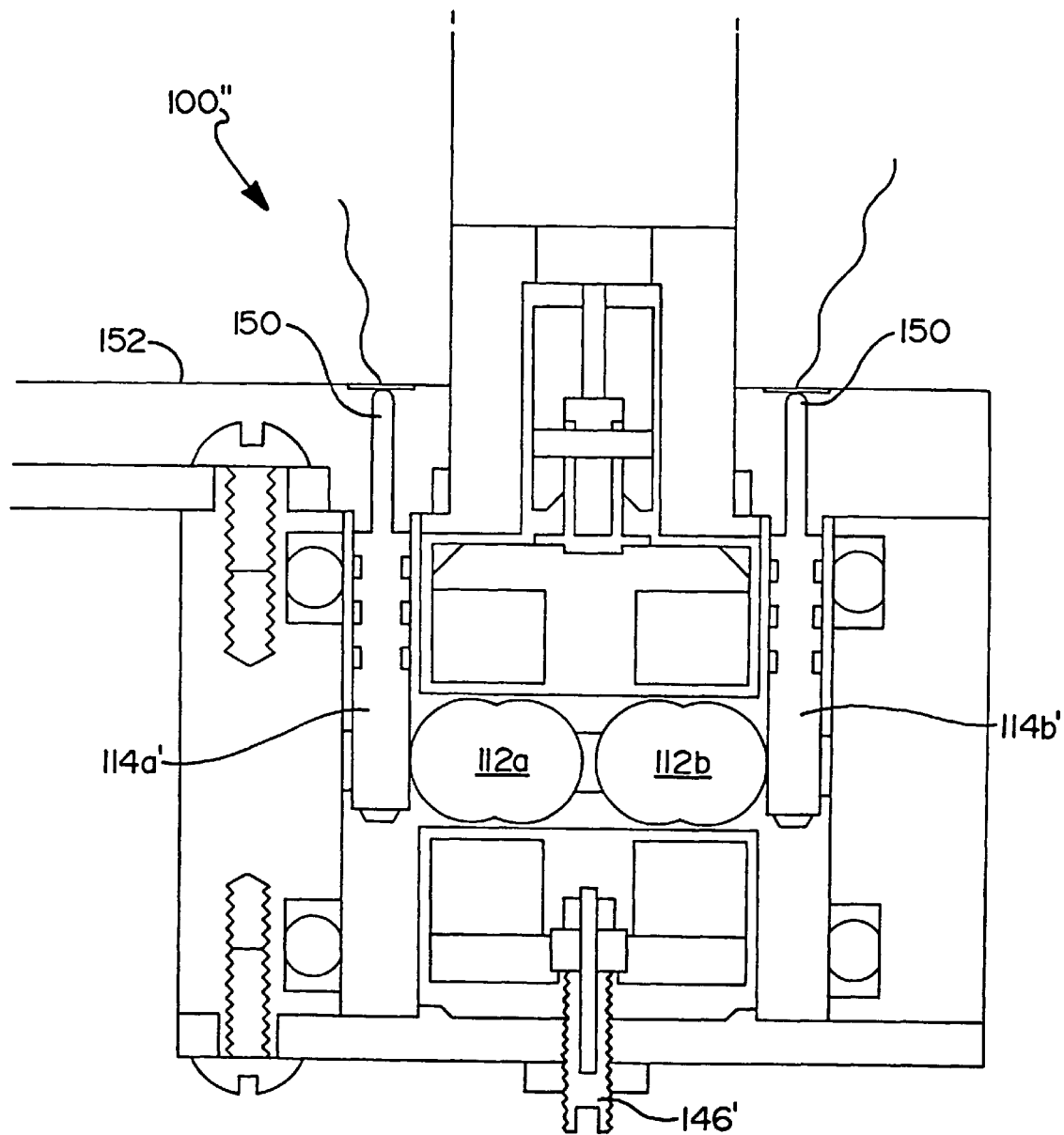

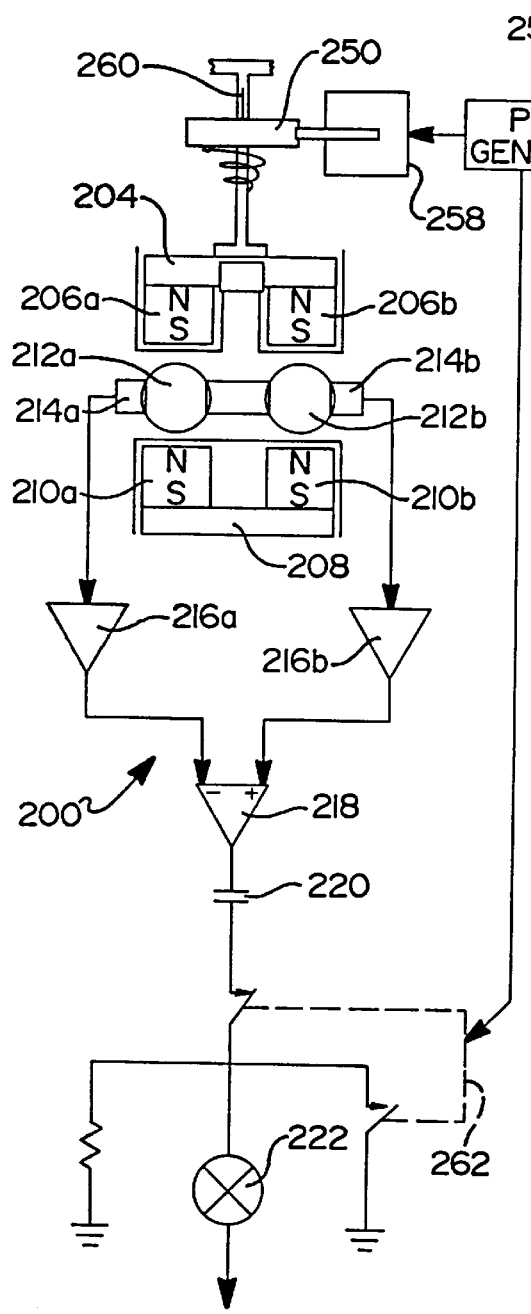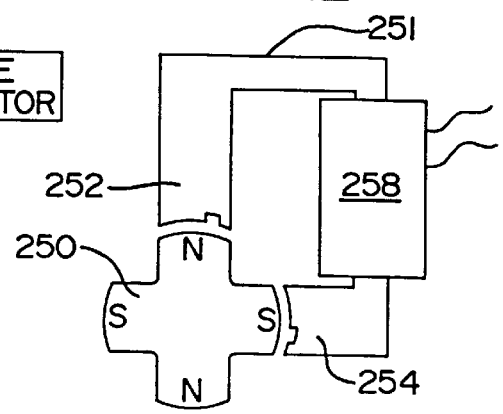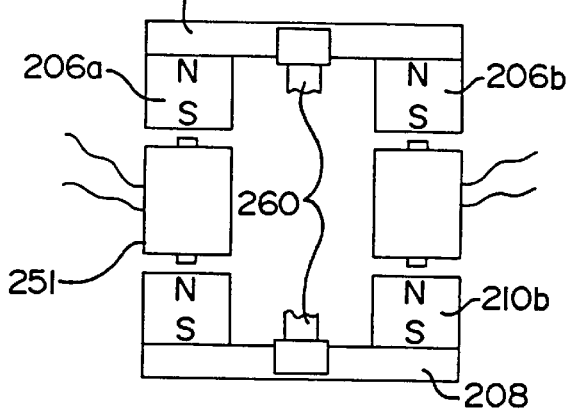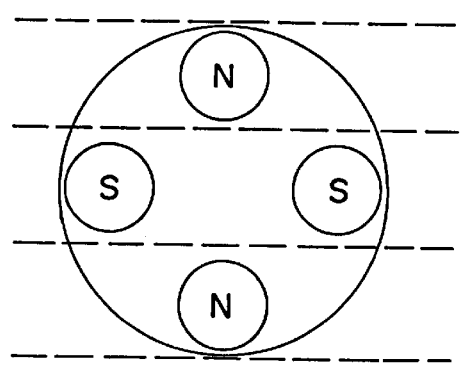

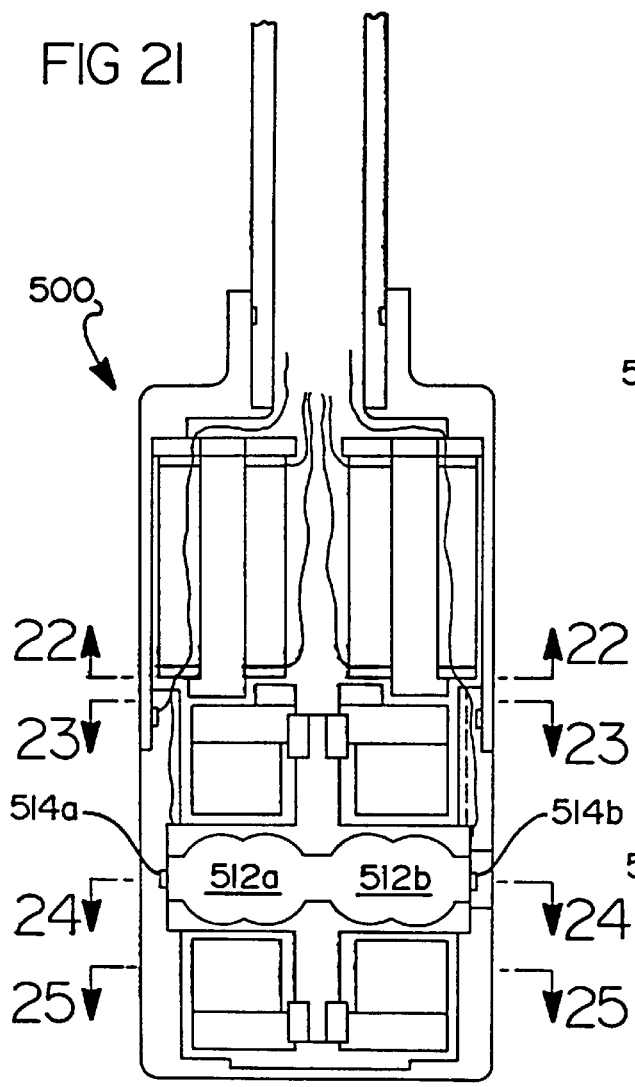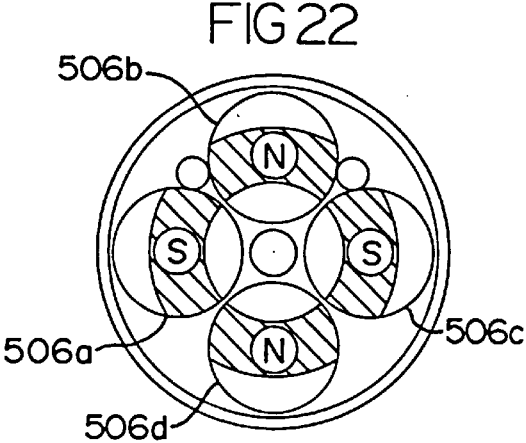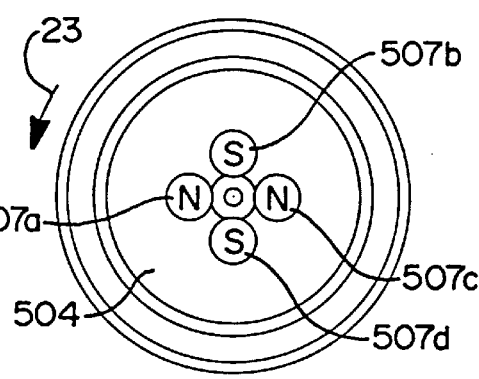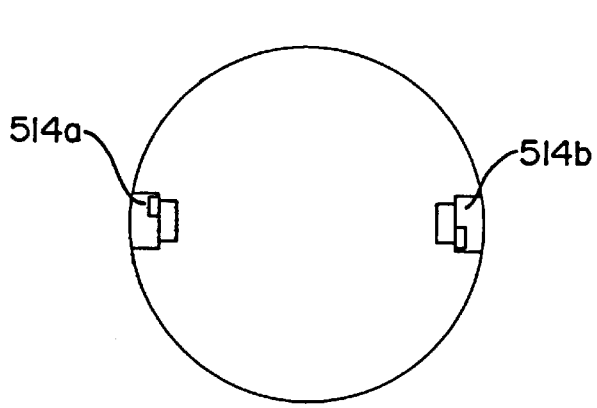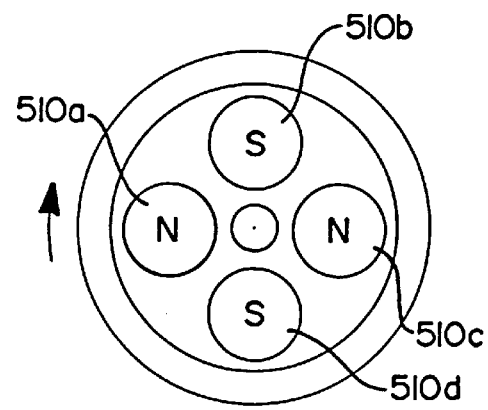

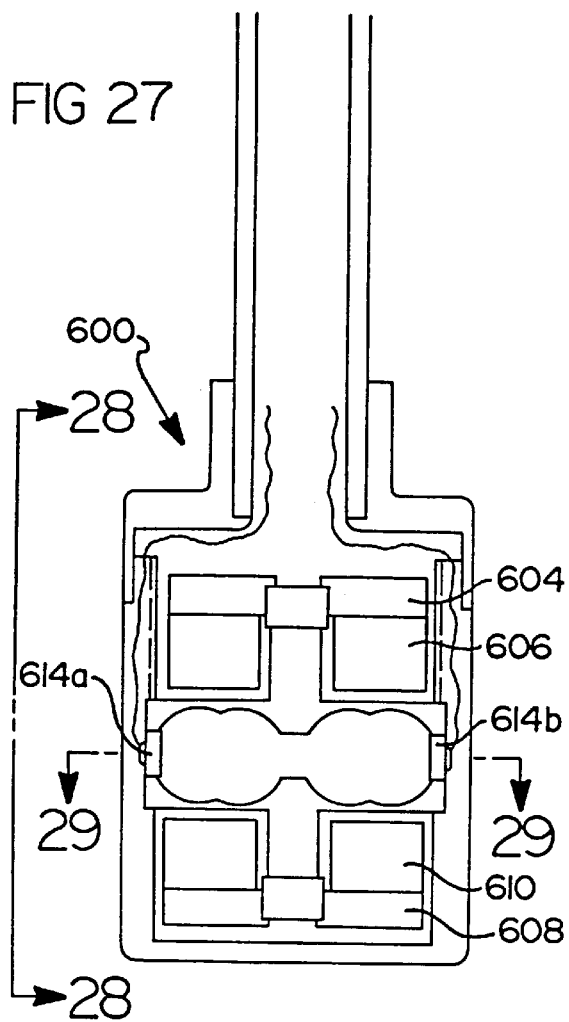
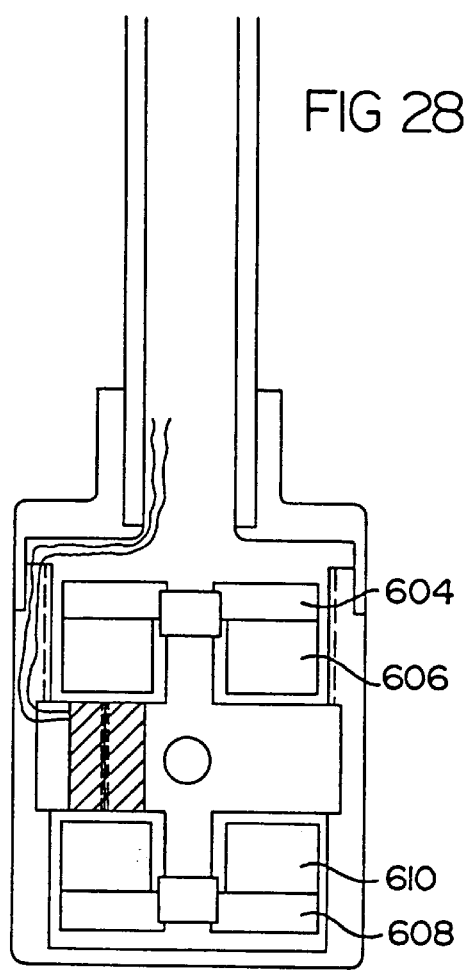
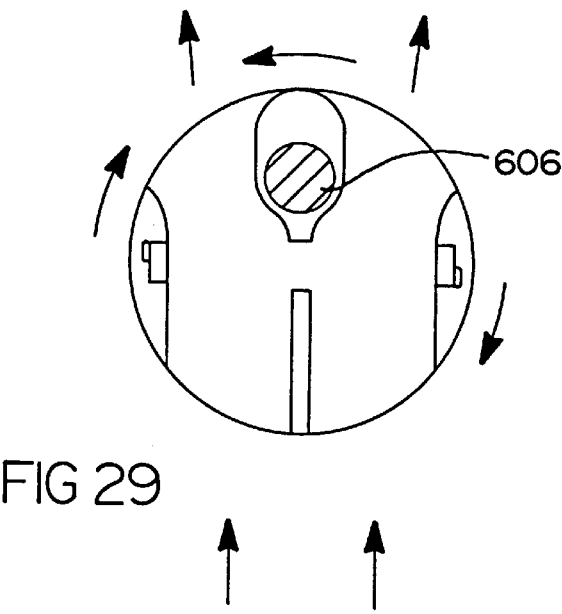

FIG 30
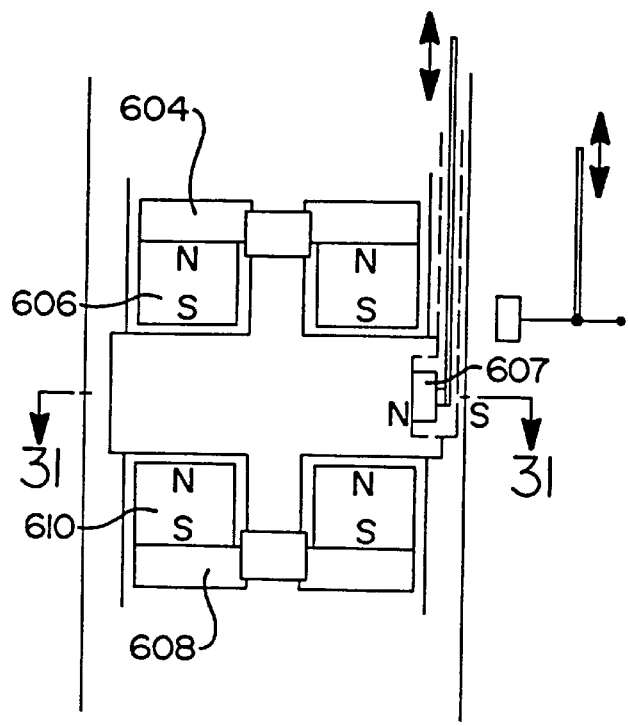
FIG 31
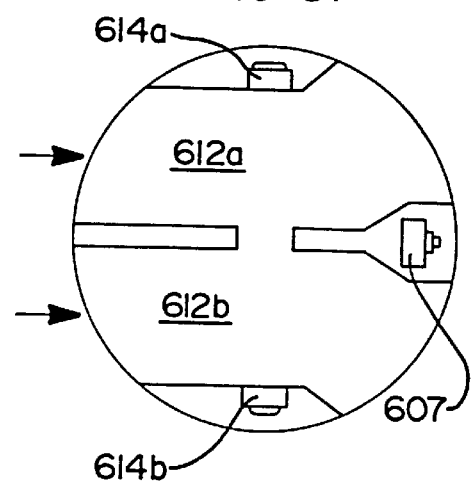
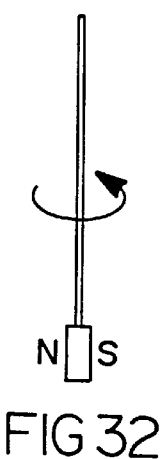
FIG 32
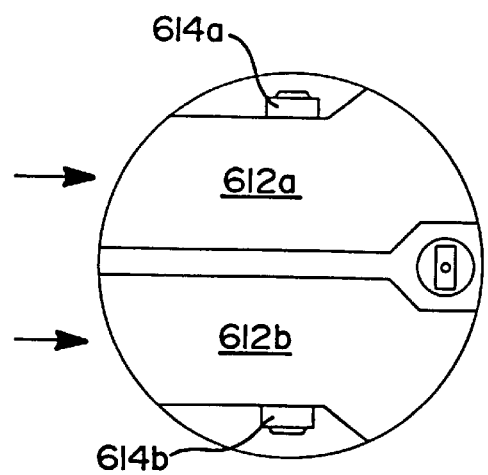
FIG 33

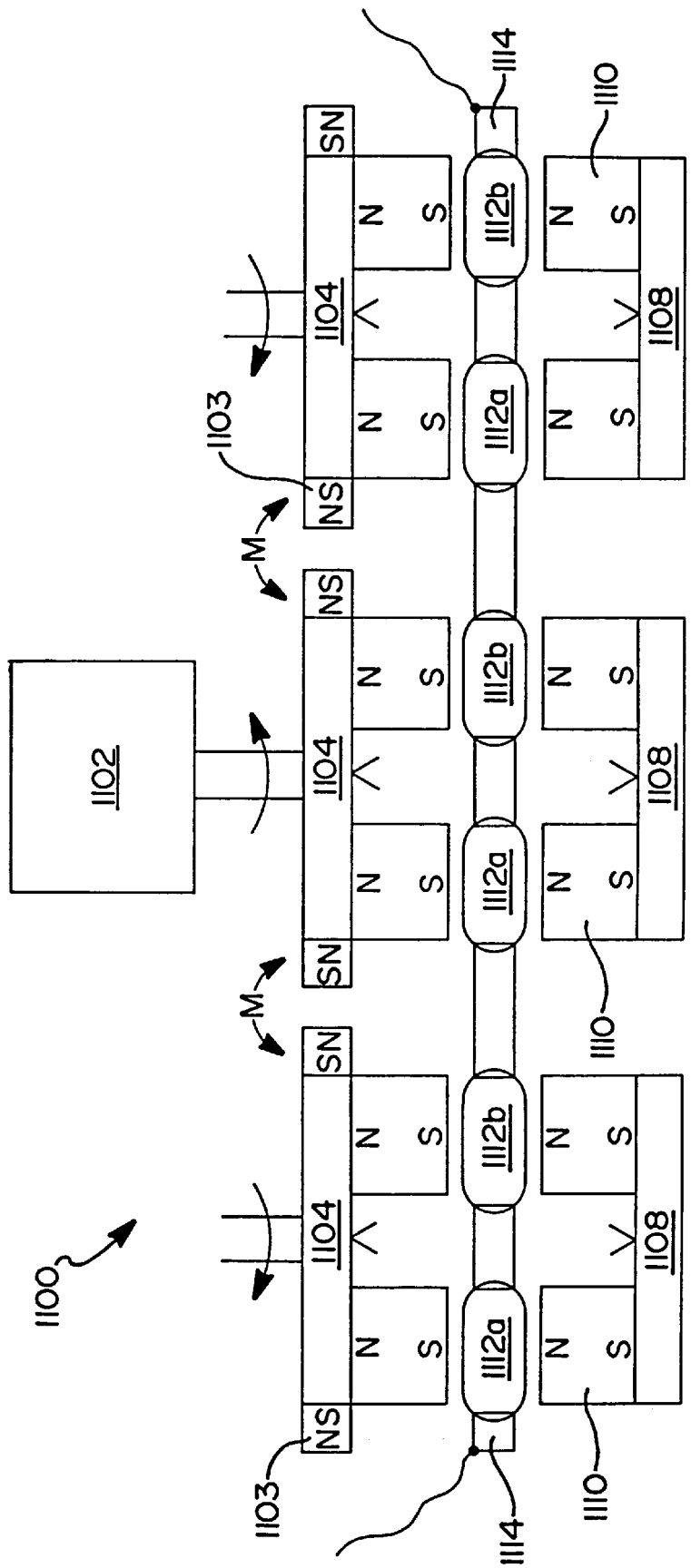

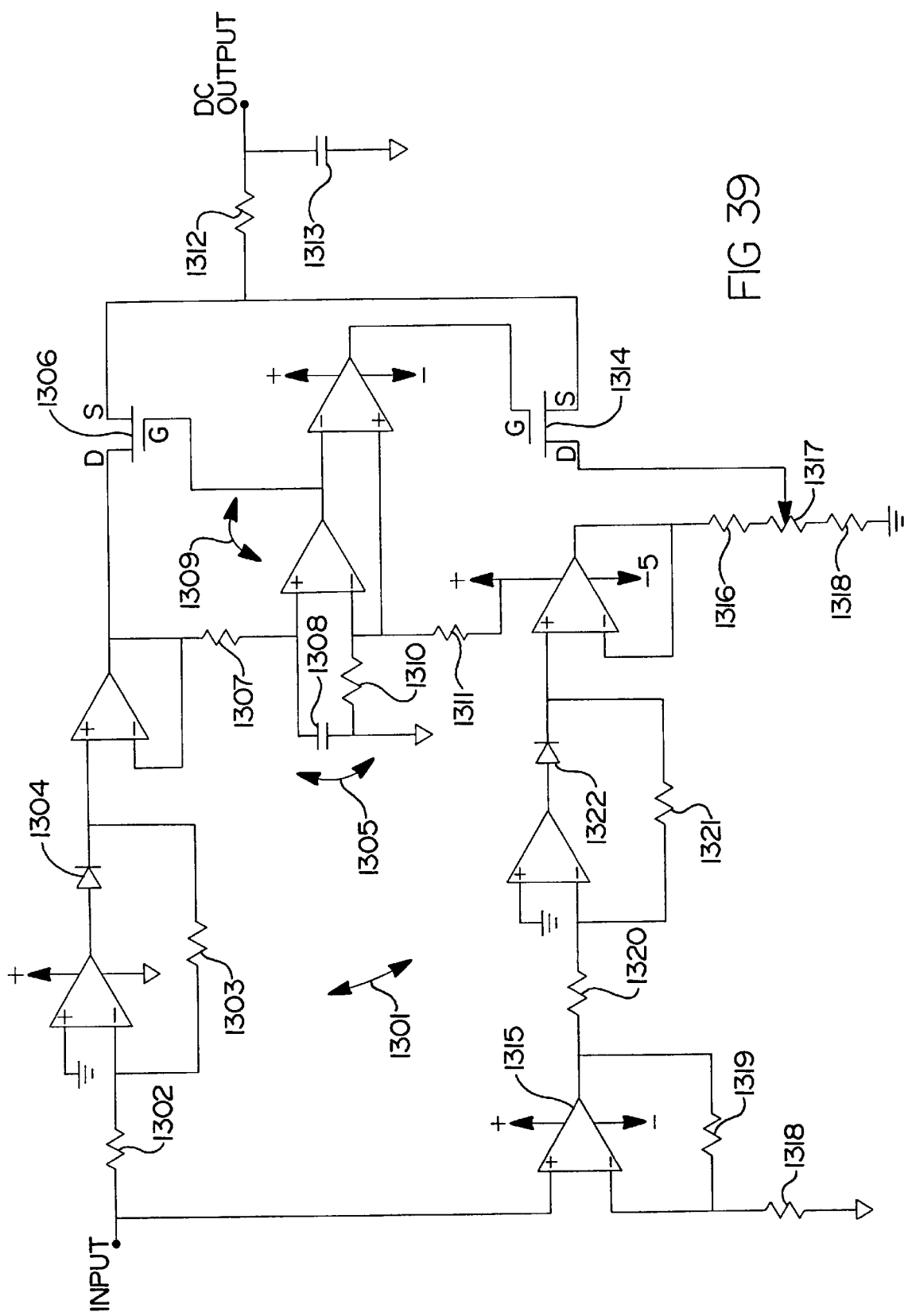

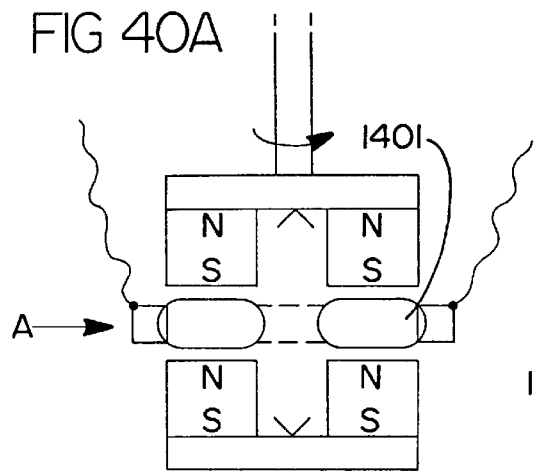
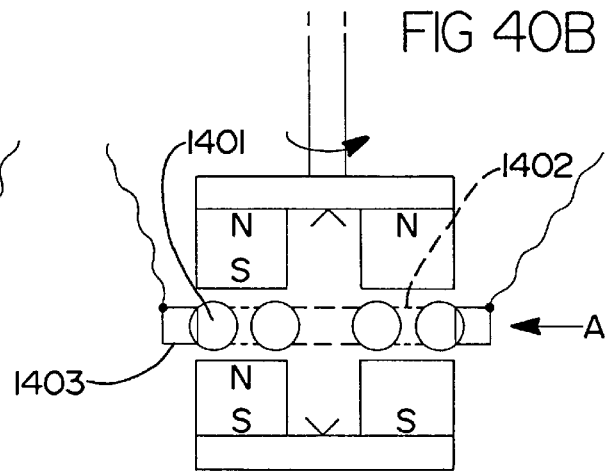
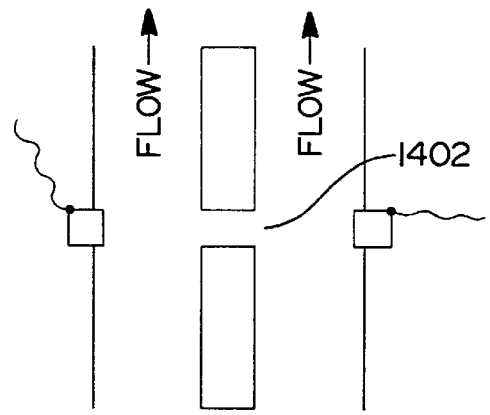
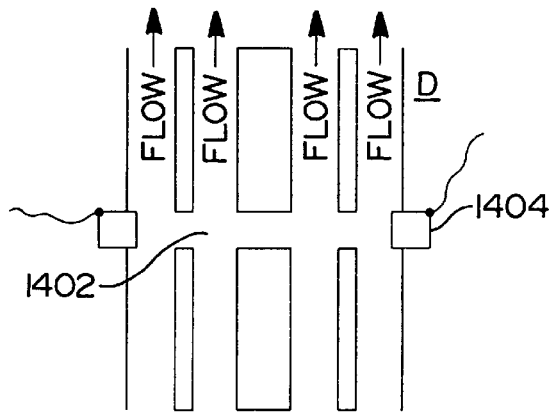

FIG 44A
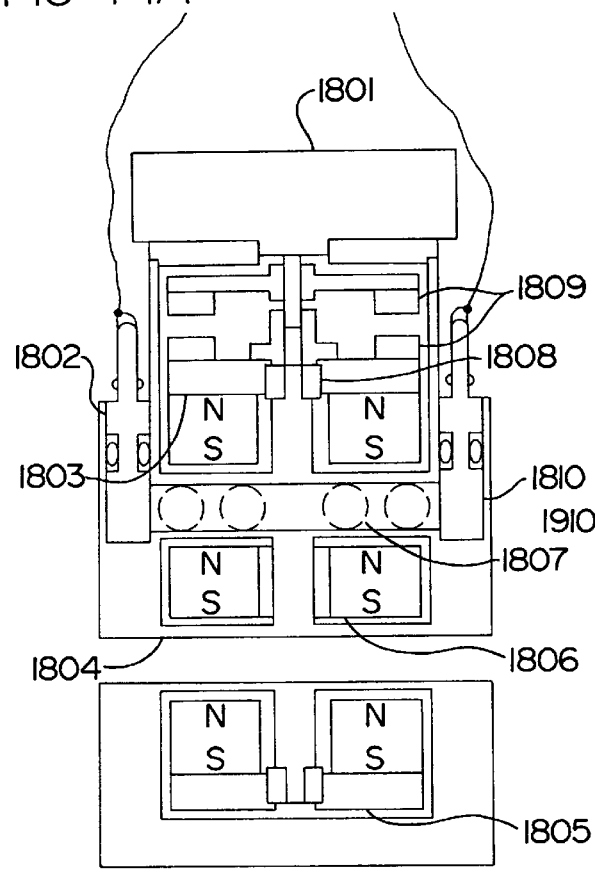
FIG 45A
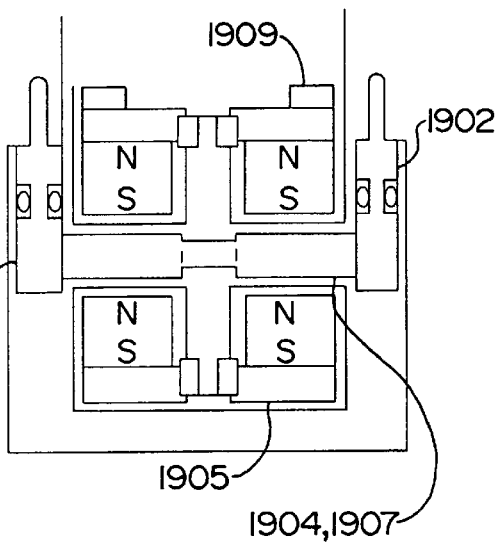
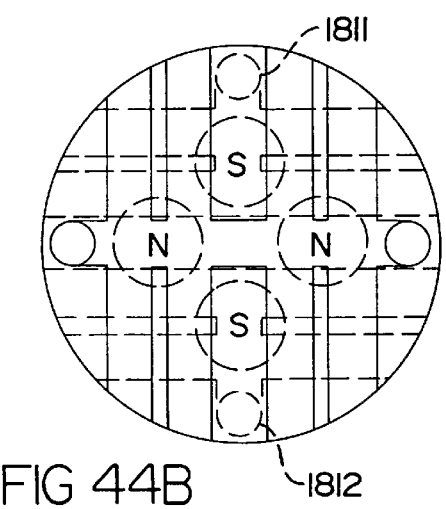
FIG 44B
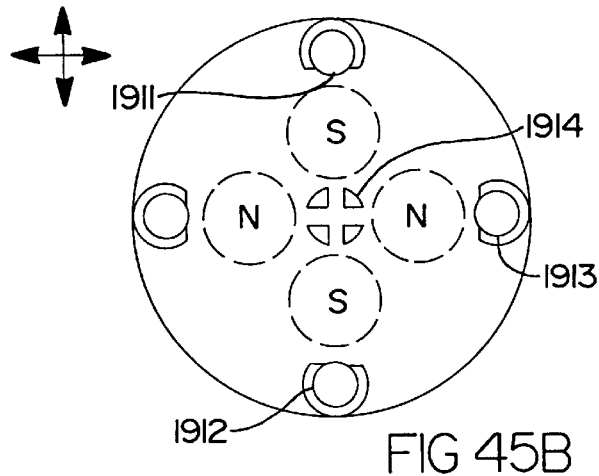
FIG 45B

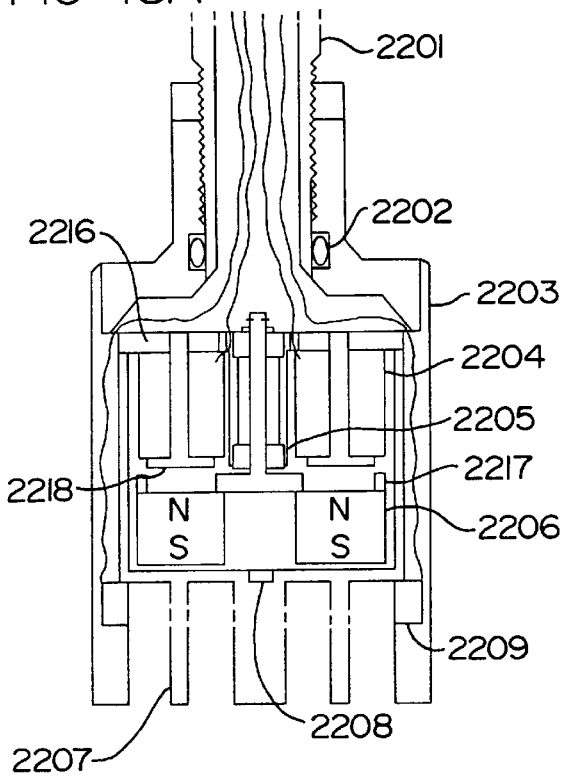
FIG 48A
FIG 48B
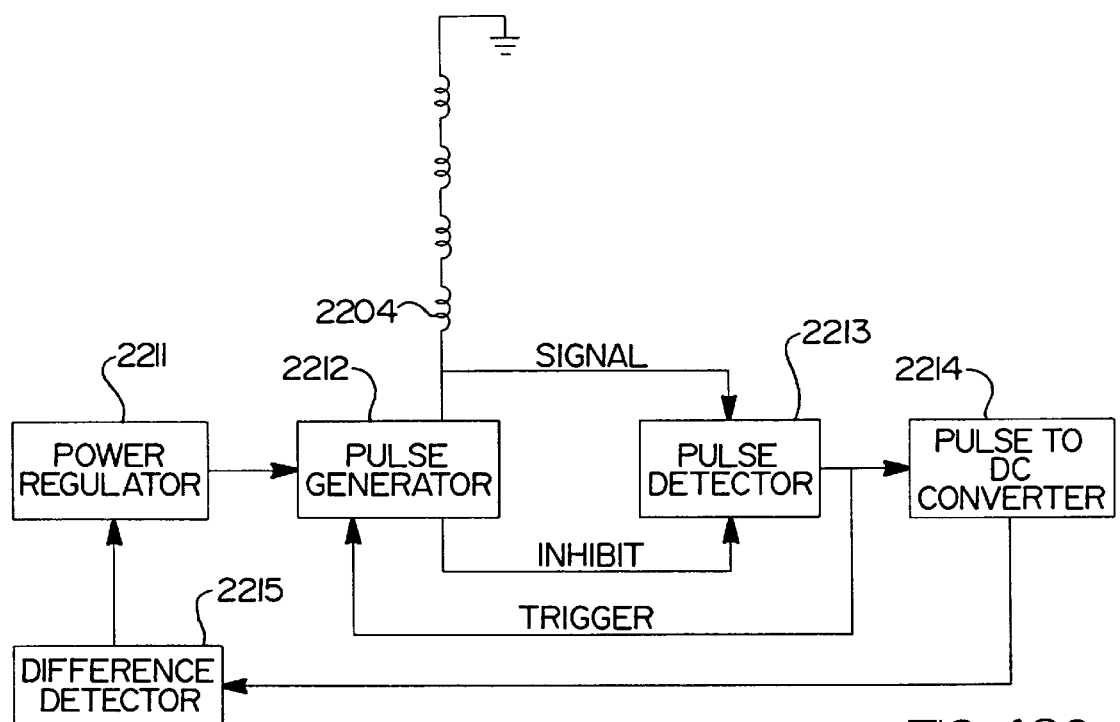
FIG 48C

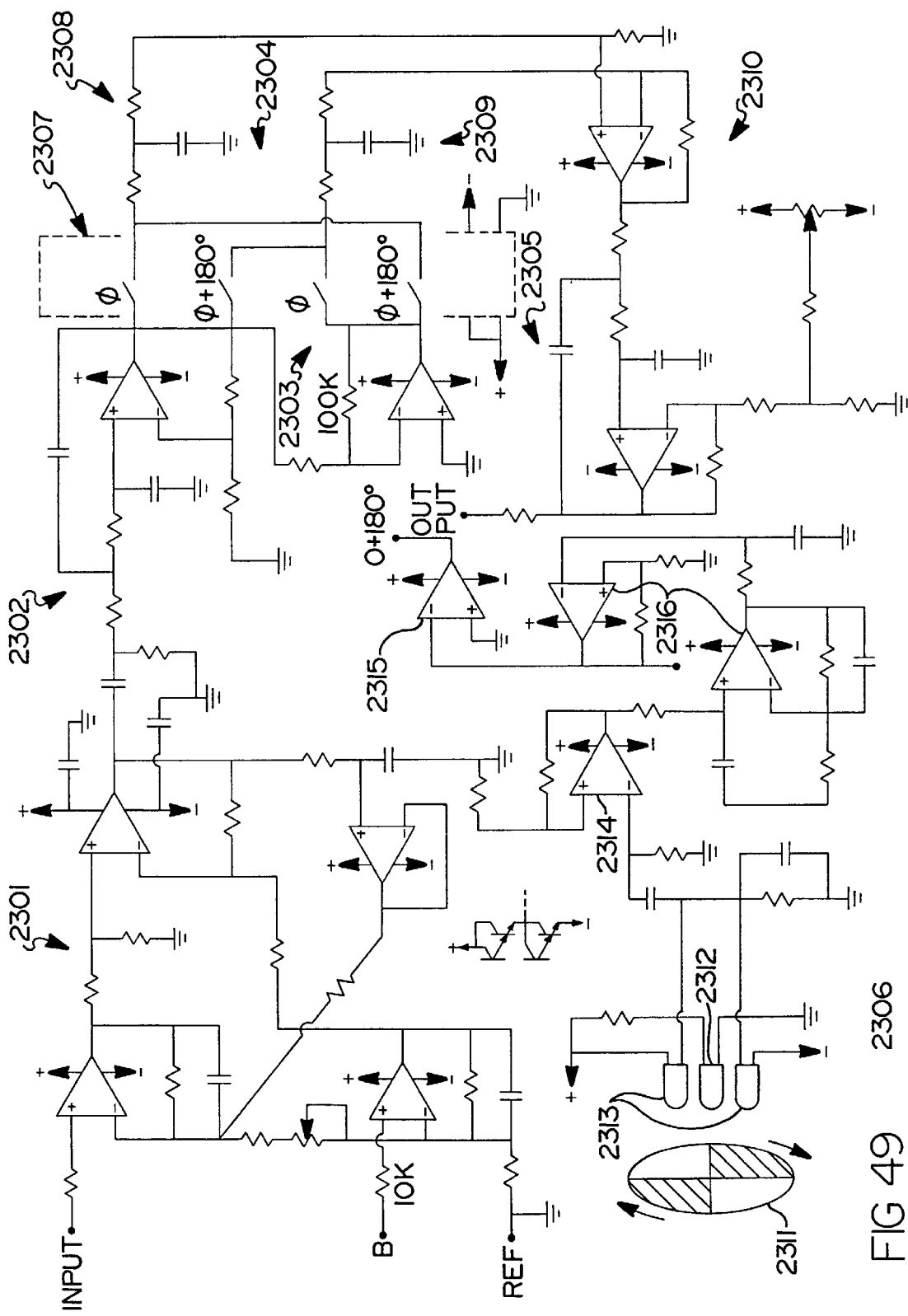

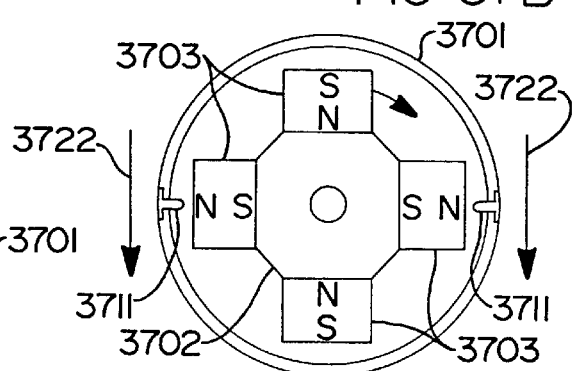
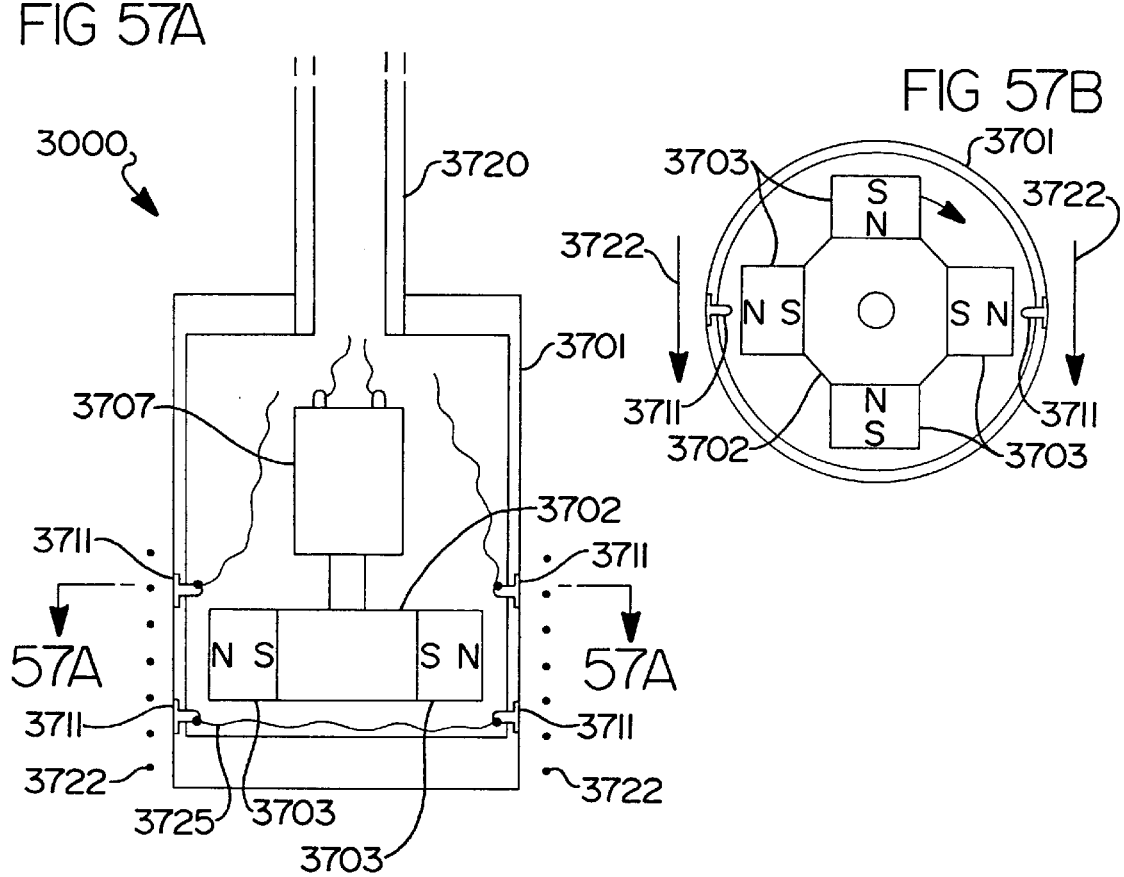
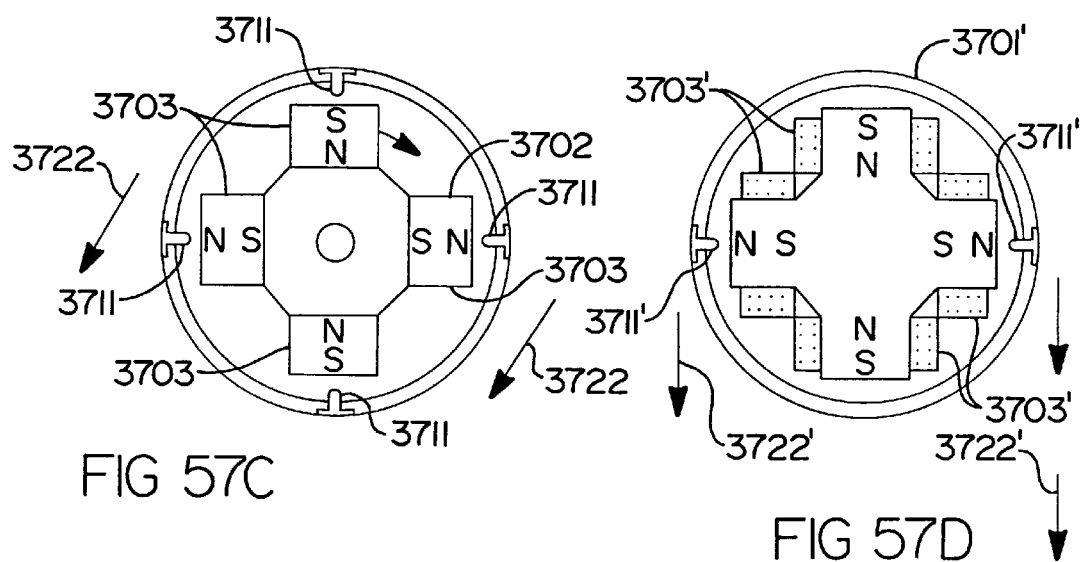

MAGNETIC FLOW SENSOR

CROSS REFERENCE TO RELATED APPLICATION

This is a continuation-in-part of U.S. Pat. application Ser. No. 08/975,771, filed Nov. 21, 1997, now abandoned, which is a continuation-in-part of application Ser. No. 08/681,765 filed Jul. 29, 1996, now U.S. Pat. No. 5,691,484, which is a continuation-in-part of application Ser. No. 08/429,534, filed Apr. 26, 1995, abandoned Nov. 21, 1996.

TECHNICAL FIELD

This invention relates to fluid flow sensors and, more particularly, to flow sensors which sense fluid flow conductively or capacitively by detecting the potential developed as the fluid moves through a magnetic field. The electrical potential is sensed by at least two electrodes placed opposite each other orthogonal to a magnetic field and contacting the liquid, and has a magnitude proportional to the flow rate of the liquid.

BACKGROUND OF THE INVENTION

In the past, alternating magnetic fields from electromagnets have typically provided an alternating potential which is developed at the electrodes to facilitate signal amplification and processing, and to prevent electrode polarization, a condition which introduces serious measurement error. Alternating magnetic fields, however, introduce several considerations, including a substantial electrical power requirement, the generation of electrical noise, and the requirement of complicated electrical circuits. This invention alleviates such considerations by enabling accurate measurement to be made using permanent magnets and a highly efficient magnetic circuit. The highly efficient magnetic circuit may also be used with flow sensors incorporating electromagnets which will then develop larger potentials at their electrodes and diminish the difficulties associated with those sensors.

Conventional magnetic flow sensors are available in both the probe and the full bore configurations. The invention described herein applies to both forms and enjoys the advantages of relatively high induced voltage and low noise, thereby reducing the cost and complexity of the supporting electronics, and relatively low power consumption, a particular advantage for portable instruments.

It is an object of the invention to provide a magnetic flow sensor using permanent magnets which are periodically mechanically repositioned to alternate the magnetic field polarity engaging the conductive fluid, thereby producing an alternating potential at the electrodes.

It is another object of the invention to provide a magnetic flow sensor with a magnetic circuit which substantially increases the potential developed at the electrodes.

SUMMARY OF THE INVENTION

The above and other objects are provided by a magnetic flow sensor in accordance with various preferred embodiments of the present invention. A first preferred embodiment comprises in part a pair of magnetic discs, each disc mounting 4 alternating polarity permanent magnets. The discs are separated from each other and mounted on coaxial bearings so that the magnets from both discs are facing and interacting with each other and aligned to be mutually attractive. A high intensity magnetic flux will then exist between the opposing sets of magnets. One of the discs is connected to a motor for rotation and when rotated, will by magnetic attraction, cause the other disc to rotate. Alternatively, a mechanical connection between the two discs may also be used. A parallel pair of electrically insulating flow passages is located in the space between the magnets of the 2 discs so that the same polarity flux engages both passages at the same time. A pair of electrodes is positioned on the flow passages typically at the outer limits of the flux field while a third electrode is preferably positioned coaxially with the other electrodes and between the passages. The third electrode may be merely a passage for the liquid being measured to provide the signal path so that the generated signals from both flow paths are summed. These signals are then coupled to the supporting electronics circuits for amplification, detection, display and other processing as required for a particular application.

In operation, liquid having at least slight electrical conductivity passes through the flow passages and through an orthogonally oriented magnetic field. The fluid flow generates a voltage at the electrodes. Electrical conductors carry the signal sensed at the electrodes to the circuit board for processing as needed. The magnetic fields are provided by permanent magnets having flux return paths through the discs which confine the fields to the flow passages to minimize interfering signals generated by the stray flux and to reduce the reluctance of the magnetic path and thereby increase the flux useful in producing flow signals. The rotation of the field induces a voltage in one flow passage which is nullified by a corresponding equal but opposite polarity voltage in the other flow passage thereby causing no measurement error. However, since the flux polarity in both flow passages at any given time is the same, and the electrodes in those passages are series connected, their flow related voltages are cumulative. As a result, relatively high output flow signals are obtained which enable lower flow rates to be measured.

Electromagnets which typically consume tens of watts or more of power are not used. The power consumption of the present invention, in requiring only tens of milliwatts or less, is much more energy efficient. Furthermore, by avoiding the use of electromagnets, the electrical noise and drifts associated with the switching and stabilizing of these circuits is eliminated and the supporting electronic circuits can be greatly simplified and made at lower cost.

In an alternative embodiment the flow passage is offset from the center of the discs such that the magnetic field primarily from one aligned pair of magnets intersects the flow passage and is also aligned with the electrodes. Multiple wire coils are sequentially energized to provide momentary magnetic fields which interact with the magnets, thus causing the discs to rotate in a concurrent manner.

In still another preferred embodiment, stationary electromagnets are employed in lieu of the permanent magnets. The electromagnets are electrically powered and provide magnetic flux across the flow passages such that the magnets are energized to provide opposite flux polarities at any moment during operation. Electrical current through the magnetic windings is periodically reversed, which causes all of the magnetic field polarities to reverse so that the generated voltage at the electrodes is correspondingly reversed. Various other preferred embodiments of the present invention are disclosed.

BRIEF DESCRIPTION OF THE DRAWINGS

The various advantages of the present invention will become apparent to one skilled in the art by reading the following specification and subjoined claims, and by referencing the following drawings in which:

FIG. 1 is a longitudinal, cross-sectional view of a probe flow sensor arranged in accordance with the principles of the present invention;

FIG. 2 is a cross-sectional view of the flow sensor of FIG. 1 taken along the line A—A;

FIG. 3 is a cross-sectional view of the flow sensor of FIG. 1 taken along the line B—B;

FIG. 4 is a cross-sectional view of the flow sensor of FIG. 1 taken along the line B—B showing a shortened flow passage;

FIG. 10 is another alternative preferred embodiment of the flow sensor of the present invention incorporating elongated, flow sensing electrodes;

FIG. 11 is another alternative preferred embodiment of the present invention;

FIG. 12 is a simplified view of the rotor of the sensor in FIG. 11, the magnetic core and the coil of the same sensor;

FIG. 13 is another preferred embodiment of the present invention showing an arrangement of the disc magnets with a coil/core assembly interposed between the upper and lower disc magnets;

FIG. 14 is a plan view of the flow passages and the magnets of the sensor of FIG. 13;

FIG. 21 is another alternative preferred embodiment of the present invention incorporating electromagnets and permanent magnets;

FIG. 22 is a partial cross sectional view of the flow sensor in accordance with section line 22—22 in FIG. 21;

FIG. 23 is a partial cross sectional view of the flow sensor in accordance with section line 23—23 in FIG. 21;

FIG. 24 is a partial cross sectional view of the flow sensor of FIG. 21 in accordance with section line 24—24 in FIG. 21;

FIG. 25 is a cross sectional view of the flow sensor in FIG. 21 in accordance with section line 25—25 in FIG. 21;

FIG. 27 is another alternative preferred embodiment of the present invention;

FIG. 28 is a side view of the flow sensor of FIG. 27 in accordance with directional arrow 28—28 in FIG. 27;

FIG. 29 is a partial cross sectional view of the flow sensor of FIG. 27 in accordance with section line 29—29 in FIG. 27;

FIG. 30 is a view of another alternative preferred embodiment of the present invention;

FIG. 31 is a plan view of the sensor in accordance with section line 31—31 in FIG. 30;

FIG. 32 illustrates the permanent magnet rotation used to cause the desired rotation;

FIG. 33 is a plan view of the flow paths and the orientation of a small magnet which causes the desired disc rotation;

FIG. 37 is another alterative preferred embodiment of the present invention in which small permanent disc magnets are used to rotationally couple a plurality of flow discs;

FIG. 39 illustrates a simplified electrical schematic of a wide dynamic range signal detector;

FIG. 40 illustrates another preferred embodiment of the invention having multiple flow passages;

FIGS. 44 and 45 illustrate the preferred embodiments of the present invention for sensing flow rate and direction;

FIG. 48 illustrates a drive motor and the related electrical block diagram in the probe form of the invention;

FIG. 49 illustrates a simplified electrical schematic embodied in the present invention with particular applicability to FIGS. 44 and 45.

FIG. 57A illustrates a side cross sectional view of another preferred embodiment of the present invention using permanent magnets whereby fluid flow is sensed on the outside of the sensor;

FIG. 57B illustrates a partial cross section view of the sensor in accordance with section line A—A in FIG. 57;

FIG. 57C illustrates a partial cross sectional view of the sensor of FIG. 57A which additionally incorporates an addtional set of sensing electrodes for sensing flow and direction in two axes; and FIG. 57D illustrates a partial cross sectional view of the sensor of FIG. 57A using electromagnets.

DETAILED DESCRIPTION OF PREFERRED EMBODIMENTS

Figure 5:
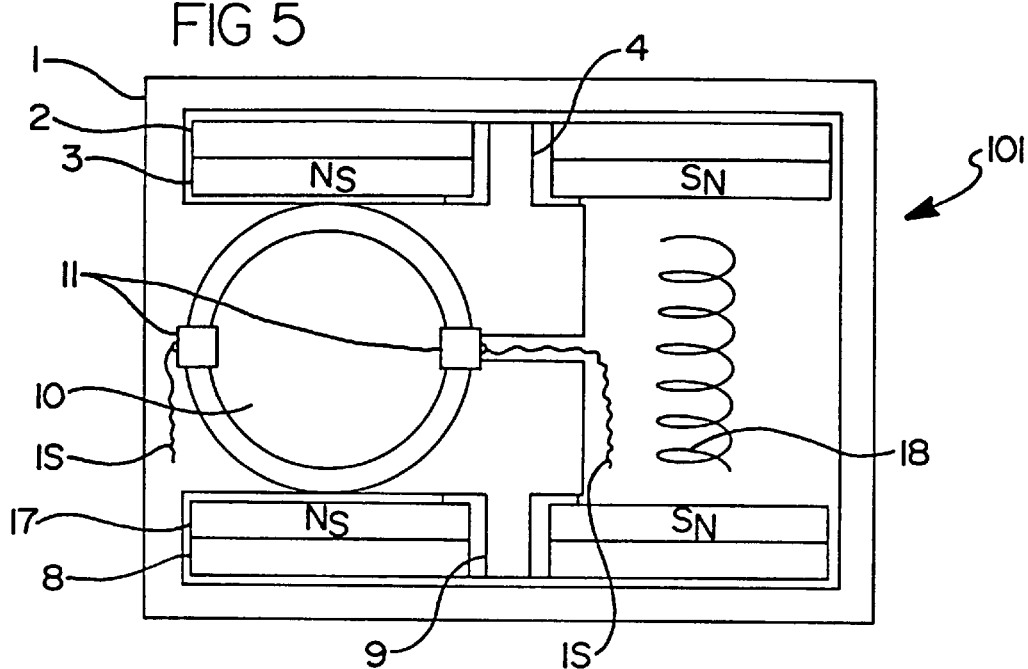
FIG. 5 is an end view of a full-bore flow sensor in accordance with the principles of the present invention.

FIG. 1 illustrates a preferred embodiment of a flow sensor 100 in accordance with the present invention. A housing 1 is an environmentally protective, electrically insulating, non-magnetic enclosure and support for the flow detecting portions of the sensor. Within the housing 1 is a magnetic disc 2, with four smaller disc permanent magnets 3 mounted to it as illustrated in FIG. 2. The magnets 3 are identical and arranged equidistant from each other and from the center of disc 2, and alternate in polarity as disc 2 is rotated past a fixed point about its central axis. Disc 2 is supported by bearing 4 so that it is free to rotate, and is also connected to a coupling 5 which is in turn coupled to a shaft 6. Shaft 6 in turn couples to a drive motor 7. The rotating shaft 6 connects to the rotating shaft of the drive motor 7 to thereby cause disc 2 to rotate accordingly.

Disc 8 and associated magnets 17, are similarly arranged as described with respect to disc 2 and its associated magnets 3, as illustrated in FIG. 2. Disc 8 is supported by bearing 9 in proximity to disc 2 so that the magnetic fields provided by the respective magnets of discs 2 and 8 align in a mutually attractive orientation whereby the rotation of disc 8 will follow that of disc 2.

Between discs 2 and 8 are two flow passages 10 as illustrated in FIG. 3. At right angles to the passages 10 are two outer pickup electrodes 11 which contact the flowing liquid. Pickup electrode 12 also contacts the liquid and bridges the generated voltages from the two flow passages 10 in a series-like connection. The function of electrode 12 can also be provided by the fluid whose flow is being sensed.

Liquid having at least slight electrical conductivity passes through the flow passages 10 and through an orthogonally oriented magnetic field and generates a voltage at the sensing electrodes 11 and 12. Conductors 13 convey the electrical signal to the electronics board 14 for amplification, detection, display, and further processing as may be required for a particular application. A tube 15 provides a mechanical connection between the housing 1 and the mechanical drive and electronics enclosure 16. For insertion probes as in FIG. 1, the electrical ground is typically provided by connecting the ground of the electronics board 14 to an electrically conductive tube 15 or additional electrodes in contact with the liquid. FIG. 4 illustrates the flow sensor of FIG. 3 whereby the flow passages are reduced to correspondingly reduce the pressure drop resulting at high flow velocities. Modifications may also be made to the flow passages 10 to encourage magnetically attracted particles to be washed off by the fluid or to be contained in pockets whereby their effect on the sensor operation is minimal.

Discs 2 and 8 are preferably formed from a magnetic material, typically soft iron, and provide a return path for the magnetic field. In this way, the air gap in the magnetic circuit is substantially reduced, thereby confining the magnetic field to and increasing the field strength through the flow passages 10. Disc 2 and its magnets 3, may alternatively be formed by a single piece of magnetized material and then magnetized as illustrated in FIG. 2. Disc 8 and its magnets 17 may be similarly fabricated.

Although benefitting from the additional flux and greater magnetic circuit efficiency resulting from the use of disc 8 and its associated magnets 17, the sensor may alternatively function without contribution therefrom. A practical sensor can be realized solely using disc 2 and its associated magnets 3 and extending flow channel 10 between the two outer pickup electrodes 11. In such a configuration, electrode 12 may be omitted. Such a sensor, now open on the bottom, would be preferred for applications where large sized particulate matter in the flow stream may close off a relatively small flow passage. The electrodes 11 would be electrically insulated from the liquid where the magnetic field is not present to prevent a reduction of the developed potential due to shunting by the liquid. For full bore sensors, FIGS. 5, 6 and 9 being examples thereof, the electrical circuit board ground is usually connected to an electrically conductive part of the sensor housing 1 or additional electrodes in contact with the liquid.

In operation, disc 2 is rotated by motor 7 either continuously or in a stepped fashion, whereby a step occurs at least every 90 degrees, to position the most intense alternating magnetic field across the flow passages. The average rotational rate is determined in part by the material polarization rate of electrodes 11 and 12 in the liquid being measured and the characteristics of supporting electronic circuits. A rotational rate from tens to hundreds of RPMs would be typical. Motor 7 may include any one of an AC synchronous and DC quartz clock, DC brush and electronically commutated, or stepper type motors. If a stepper or other type of motor 7 is used which automatically provides the 90 degree rotation, the motor 7 is preferably oriented to maximize the magnetic field through the flow passages 10. If the motor 7 drive does not automatically provide 90° of rotation, a rotation reference such as a photoelectric or magnetic sensor preferably controls motor 7 so that it starts and stops as required, if continuous rotation is not employed. Such reference sensors can also trigger an automatic zero control if they are used.

The motor 7 may be preferably rather small because only bearing friction losses need to be overcome during rotation. If motor 7 operates with a relatively low duty cycle, the power consumption can be very low. The motor 7 may also be advantageously located within the housing 1 cavity.

The electrical signals detected by electrodes 11 are conveyed by conductors 13 to the circuit board 14 in a very low noise environment because the overall power consumption is relatively low and any required electrical switching can be performed at low speeds to avoid severe electrical transients. For example, conventional magnetic flow sensor magnetic field power requirements are typically in the tens of watts, while the motor 7 power requirement is in the tens of milliwatts or less (as in the case of some quartz crystal clock motors). As a result, sensing low flows which produce very low level signals can be performed more economically and, furthermore, lower practical limits to magnetic flow sensing may be established.

Additional housings 1, each having a flow sensing mechanism, may be positioned at different locations on tube 15 and are rotatable by motor 7. This may be accomplished by connecting a second coupler 5 and shaft 6 to disc 8 which then enters a second housing similar to housing 1 with its sensor assembly. Multiple sensors may be used in this manner because the rotation error between sensing units is relatively low when low friction bearings are employed.

Figure 6:
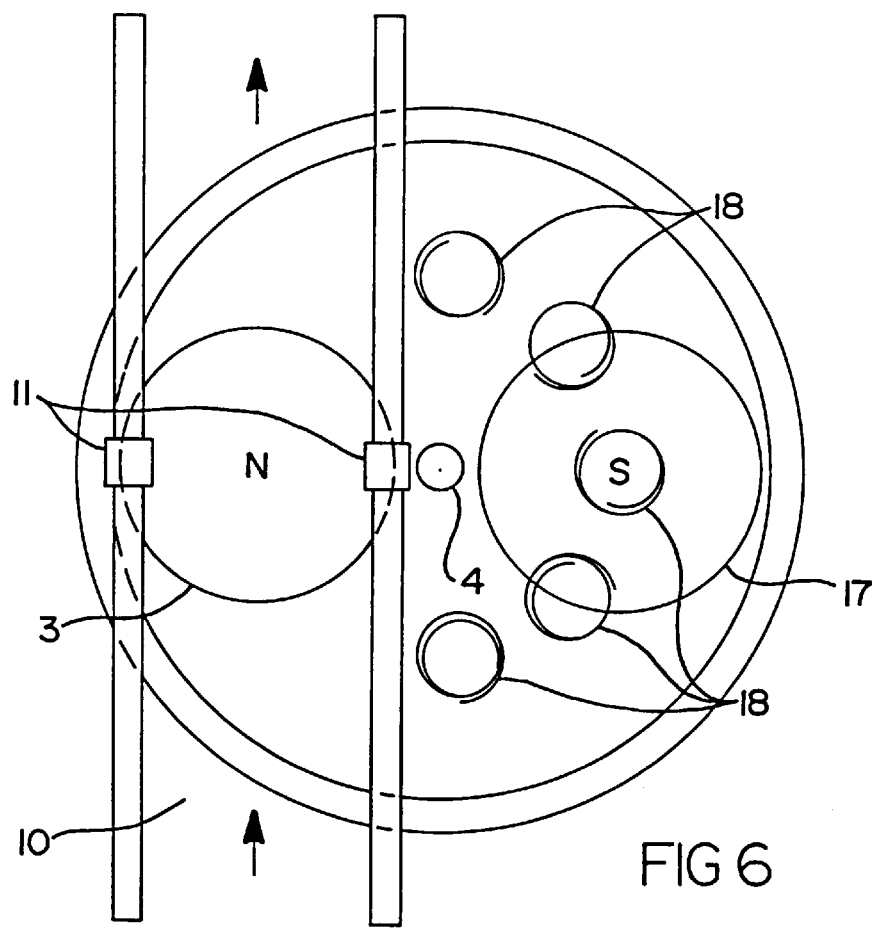
FIG. 6 is a cross-sectional view of the flow sensor of FIG. 5 as viewed from the top.

FIGS. 5 and 6 illustrate in cross section, the major components of an alternative embodiment 101 of the full bore flow sensor 100. In FIGS. 5 and 6, each disc 2, 8 may have as few as two magnets 3, 17 mounted with opposing polarities. The flow passage 10 is offset from the center of the discs 2, 8 so that the magnetic field primarily from one aligned pair of the magnets 3, 17 intersects the flow passage 10 and is also aligned with electrodes 11.

Bearings 4, 9 support discs 2, 8 and permit relatively frictionless disc rotation. A pair of electrodes 11, detect the developed signal. Multiple wire coils 18 are sequentially energized to provide momentary magnetic fields which interact with the magnets 3, 17 thereby causing the discs to rotate in a stepped manner. In effect, a stepper motor is made which enables disc 2, 8 rotations to be produced, thereby alternating the polarity of the magnetic field intersecting flow passage 10. This configuration offers the further advantage of an integrated electromechanical structure with relatively large output signal for its overall size, and low power consumption.

Figure 7:
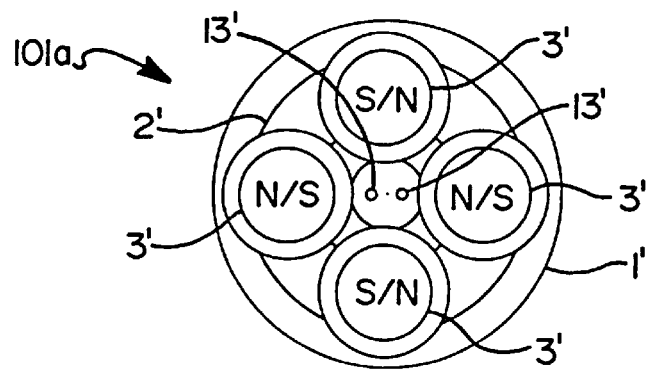
FIG. 7 is a longitudinal, cross-sectional view of a probe flow sensor embodying additional aspects of the invention according to a second embodiment of the invention.
Figure 8:
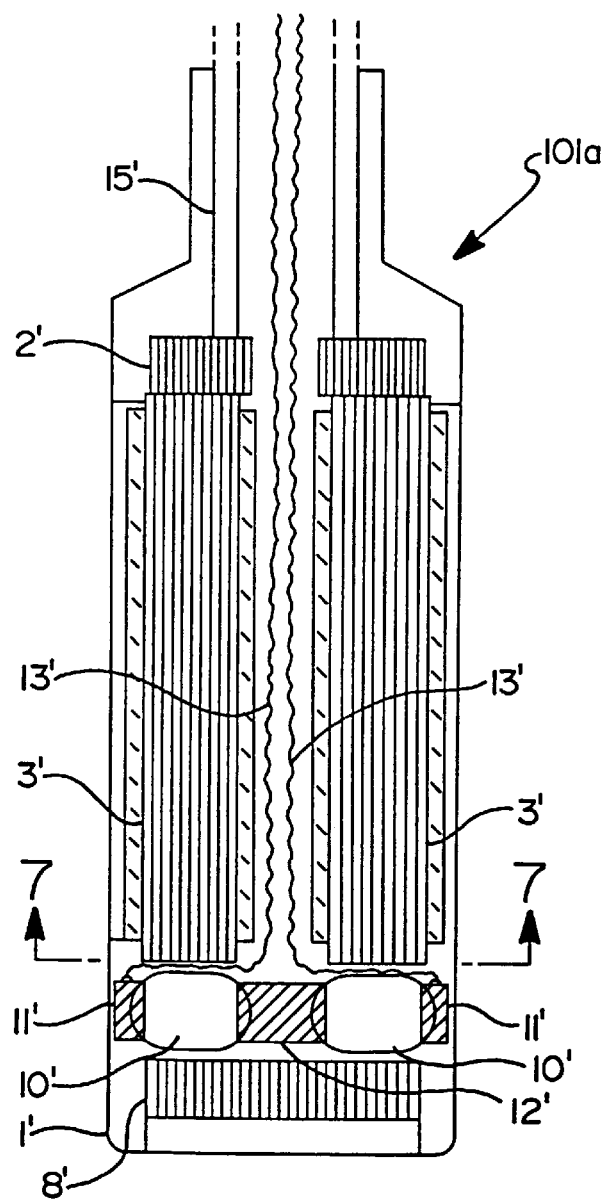
FIG. 8 is a cross-sectional view of the flow sensor in FIG. 7 taken along the line A—A.

FIGS. 7 and 8 illustrate yet another preferred embodiment 101a of the sensor. As the components depicted in FIGS. 7 and 8 closely correspond to the physical and functional aspects of similarly numbered components in FIGS. 1 and 2, similar reference numerals having a prime (e.g. 3') designation correspond to similar components of FIGS. 1 and 2. In FIGS. 7 and 8, four stationary electromagnets 3' are electrically powered and provide magnetic flux across the flow passages 10'. Even though similar electromagnetics may be located below flow passages 10' and provide additional magnetic flux like that of the magnets 8 of FIG. 1, the added complexity and size suggests that the flux paths are through disc 8. The magnets 3' are energized so that adjacent magnets have opposite flux polarities at any moment during operation. Electrical current through the magnet 3' windings is periodically reversed, causing all of the magnetic field polarities to reverse so that the generated voltage at the electrodes 11' and 12' is correspondingly reversed, thereby preventing their polarization and resultant signal errors.

Sense wires 13' are attached to the sensing electrodes 11' and are routed through stem 15' to the signal amplifying and processing electronics. Item 1' is the electrically insulating housing which holds all of the components together.

Conventional magnetic flow sensors typically have rather substantial air gaps for the magnetic field. This invention effects a substantial reduction in this gap and provides the benefits of using reduced electrical power to provide the magnetic fields and/or increased output signal. It will be understood by one skilled in the art that if the lower disc 8' is removed so that the bottom of the sensor is open to the flow, the air gap remains substantially smaller than that of conventional single magnet flow sensors.

Figure 9:
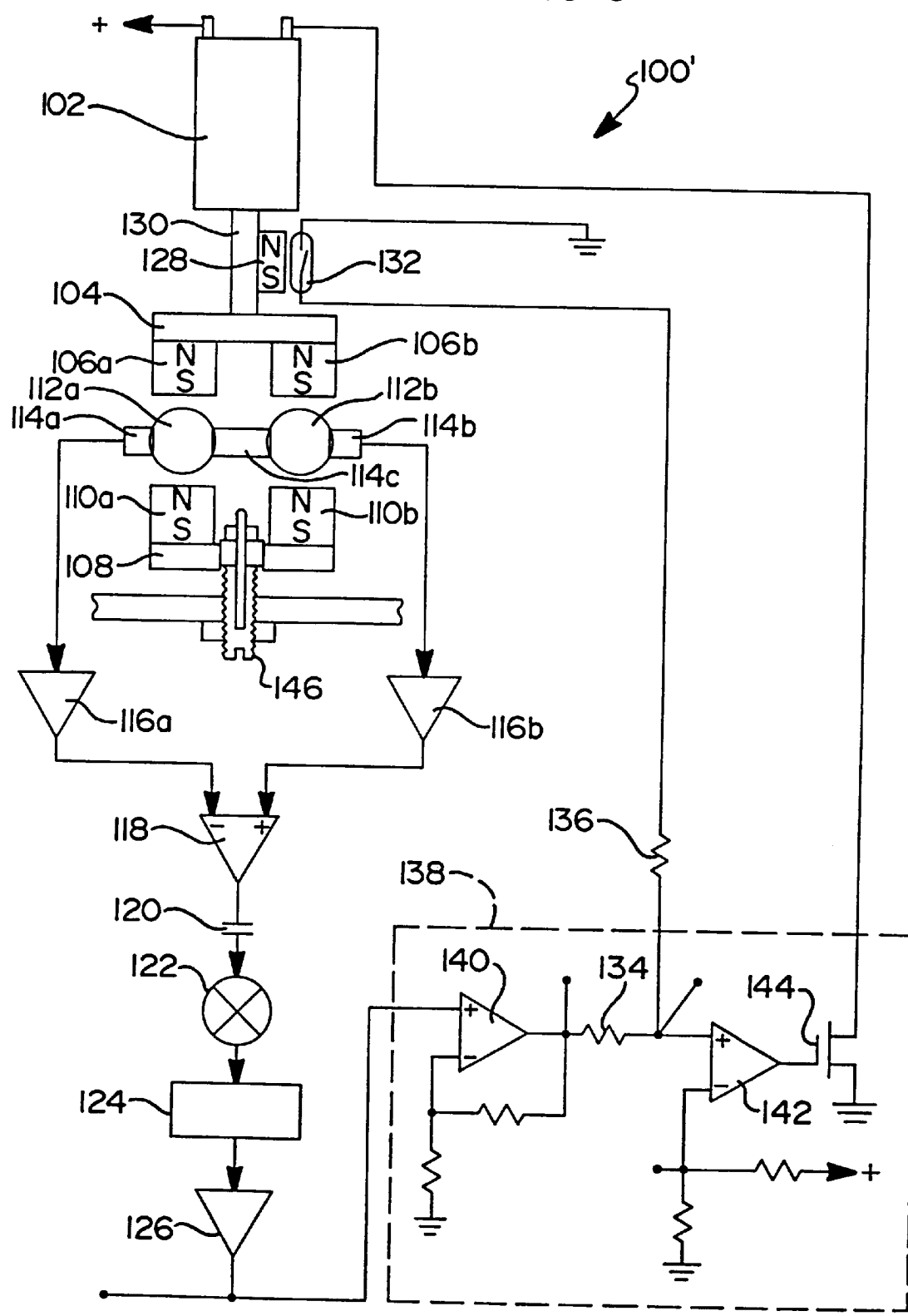
FIG. 9 is an alternative preferred embodiment of a flow sensor of the present invention.

Referring to FIGS. 9 and 10, there is shown a flow sensor 100' in accordance with another alternative embodiment of the present invention. This flow sensor 100' has the advantage of reducing the average electric power required to operate the flow sensor 100' by "shedding" the electromechanical mechanism for changing the position of the magnets. A separate sensing switch is for repositioning the permanent magnets when load shedding commences.

With specific reference to FIG. 9, a motor 102 is used to rotate an upper disc 104 having two permanent magnets 106a and two permanent magnets 106b secured thereto. A lower disc 108 has two permanent magnets 110a and two permanent magnets 110b secured thereto in spaced apart relation with the magnets 106a, 106b and separate flow conduits form fluid flow paths 112a and 112b. Sensing electrodes 114a, 114b and 114c are wetted by the fluid flow in the flow passages. It will be appreciated that only one each of the magnets 106a and 106b, and one each of magnets 110a and 110b are visible in the drawing of FIG. 9. This is also true for the remaining figures which show a cross-sectional view of a sensor illustrating two magnets. In these instances it will be appreciated that each disc has two additional magnets of opposite polarity which are not shown.

Electrodes 114a and 114b are further coupled to amplifiers 116a and 116b. The outputs of amplifiers 116a and 116b are input to a differential amplifier 118. The output of the differential amplifier 118 is provided via a capacitor 120 to a detector 122. The detector 122 transmits its output to a low pass filter 124, and the output signal from the low pass filter 124 is transmitted to an amplifier 126. The signal ground is typically obtained from a metallic body part of the sensor or additional electrodes in contact with the liquid.

With further reference to FIG. 9, a "stop location" magnet 128 is secured to a shaft 130 which is rotated by the motor 102. A magnetic reed switch 132 is positioned closely adjacent the magnet 128 and electrically coupled via resistors 134 and 136, which form a voltage divider circuit, to an amplifier circuit 138. Amplifier circuit 138 includes a first operational amplifier 140, second operational amplifier 142 and a field effect transistor (FET) 144.

In operation, as the motor 102 rotates it causes concurrent rotation of the disc 104. Since the lower disc 108 is magnetically coupled to the upper disc 104, the lower disc also rotates with the upper disc. The signals sensed by electrodes 114a and 114b are amplified by amplifiers 116a and 116b and then by the differential amplifier 118 prior to being decoupled by capacitor 120 and detected by the detector 122. The resultant DC signal with its ripple voltage corresponding to the rotation of the magnets 106 and 110 is then passed through the low pass filter 124 to remove the ripple component and then through the output amp 126 to provide the desired output signal level.

With further reference to FIG. 9, to explain the load shedding circuit operation, if it is assumed that the flow output signal is about 0–2 volts for a flow rate of 0–20 gallons per minute (GPM), then the signal generated would be 0.025 volts at a typical cutoff rate of, for example, 0.25 GPM. At this flow rate, with the gain of 10 for Op amp 140, the output would be 0.250 volts. Each time the reed switch 132 is within range of the stop location magnet 128 mounted on the motor shaft 130, it closes and, through the voltage divider formed by resistors 134 and 136, reduces the positive input voltage to Op amp 142 to 0.200 volts. This voltage is still that which is sufficient to enable its output to be high and maintain normal sensor operation. However, when a reduced flow rate forces this voltage to be lower, Op amp 142, with its negative input voltage fixed to 0.200 volts, will have a low output, thereby cutting off the FET 144 and deenergizing the motor 102.

When the flow rate rises sufficiently while the sensor 100' is in its powereddown state, sufficient electrode signal is produced before significant polarization occurs and the DC decoupling has a sufficiently long time constant so that the voltage on the positive input of the Op amp 142 reaches at least 0.200 volts. This causes the motor 102 to be energized and normal sensing operation to resume.

With further reference to FIG. 9, it will be appreciated that the reed switch 132, in addition to being a mechanical reference for the stopping position, provides hysteresis. The flow rate signal has a long time constant so that with a sharp reduction in flow sufficient to cause load shedding to occur the motor 102 will continue to operate until the correct stopping position is reached. While the DC decoupling capacitor will theoretically prevent very slow and smooth increases in flow rate from ultimately producing the flow output required to return the flow sensor 100' to normal operation from a load shedding state, such operation is considered to be extremely abnormal and highly unlikely because of normal turbulence and pressure fluxuations.

It will also be appreciated that a number of other position-oriented stopping methods which are known in the art may also be employed. With the flow sensor 100' in a powered-down state, the magnetic flux is maintained so that a flow-related signal can still be produced to bring the flow sensor up to the fully operational state. Rotational control and power control can similarly be applied when noncontinuous rotation motors such as stepper or oscillating types are employed. In these cases magnet 128 and reed switch 132 may not be needed as the inherent rest positions of these motors can be oriented to automatically position the magnets over the flow passages during a load shedding state. In applications involving domestic water usage, since the duty cycle of domestic water usage can be very low, the flow sensor 100' provides the economic advantage of longer battery maintenance intervals, reduced battery costs and smaller overall size which are all extremely important factors with commercial flow sensors. It will also be appreciated that the powereddown state could include other optional components of the flow sensor 100', such as a microprocessor, display or A/D convertor.

With further reference to FIG. 9, the flow sensor 100' also includes a means for calibration. In the domestic water meter example given above, the distance between the discs 104 and 108 may be changed by a lockable adjustment screw 146. The adjustment screw 146 is used to position the lower disc 108, and thus the magnets 110, closer to or farther from magnets 106 of the upper disc 104. The adjustment screw 146 thus allows a degree of variability of the amount of magnetic flux active in the flow passages 112, which in turn allows a degree of adjustability of the magnitude of the generated voltage produced by the electrodes 114. The adjustment screw 146 thus forms a simple yet effective means for enabling mechanical calibration of the flow sensor 100' to be performed.

Referring briefly now to FIG. 10, another improvement of the flow sensor 100' is illustrated. This flow sensor 100" is essentially identical to the flow sensor 100' with the exception of the electrodes 114, which are elongated, cylindrical electrodes 114a' and 114b'. The electrodes are orientated orthogonal to the axis of the fluid flow paths 112a, 112b. The elongated electrodes provide the advantage of being easily inserted to a precise depth, anchored in place and sealed against leaks. This configuration is particularly well suited for full bore flow sensors which direct the entire volume of flow through the passages 112a and 112b. Each electrode 114' further includes a rugged post 150 which allows electrical contact to be made directly with the supporting electronics PC board 152.

Referring now to FIGS. 11–14, there is shown another alternative preferred embodiment 200 of the present invention. The flow sensor 200 is similar to the flow sensor 100, and like components of the flow sensor 200 are designated by reference numerals corresponding to those used in connection with the description of the flow sensor 100 but increased by 100. For example, the upper and lower discs of the flow sensor 100 have been designated by reference numerals 104 and 108, and the upper and lower discs, respectively, of flow sensor 200 are designated by reference numerals 204 and 208, respectively.

The use of a stepper motor in connection with the flow sensor 200 provides several distinct advantages. Principally, stepper motors offer low power consumption, relatively small in size, relatively low cost and long life. With the flow sensor 200, although the motor need only overcome friction and mechanical unbalance in order to rotate the discs 204 and 206, these loads are still significant in terms of the desire to operate the sensor 200 for long periods from a small battery. Therefore, it is important that all efforts be made to optimize the efficiency of the sensor 200. As an example, it will be noted that no gear train is incorporated with the sensor 200.

Referring further to FIGS. 11 and 12, the flow sensor 200 incorporates a rotor 250, which is formed from a 4-pole magnet of alternating polarity poles. The rotor 250 automatically positions itself such that its poles are mechanically aligned with core ends 252 and 254 of a core 251 to which it is magnetically attracted. The disc magnets 206 and 210 are then positioned stationary directly over the flow passages 212a and 212b and flow sensing may then take place.

With further reference to FIGS. 11 and 12, when a pulse from a pulse generator 256 is impressed across a coil 258, the magnetization of the core 251 is such that its magnetic poles are momentarily of the same polarity as those of the adjacent rotor poles of the rotor 250. Since like poles repel, the rotor 250 will immediately rotate in one direction by 90° to reestablish the mechanical orientation where the rotor and core poles are mutually attractive. A continuing series of alternating polarity pulses from the generator 256 continues to force the rotor 250 to rotate in 90° increments, the resting position between pulses being such that four of the disc magnets 206 and 210 are always in alignment with the electrodes 214 to facilitate the generation of a flow related signal.

In FIGS. 11 and 12, the member being directly magnetically driven is the rotor 250 which is a separate component from the discs 204 and 208. However, it is also possible to directly act on the discs 204 as illustrated hereinbefore. Another example is illustrated in FIG. 13 in which the disc magnets 206 and 210 not engaging the flow passages 212 are, as in FIGS. 11 and 12, acted upon by an alternating polarity post magnetic field to produce a 90° rotation. It should be noted that the presence of the core 251 can provide a useful reduction of the air gap, thus increasing the magnitude of signals generated by the electrodes 214.

With further regard to FIGS. 11–13, both discs 204 and 208 can be supported by a single, angularly compliant bearing 260 so that the magnetic attraction between the discs 204, 208, combined with the pivotal geometry moment, is self balancing. In FIG. 13, this feature is of particular interest because it facilitates the manufacturing treatment of a flow sensing module which integrally contains the mechanism for disc rotation.

While the direction of rotation is not important for the applications described herein, it can be determined nevertheless using core slots and/or magnetic biasing or other existing methods. It is also possible for the rotor 250 to rotate first in one direction and then in the other and so forth. It is also notable that a mechanically resident circuit consisting, for example, of the rotor 250, discs 204 and 208, and optionally, an anchored balance wheel hairspring can function as a resonant circuit and with other techniques like that used on clocks, provide this type of oscillatory movement very efficiently. In this instance, the rotor 250 could be rigidly attached to the upper disc 204 and the electrical pulsing would occur either once or twice per cycle as may be desired. Oscillatory configurations could also be used with electromechanical drivers of the piezoelectric and magnetostrictive types which deliver small mechanical movements. If an oscillatory movement is used, it is desirable to regulate the magnitude of the swing so that the maximum flux can be active in the flow passages 212 and to maintain it constant for best repeatability, particularly if an averaging detector is used. A peak detector is more tolerant of the swing variations providing that a minimum magnitude of swing corresponding to that which produces the maximum flow related signal is maintained. The same electromagnets used for producing the mechanical rotation can preferably provide electrical signals corresponding to rotational rate and direction and, when amplified, provide the feedback signals for sustaining the required movement. When the movement is oscillatory, a return spring or other force may beneficially be used, for example, to help establish a high efficiency resonant operation.

The coil 258 may be energized with relatively short, low energy pulses in an efficient design. One consideration of such a design is that the mass of the discs 204, 208 is relatively large compared to that of the rotor 250 and that a means is required to store and transmit the energy represented by a rotor step to the discs 204 and 208. One way of accomplishing this is with a torsion spring which makes the mechanical connection between the upper disc 204 and rotor 250. The spring, in effect, quickly winds up almost 90° when the rotor 250 is pulsed and unwinds relatively slowly releasing its stored energy as it rotates the disc 204 to return the discs 204 and 208 into alignment with the rotor 250.

When relatively high energy electrical pulses energize inductive circuits, as is likely to be the case with stepper motors, a significant amount of electrical noise can be generated. Means such as shielding and balanced circuits and layout, though effective, may not reduce the noise to acceptable levels. An additional means for doing so, however, is by the use of a switching arrangement whereby during each pulse, and for a short time thereafter to allow normal circuit operation to be reestablished, the path of the amplified electrode signals is interrupted by an electronic switch 262 (FIG. 11) so that any signal produced then does not contribute to the overall output from the flow sensor 200.

Figure 15:
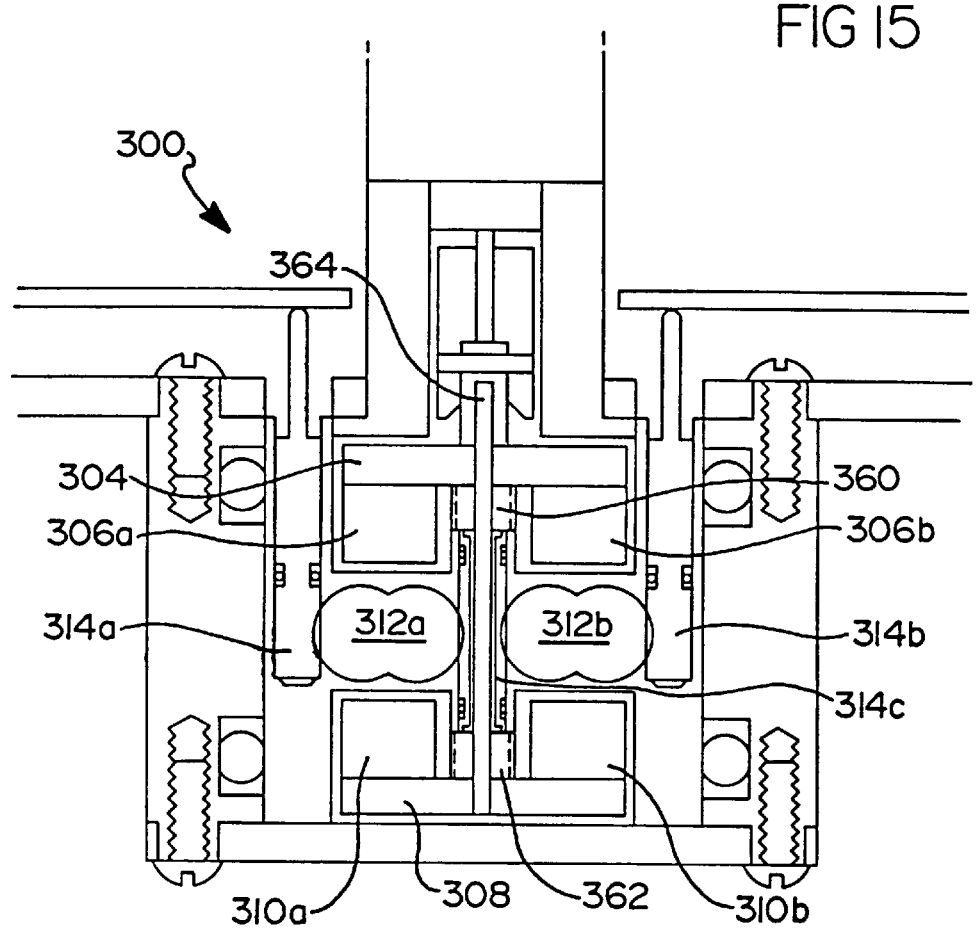
FIG. 15 is another alternative preferred embodiment of the present invention incorporating a center electrode.
Figure 16:
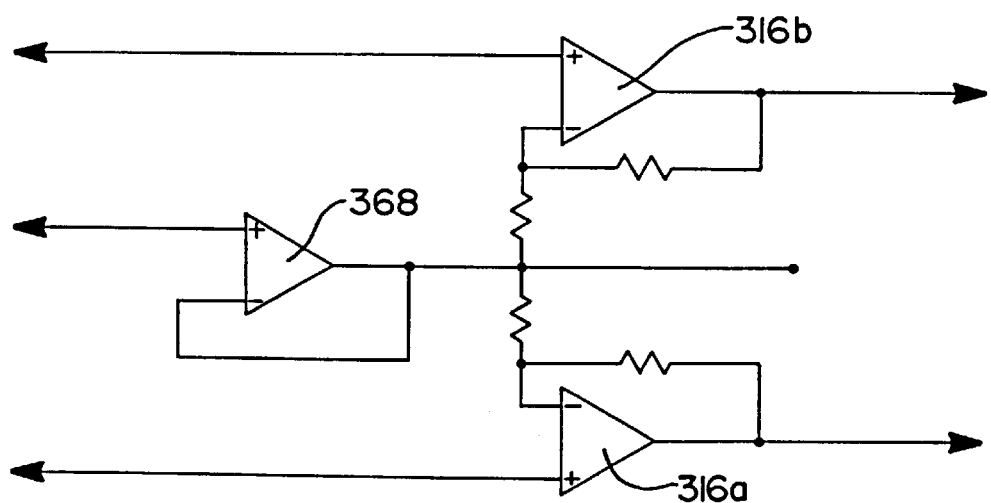
FIG. 16 is a simplified electronic schematic diagram showing the connection of an input amplifier for producing a reference signal from the center electrode.
Figure 17:
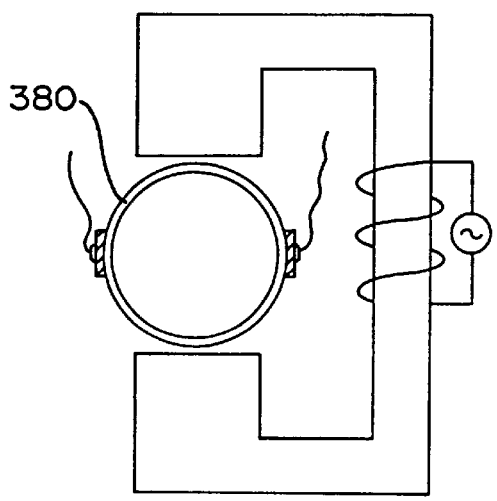
FIG. 17 is another alternative preferred embodiment of the flow sensor incorporating a flow tube having a conductive coating and electrodes secured to the flow tube.

Referring now to FIGS. 15 and 16, yet another alternative embodiment 300 is illustrated. Components similar to the flow sensor 200 are designated by reference numerals increased by 100. The flow sensor 300 is substantially identical to the flow sensor shown in FIG. 10 with the exception of the inclusion of a center sensing electrode 314c extending orthogonally to the flow paths 312a and 312b and between these flow paths. It will be appreciated that the ability to detect rapid changes in flow rate is an important consideration in some applications such as blood flow monitoring and chemical process injection activities. This ability can be obtained in an at least two ways with the embodiments of the present invention described herein. The first way is to change the rate of the flux polarity reversal, and therefore the mechanical relocation rate of the flow sensing magnets 306 and 310, to a relatively high rate compared to that of the flow rate changes. For example, if the discs 304 and 308 would ordinarily rotate at one revolution per second, they would instead be rotated ten or even 100 times faster. These rotational rates are not mechanically excessive and, while representing a maximum of only 3600 RPM, enable a sampling rate of 20 times per second to be achieved. Higher speeds and sampling rates are, of course, also possible if needed.

It should also be noted that the rotating magnets 306 and 310, as shown in FIG. 15 and FIG. 14, are oriented in a balanced opposing flux polarity configuration. It is particularly important that, because of the high speed of rotation of discs 304 and 308, the common mode signals which are generated from the magnet movements are therefore relatively large, and are inherently cancelled with the series connection of the electrodes 314, thereby leaving only the flow responding signals to be amplified. The calibration factor, as in the other configurations described herein, is essentially independent of the rotating speed of the magnets 306 and 310 over a wide range.

With further reference to FIGS. 15 and 16, modern conventional magnetic flow sensors use electromagnets which, because of their inherent inductance, require appreciable time for the flux to build up and stabilize after the application of the voltage pulses. Consequently this method of generating an alternating magnetic field seriously limits the rate at which the flux polarity can be changed while preserving other sensor characteristics such as the ability to sense low flow rates which usually require high flux levels. By contrast, when using magnets which provide a constant flux such as permanent magnets, and mechanically repositioning the permanent magnets to alternate the flux polarity through the flow passages, the sensor characteristics are easily preserved over a wide range of sample rates.

With reference to FIG. 16, the second way to detect rapid changes in flow rate is to utilize the very high input resistance (typically 10,000 megohms) of the amplifiers 116a and 116b shown in FIG. 9 to enable the polarization of the electrodes 314 to proceed so slowly that the discs 304 and 308 can remain in a fixed position for a relatively long time without seriously affecting sensing qualities before being repositioned to alternate the magnetic polarity. A sensing window of several seconds to several minutes, for example, can be established before alternating the magnetic polarity. This way is particularly effective when the flow rate profile is a series of short, high-rate pulses. Such a series of short, high-rate pulses might be produced, for example, from a diaphragm pump. With the use of a stepper motor to preposition the magnets, the time required to complete the reversal of the magnetic polarities can be very small compared to that of the sensing window, and the resulting sensing error can be similarly small.

With further reference to FIG. 15, it is often convenient to use the two discs 304 and 308 with permanent magnets which are free to rotate with respect to each other in a mutually attractive fashion so that a rotation of one of the discs will cause the other to similarly rotate. It is also possible, and some times advantageous, to mechanically attach the two discs 304 and 308 with their magnetic fields aligned to be mutually attractive. An example of this is illustrated in FIG. 15 where the center electrode 314c is O-ring sealed and supports upper and lower ball bearing races 360 and 362, respectively, through which a shaft 364 attaches the discs 304 and 308 to each other. One advantage of this form of mechanical disc attachment is that the bearing system supporting the discs 304 and 308 does not experience the loading of the magnetic attractive forces between the discs. This results in reduced bearing requirements and friction losses and, when these factors become important enough, as in a sensor application for very low power and/or high speed operation, may significantly reduce costs and/or improve performance.

Another advantage of mechanically attaching the discs 304 and 308 as one piece is that no movement exists between them which might alter their mutual alignment, thereby changing the magnetic field and causing noise or error in the flowrelated signal. This consideration is particularly applicable for high speed, stepped and/or high repeatability operation. Furthermore, any misalignment of the magnets 306 and 310 due to the effects of gravity, which may cause a calibration error in a freely pivoting bearing arrangement, will be eliminated.

With reference now to FIG. 16, in some magnetic flow sensing applications where minimum metallic contact is desired, as in the case of sensing the flow rate of purified water, the center electrode 314c can also be used to establish, as a reference signal, the intermediate or ground electrical potential of the fluid in the vicinity of other side electrodes 314a and 314b. The voltage potential sensed by the center electrode 314c may also be amplified by an Op amp follower 368 in order to serve as a low impedance reference.

Referring now to FIGS. 17–20, various improvements to the flow sensor described herein are illustrated which make the flow sensor of the present invention particularly well adapted to sensing the flow of liquids containing abrasives and liquids which may be adversely affected by metallic contact. The sensing of these types of liquids place special requirements on flow sensors in order to reliably sense the fluid flow of such liquids without suffering unacceptably high wear and without affecting the liquid through metallic contact therewith.

Conventional magnetic flow sensors designed to meet such needs often use ceramic flow tubes for abrasion resistance and field replaceable electrodes. Platinum electrodes are usually specified for minimum chemical effect. However, platinum electrodes are seriously deficient for sensing very pure and/or chemically aggressive liquids containing abrasives. Such liquids might be used, for example, in the manufacture of semiconductors.

FIGS. 17–20 illustrate various elements of alternative embodiments of the magnetic flow sensor of the present invention. The various elements are configured such that abrasion resistance is combined with chemical inertness. The basic principal employed is to use an inert dielectric barrier, whereby the flow generated signal is coupled capacitively between the liquid and electrically conductive terminations shown in cross hatching in FIGS. 17–20. With specific reference to FIG. 17, the barrier employed is a thin wall ceramic tube 380 with a high dielectric constant. For such a thin wall ceramic tube, the resultant capacitance coupling values, which can vary from several 10's to several 1000's of picofarads, or even higher, depending upon the tube properties and conductive area, is quite sufficient, when coupled to high input impedance amplifiers, for practical sensor operation. The alternating polarity magnetic circuit may be obtained electromagnetically or alternatively with moveable permanent magnets as exemplified in FIGS. 2 and 5.

Figure 18:
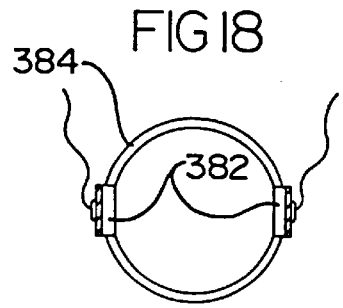
FIG. 18 illustrates ceramic electrodes used in connection with a flow tube of the flow sensor of the present invention.

Referring specifically to FIG. 18, ceramic electrodes 382 with a high dielectric constant are located in a dielectric flow tube 384 of different electrical and/or mechanical properties for reasons of economy, manufacture ability, etc. For example, the ceramic electrodes 382 may be similar to the ceramic elements in small ceramic disc capacitors and their use in place of metal electrodes may reduce sensor cost.

Figure 19:
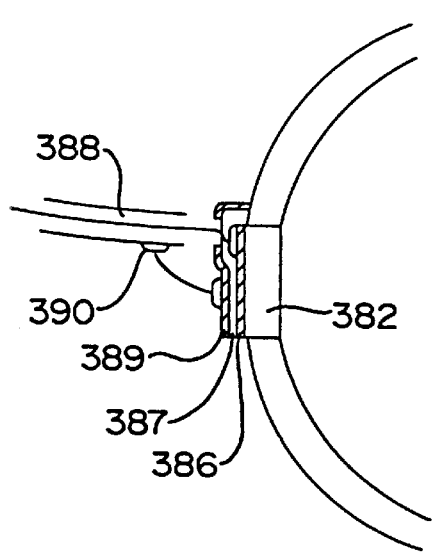
FIG. 19 illustrates a flow tube operating in connection with a ceramic electrode having a conductive coating thereon in which a coaxial cable is secured to the electrode.

The performance of any type of electrode can be enhanced by electronic means. Referring specifically to FIG. 19, a conductive coating 386 is directly applied to the ceramic electrode 382. An insulating coating is applied over the first coating and then another conductive coating is applied overall with the exception of a small area to enable a connection to be made to the first conductive layer without it being shorted to the second conductive layer. The conductive coating 386 is electrically coupled to the center conductor of coaxial cable 388, which is connected at its other end to the input of a high input resistance amplifier. The shield is driven at nearly the same potential as the signal, thus almost completely cancelling the shunting affects of stray capacitance. This enables the amplifier to respond to electrode signals with very high series capacitive reactance, essentially to alternating electrical charges, and makes possible flow detection of fluids which are very nearly electrical insulators. A charge-coupled amplifier like that often used with piezoelectric transducers and other capacitive sensors is another example of the means for amplifying those charges. Such detection sensitivity is enhanced by the use of a relatively high flux reversal rate and would be particularly benefited by the use of rectangular or wedge-shaped magnets, for example, which can increase the number of magnetic poles on a disc and larger diameter discs. Flux reversal rates well into the kilohertz range are thereby possible at relatively low motor shaft speeds, as usually required for long operational life. Electromagnets, which have a much higher rate capability can also be used preferably above and below the flow passages.

Figure 20:
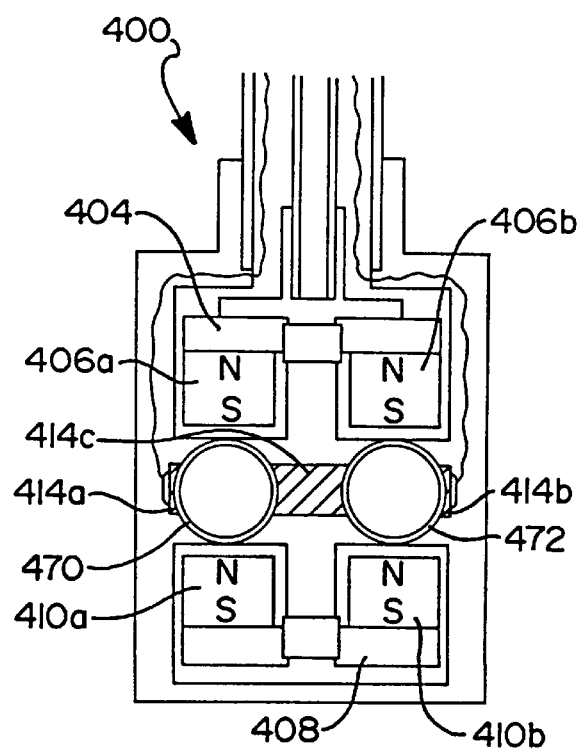
FIG. 20 is another alternative preferred embodiment of the present invention incorporating dual flow tubes for defining dual fluid flow paths.

Referring to FIG. 20, a flow sensor 400 in accordance with another alternative embodiment is shown. The flow sensor 400 uses slaved rotating permanent magnets 406 and 410 with flow tubes 470 and 472 which have relatively thin walls, and which are used to capacitively couple the flow related signal to the electrodes 414, which may be a thin conductive coating. Ceramic electrodes, as shown in FIGS. 18 and 19, could also be used.

Referring now to FIG. 21, a further embodiment of a flow sensor in accordance with the present invention is shown which incorporates a stepper motor. When using permanent magnets, the invention preferably includes some sort of mechanical movement typically provided by an electric motor for changing the position of the magnets and thereby reversing the polarity of the magnetic fields used for generating the flow related signal. Several types of motors including DC brush and brushless, AC induction and stepper motors may be used. Stepper motors have the advantages of being brushless, not requiring continuous power and providing rotational steps which can be used to advantage in repositioning the magnets in a single step. The flow sensor 500 shown in FIG. 21 illustrates the principal elements of a flow sensor incorporating a stepper motor, it being noted that such a motor may also be operated as a DC brushless motor or as a synchronous motor, and means may be provided to switch from one mode of operation to another depending upon the operating conditions of the sensor.

Referring to FIGS. 21 and 22, the flow sensor 500 includes four electromagnets 506a–506d with arc shapes at the end of their cores, four small disc permanent magnets 507a–507d and electrically conductive magnetic epoxy (FIG. 24). The electromagnets 506 have their windings connected to provide alternating flux polarities at the arc shaped ends of their cores as in FIG. 22. These magnets 506 are energized at the same time with electrical pulses of alternating polarity so that their flux polarities reverse periodically. The flux pulsation from each electromagnet 506 is of the same polarity as that of the nearest small disc magnet 507 located on the upper disc 504 as shown in FIG. 23 so that a repulsion force between the two occurs causing a 90° disc rotation.

The small disc magnets 507 have a small angular offset with respect to the electromagnets 506 and the large disc magnets 510a–510d (FIG. 25) used for the flow related measurement. Since the small disc magnets 507 would normally be attracted to and come to rest at the center of the arcs following each pulse, the large disc magnets 510 would then be offset from the optimum position directly over the flow passage 512a and 512b. The arrow 23 in FIG. 23 shows the direction of the resultant disc offset. However, the electrodes 514a and 514b shown in FIG. 24 are bonded to their connecting wires with an adhesive having magnetic properties which is offset angularly opposite to that of the small disc magnets 507 so as to attract the large disc magnets 510 in the opposite direction as shown in FIG. 25 and align them properly. A nickel filled epoxy has been found to be effective in providing both the electrically conductive and magnetic properties. Other materials for providing in particular the desired magnetic properties such as small magnets or pieces of iron may be located at or near the electrodes or elsewhere to provide the same angular offset.

The angular offset introduced between the center of the arcs and the small disc magnets determines the stationary or starting position prior to each pulse and, as such, the direction of rotation. Without such an offset, rotation could occur in either direction or if the disc assembly 504 were exactly centered from the last pulse, or possibly not at all.

When rotation does occur, there is typically a damped oscillatory action as the disc assemblies overshoot the 90° position and return past that position, perhaps several times, before becoming stationary. If the number of oscillatory cycles varies and/or the stationary locations of the disc assemblies 504 and 508 are not consistent, an intolerable flow measurement error relating to the nature of detecting the average amplitude of the flow related signal can be introduced. One possible way of eliminating this error is to detect the amplitude peaks of the signal with a "sample-and-hold" circuit while it oscillates around its central position.

Figure 26:
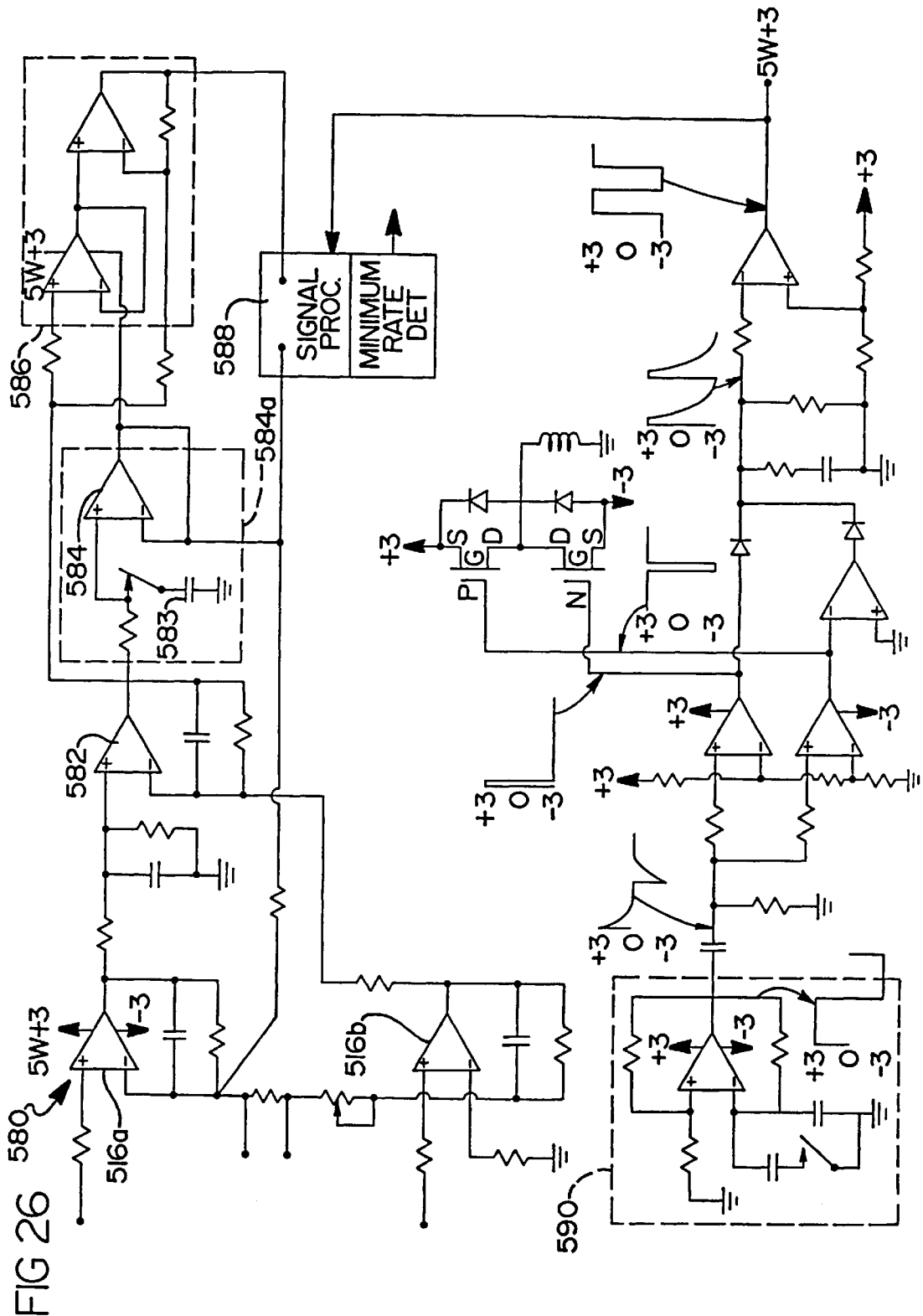
FIG. 26 is a simplified electrical schematic diagram of a detector and amplifier circuit for use with the flow sensor of FIG. 21.

FIG. 26 illustrates an example of an electronic circuit approach intended for use with a stepper motor. A signal amplifier 580 is comprised of two electrode amplifiers 516a and 516b and differential amplifier 582. The signal amplifier 580 forms an instrumentation amplifier which amplifies the alternating electrode signals and applies their difference signal to a buffer 584 and then to a tracking detector circuit 586. The tracking detector signal output enters a signal processor 588 for analog-to-digital conversion and digital processing.

A clock oscillator 590 with additional circuits provides the stepper motor excitation, timing and switching functions to power the motor 502 (not shown) and to effectively turn off the amplifier 580 and detector 586 circuits during the generation of high electrical noise which occurs during and for a short time after a stepper motor pulse. This allows enough time for the amplifier 580 and detector 586 circuits to recover and accurately provide a flow related signal for processing, and to reduce their power duty cycle for overall power reduction. The functional equivalent of these circuits can be part of the signal processor 588, particularly if it is microprocessor based.

Of note is that the amplified signal also enters a low pass filter prior to entering the buffer 584, which provides essentially a DC correction signal back to the electrode amplifier 516a. This form of negative feedback biases the operating point of the amplifier 516 as to shift the DC operating point of the final signal from amplifier 582 much closer to ground than it might otherwise be due to galvanic action at the electrodes or amplifier offset.

The feedback circuit enables the electrode signals to be amplified and detected without the use of decoupling capacitors, which is an advantage in reducing the circuit recovery time after a motor pulse or signal noise occurs. The capacitor 583 which makes up part of a sample and hold circuit 584a is switched out of the circuit until the circuit recovers from the motor pulse. Also of note is that the tracking detector 586 has as its negative supply/reference the buffered version of the same signal applied to its input. With the exception of the buffered signal being a DC level signal while the input signal has the same DC level but with an added AC component having a magnitude representing flow rate, the two signals track each other so that detection of the AC component can be performed precisely over a very wide dynamic range. A tracking detector 586, also not incorporating any capacitors and other circuits, can be disabled during the motor pulse and can likewise recover quickly. The detector 586 is of the active full wave type and can easily be enabled for signal detection by applying operating power. A wide range of detector types such as peak detectors which detect and hold the maximum magnitude of the amplified electrode signals as well as synchronous detectors which detect the signal magnitude with reference to internal or external timing signals or a certain mechanical orientation of the magnets with the flow passages are also applicable. When phase referenced to magnet orientation with the flow passages, the detected signals may also be used to indicate flow direction.

The clock oscillator 590 would normally operate at a low frequency, for example, one Hz. At that frequency, two pulses would typically be applied to the stepper motor in one second to rotate the flow sensing discs 504 and 508 90° and then 180°. In the course of that second, the voltage decay of the sample and hold circuit would be low enough to prevent any significant flow related error. However, when flow is not present and a delay in responding to the start of flow is permissible, a much lower clock oscillator frequency may be used to advantage, which will drastically reduce power consumption and overall wear and tear. The clock oscillator circuit 590 can therefore have a provision, for example by increasing the time constant of its timing circuit, for changing its frequency as a function of magnitude of the flow related signal.

The signal processor can be programmed so that flow rates under a certain value are considered to be zero, whereby the clock oscillator 590 is automatically switched into the low frequency mode. When the flow rate increases beyond that value, normal operation commences.

When motors are used in such a way that they do not generate significant amounts of electrical noise, it is not necessary to periodically disable the electrode signal amplification and processing functions. The electronic circuit may then be simplified while still taking advantage of the stabilizing functions of the amplifier feedback and the tracking detector. The switching of the sample and hold circuit 584a may be eliminated so that the circuit functions as a buffered low pass filter with a long time constant relative to that of the signal frequencies. However, motor stoppage for load shedding must have the provisions for aligning the magnets used for flow sensing well enough over the flow passages for the flow detection functions to operate reliably.

Of significant commercial value is that a flow meter based upon the various embodiments of the present invention and using permanent magnets can be easily made to detect when the flow is increased significantly from zero, and to do so while consuming very little power. With the use of very high input resistance amplifiers, small increases in flow rate from zero can even be detected when the flow related flux polarity is not reversed for a long time (i.e., minutes, hours and possibly even days, or at all). While the instability of such signals prohibits their use for general purpose measurement applications, they can provide an accurate indication of flow rate in special situations where a periodically occurring flow rate, such as zero flow rate, can be established, for example, by turning off the flow at regular intervals. Such is done, for example, in batch controlling. Typically, when flow is not present, the difference voltage between the electrodes is detected and retained in a sample and hold circuit, and connected to both inputs of a differential amplifier. When flow commences, the sample and hold circuit is then disconnected from the electrode difference voltage and retaining its preflow magnitude and polarity, is connected only to the negative input of the amplifier while the amplifier's positive input remains connected to the electrode difference voltage. The amplifier output signal is thereby corrected for the electrode offsets and provides an accurate indication of flow rate until electrode voltage drifts become significant. The required switching is typically controlled by detecting the commencement or cessation of flow, or remotely controlled as from a pump controller.

FIG. 22 illustrated an arc shape of the electromagnetic poles 506 for the stepper motor of the present invention. If the arcs are relatively narrow, and may even be shaped differently such as circular to concentrate the magnetic flux over a relatively narrow area, the small disc permanent magnets 507 will be attracted to align themselves with the pole centers. However, if the pole arcs are relatively wide so that their angular span approaches the spacing of two adjacent motor magnets as shown in the Figure, the dominant attraction will be for those magnets to align themselves with the pole edges, a shift of 45° for the example shown. Either configuration will enable a stepped rotation to be produced and can, with proper orientation, be used with the present invention. Furthermore, the multiple electromagnets 506 may be replaced by fewer or even a single electromagnet whereby a magnetic core conveys the magnetic flux to the locations to produce the desired rotation.

FIG. 13 previously described herein illustrated the use of electromagnets acting directly upon the flow detecting permanent magnets on the rotating discs 204 and 208 and not over the flow passages, so as to cause disc rotation. FIGS. 27 and 28 are center section views of the critical elements of an applicable flow sensor from the front and side respectively, whereas FIG. 29 is a sectional view at the center of the flow passages. A single electromagnet 606 with a small magnetic core is used in this example to present less restriction to the flow. The magnet 606 is angularly offset to bias the rotation of disc 604 to a stationary position slightly off center for maximum flow generated signal while small amounts of magnetic materials or small magnets are located offset at the electrodes 614 for example, to exert the opposite bias force and to ultimately center the discs 604 and 608. The arrows in FIG. 29 show the direction of the bias forces on the discs 604 and 608.

When the electromagnet 606 is pulsed alternating current pulses, its magnetic repulsive force is relatively large, dominating the bias forces and causing the discs 604, 608 to rotate. Since the electromagnet 606 center was offset from that of the disc magnets because of the bias forces, the magnetic repulsion force always produces a force component which causes the discs 604 and 608 to tend to rotate in the same direction.

In FIGS. 30–35, rotation of the discs 604, 608 is caused by mechanical movement of a small permanent magnet 607 located close to one or both discs 604, 608. In FIG. 30, a small permanent magnet 607 is made to slide or pivot about the intermediate distance between the magnets mounted on the discs 604, 608. Since the intermediate distance represents magnetic null due to the opposing polarities of the disc magnets 606, 610, a small departure from that position produces a substantial increase in flux (of either polarity) which interacts with the small magnet 607 causing corresponding attractive and repulsive forces.

Initially, where the small magnet 607 is attracted to and relatively close to a disc magnet 606, 610, the small magnet is mechanically moved closer to the aligned disc magnet of the opposite polarity which tends to repel it. This repelling force between the two magnets provides the rotational force component and the tendency to produce rotation. This action is then reversed to produce disc movement in the opposite direction, and so forth.

Various means may be incorporated to move the small magnet 607. For example, it may be acted on by an electromagnet and a return spring, or by two electromagnets in a balanced configuration. Of note is that with the disc magnets 606, 610 shown, a total of 90° (+/−45°) of rotation is normally used and that this type of oscillatory movement, especially if operated continuously at the natural resonant frequency of the discs and magnetically induced forces and optionally a spring or other returning force, will require relatively low electrical power.

With a continuing oscillatory type of disc movement, it is desirable for the rotation to be a little greater than +/−45° so that the flow passages 612 are exposed to the maximum flux and therefore generate the maximum possible signal of each cycle. A peak detecting type of signal detector will then provide a stable flow sensor calibration even though the rotational angle may vary somewhat. The small amount of rotation overshoot may be produced by increasing pulse power.

An inductor similar to the electromagnets illustrated in FIGS. 13, 28 and 29 will provide a generated signal indicative of rotational rate and direction. This signal can be amplified and used to power the means for moving the small magnet 607 so that oscillations will start and be maintained at the resonant frequency. A free running pulse generator could initially start the oscillation.

While some form of magnetic biasing may be incorporated into the present invention to assure rotation, such assurance may also be had by imparting a slanting angular offset to the small magnet movement path with respect to that of the disc rotational axis while allowing for some mechanical flexibility of the magnet or its support. Since the repulsion force that the magnet would normally experience would tend to deflect it from its central axis producing in effect mechanical hysteresis, a force component tending to produce rotation will always occur.

If the small magnet 607 is relocated to be closer to one disc than the other and rotated by external means such as a motor, it will cause the discs 604, 608 to rotate. The rotation can be continuous in one direction and rotation is assured without magnetic bias, mechanical offsets, etc. Of note is that the small magnet 607 can be, as an example, very small (0.125 inch diameter by 0.060 inch long) compared to the eight disc magnets (0.250 inch diameter by 0.200 inch long) and one or two discs 604, 608 (0.700 inch diameter by 0.100 inch long) that it is able to rotate, it is also possible to orient the small magnet 607 in its rotational axis at a right angle to the disc axis.

Figure 34A:
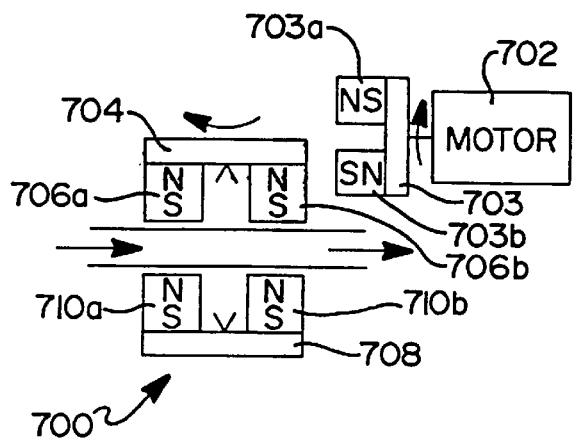
FIGS. 34a—34c illustrate various orientations at which a motor of the flow sensor and an associated drive disc may be orientated relative to the flow discs to induce rotation of the flow discs.
Figure 34B:
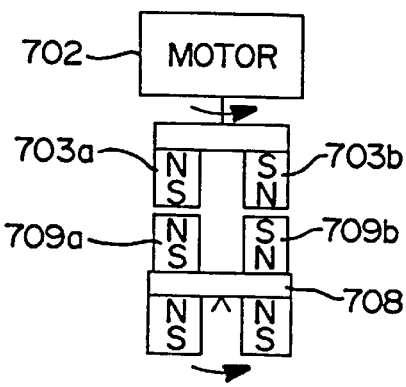
Figure 34C:
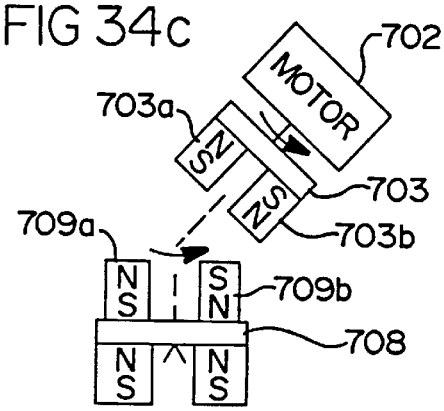

In FIGS. 32 and 33, the rotation of a small magnet close to the disc sensing magnets can cause the flow sensing disc to rotate. FIGS. 34a–34c illustrate additional magnetic coupling embodiments for disc rotation and have similar features except that, as will be noted, coupling can of course be made using conventional methods such as friction drives, belts and gears. Although the dual disc arrangement is the preferred embodiment, single disc operation is also possible.

In FIG. 34a, the motor rotational axis is at a right angle to that of the flow disc axes. Since the friction losses are typically very low, it is practical for the magnets on the disc drive to be small compared to the flow sensing magnets and the distance between them to be relatively large. This allows the motor 702 and the drive disc 703 to be conveniently located without inhibiting the flow passages.

In an example of the preferred embodiments shown in FIG. 34a, the flow sensing discs 704, 708 each have four magnets 706, 710 of alternating polarity while the disc drive 703 has two magnets 703a, 703b of alternating polarity. The magnets of both discs align with respect to each other to be mutually attractive. With this configuration, the flow sensing discs 704, 708 will make one revolution for every two revolutions of the drive disc 703. By changing the ratio of the number of magnets on the drive and sensing discs, different sensing discs speeds can be obtained in a manner like that of mechanical gear trains to suit a variety of requirements.

The drive magnets 703a 703b act primarily on a single flow sensing magnet at a time when it is not located over a flow passage and in line with the electrodes (such as electrodes 114 in FIG. 9), and therefore has very little affect on the performance of the flow sensor 700. FIG. 34b illustrates an in-line axial magnetic coupling between the drive and a sensing disc 708, where the sensing disc 708 has additional magnets 709 on top for coupling to the drive magnets 703. However, if they are not in line but the motor axis is offset to the side or to a right angle as in FIG. 34a, for example, a different number of drive magnets on the two discs will change their speed ratio. If the motor driven disc 703 has two magnets and the sensing disc 708 has 20 magnets, a speed reduction of 10:1 will result. In some applications, this will eliminate the need for a motor gear box.

FIG. 34c has its motor offset at an intermediate angle (i.e. roughly around 45°). This is useful, for example, where the flow sensing probe is used at an angle in trash-loaded streams and it is desired that the flowing debris automatically clear the sensor by easily washing itself free of the probe.

Figure 35A:
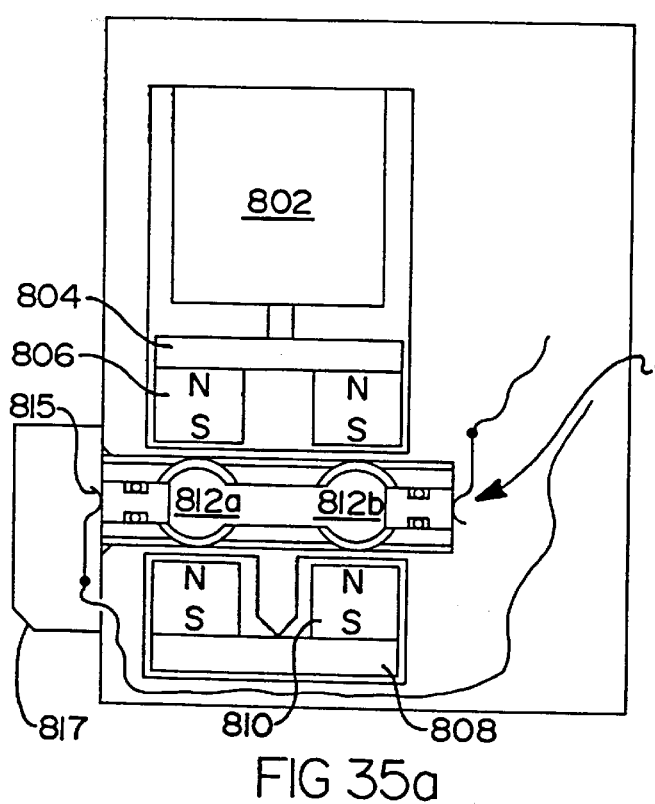
FIGS. 35a–35b illustrate another alternative preferred embodiment of the present invention which incorporates a removable flow tube module.
Figure 35B:
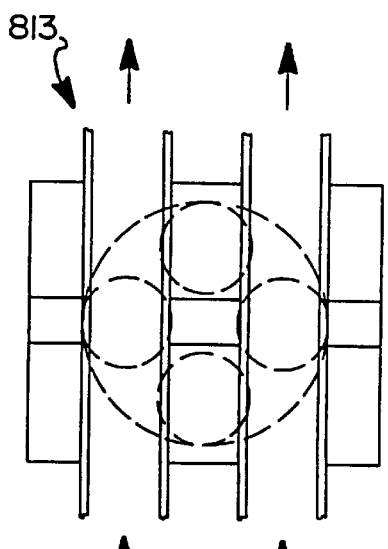

FIGS. 35a and 35b illustrate a preferred embodiment of a flow sensor 800 in which the flow passages including the electrodes are easily removed and replaced as a module. Typical applications can be found in the laboratory/medical/pharmaceutical/industrial areas utilizing small tube/pipe sizes. FIG. 35a is a central cross section of the major components of such a sensor from the side while FIG. 35b is a central cross section of the replaceable flow tube module from the top.

The multiple flow tube (dual flow tube as shown in FIG. 35a) rectangular configuration is the preferred embodiment although a single round tube is also usable. It maximizes the cross sectional area between the magnets of the upper and lower discs for minimum flow pressure drop while minimizing the magnet-to-magnet distance across the liquid for maximum magnetic flux and therefore maximum generated signal. The flow tube assembly 813 can typically be a relatively low cost module which slides from left to right into the sensor housing. Both the housing and module are carefully made and keyed so that the fit between the module and the housing is a precision fit which is precise even when replacement modules are used. Spring terminal connections 815 automatically provide the electrical connections to the module electrodes when the cover 817 is closed. By maintaining close manufacturing control of the flow tube module 813 in particular, module 813 can be replaced without recalibration and, alternatively/additionally, each module can be individually calibrated against a factory standard, for example, and an additional calibration noted for meter correction at the time of installation.

Incorporating the provisions for a replaceable flow tube module to a certain extent opens the sensor to environmental factors such as electrical noise which can seriously degrade its performance. Since the preferred embodiments using dual discs cost effectively produces a sufficiently large signal and is relatively insensitive to interfering electrical noise compared to other magnetic flow sensors, a replaceable flow tube module is practical. A single disc sensor of inferior but possibly acceptable performance for some applications is also practical.

The flow tube module 813 would typically have its flow passages manifolded so that the user has a single inlet and outlet and a single outlet passage to join to. However, some applications require coexistent multiple metering where it would be desirable to separately measure the flow rates. Such an example is the industrial use of a two-component spray paint where the quantity and the mix ratio of both components need to be monitored. An applicable sensor in this case would have a solid common electrode connected between the flow passages to prevent mixing of the liquids. This would be wired to an additional spring terminal connection at the bottom of the module which, in conjunction with two-channel signal amplifier and electronic processing, will provide the desired flow rates and ratio data when separately sensed and signal processed flow are flowing through the flow tubes. In this instance the flow should be in the direction opposite to that of flux movement rate through the passage to avoid the ambiguity of the signal becoming zero when a significant flow rate is present. The respective flow signals may be used for balance and control with relation to each other. For example, when the electrode signals are summed and the flow direction is such as to provide signal cancellation, a precise and stable signal null is obtained over a very wide range of flows when they are precisely equal. Differential measurements over a wide range of ratios are similarly precise as the same flux field uniquely engages both flow passages.

Figure 36A:
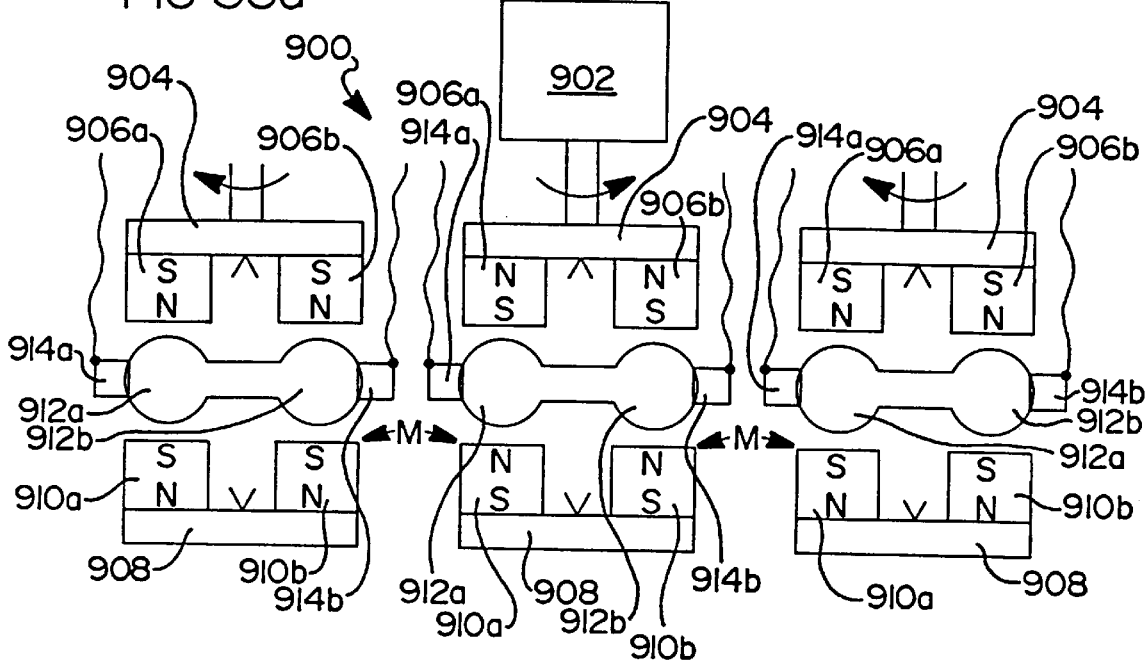
FIG. 36a illustrates yet another alternative preferred embodiment of the present invention in which a plurality of flow sensing discs are rotated by a single motor.
Figure 36B:
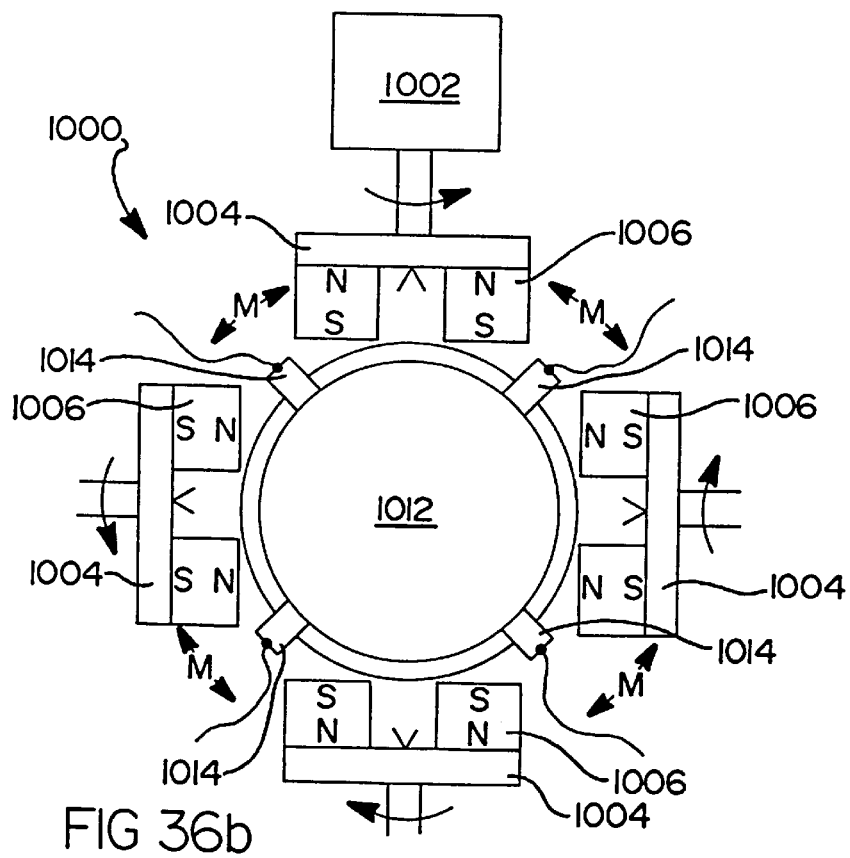
FIG. 36b is another alternative preferred embodiment of the present invention incorporating a plurality of flow discs oriented transverse to one another and circumscribing a central flow tube.

In the preferred embodiment the flow tube module of FIGS. 36A and 36B can also be inserted and removed from the bottom of the housing. Both outer electrode contacts could then be mounted on a rigid part of the housing 813. The neutral electrode, if required, may be conveniently located along either or on both tubes outside of the magnetic field environment.

When accessed from the bottom, the lower disc, on its own bearing system and being only magnetically coupled to the upper disc can, as a removable modular part of the sensor, be held in its operational position by the magnetic attraction between it and the upper disc so that the flow tube module is squeezed between the two. Different size flow tube modules covering a range of thickness and widths and therefore a range of flow rates can then be used by the same housing 813 with the distance between the discs being regulated by the module dimensions for maximum sensitivity, specific calibrations or other factors. The spacing between the discs can also be adjusted to the application by mechanical means. This is particularly applicable to soft tube flow passages like blood vessels. Since the vessel walls are usually thin and electrically conductive, the electrodes need only contact the outside of the wall thereby making the measurement non-invasive.

It is also practical to provide the flow sensing assembly without the flow tube module 813 as a portable meter, whereby it is moved from location to location where a flow tube module or fitting already mounting the electrodes, and even the magnet assembly, will have already been installed so that an occasional measurement can be made. This can also be made to work with large pipes as might be used for agricultural irrigation, for example, using the single disc configuration with the acceptance of some performance degradation. When used with electrically insulating pipes such as PVC pipe, it is necessary only to accurately locate two small electrodes directly in the pipe and then wire to and mount the rest of the meter containing the magnetic and drive assembly, and supporting electronics over them to make the flow measurement.

FIGS. 35a and 35b and the description relating thereto describe multiple flow tube portions of the present invention using a single disc or preferably a coaxially aligned pair of discs. Another way of configuring such a sensor is to use separate discs or disc pairs for each flow tube whereby the discs are magnetically coupled so that all of them can be rotated by a single motor. Magnets already being used for the flow sensing function can provide the magnetic coupling or, alternatively, additional magnets may be added for coupling. The use of a single motor offers the advantages of smaller size, lower power consumption and reduced costs. A simplified view of such an arrangement is shown in FIG. 36a.

Both the single disc and, to a lesser extent, the dual disc versions of the sensor 900 provide sufficient magnetic flux outside of the signal generating environment to be used for the mechanical drive as illustrated. The mechanical force required for rotation is very small and due primarily to mechanical unbalance and bearing friction. The distance between the adjacent sensors can be substantial thereby permitting either the same or separate electrodes 914 to be used. Adjacent magnet separation as large as one half the disc diameter of dual disc sensors using neodymium magnets as shown approximately to scale in FIG. 36a is practical.

With further reference to FIGS. 34a–34c, during start up rotation, acceleration must be slow enough for the drive and slave discs 704 and 708, respectively, to maintain their magnetic synchronization. If synchronization is lost, the slave discs 708 may remain stationary even though the drive discs 704 are operating at full speed. This matter only becomes a problem when each drive disc 704 is operated at a relatively high speed as may be required for responding quickly to rapid flow changes. A detector may then be required to determine the presence of rotation and, if it is not present, stop and then restart the drive disc. Such a detector may be an inductive pickup made from a coil of copper wire located to detect the alternating flux from a rotating slave magnet. Other types such as hall effect and photoelectric are also applicable.

FIG. 36b similarly illustrates a sensor 1000 configured with magnetically coupled discs but surrounding a single flow passage 1012. Note that the magnetic flux fields in the immediate vicinity of the discs which are used to produce the flow related signals are much stronger than the relatively weak fields needed to mechanically couple the discs. Single discs 1004 are shown although dual discs and probe type sensors may also be used. The use of multiple sensing locations enables substantially improved measurement precision to be achieved over that of a single sensing location as in a typical flow probe.

While common use of the single electrodes 1014 between the discs as shown in FIG. 36b appears to be the most efficient utilization of resources, a separate pair of electrodes 1014 for each disc may be preferable, particularly when minimum electrode signal shunting is desired and with minimum attenuation from fluid shunting effects or opposite polarity signals generated nearby. Any number of the discs or their orientations or combinations may be used in single plane or curved or circular configurations as applicable to the application so that the electrodes 1014 sense the greatest generated signal from their respective discs. Each disc related pair of electrodes 1014 provides signals to a separate channel of amplification, detection and processing after which they are combined to reflect the total flow.

For measuring extremely low flow rates, a sensor can be designed with very small flow passage dimensions while otherwise maximizing magnetic flux and the flow generating distance between the electrodes. There are practical limits to this approach and further gains may be made by adding separate sensors in which the same flow passes through the sensors in series while the electrode signals, correctly phased, are additive. This approach is practical with the various embodiments of the present invention because of its low inherent cost and because several such sensors can be conveniently grouped into one physical sensor and operated by a single motor. FIG. 36a illustrates a method of grouping such sensors.

An alternative approach to the above is illustrated in FIG. 37. This embodiment 1100 uses additional small magnets to 1103 to rotationally couple the discs 1104 because the polarity of the disc magnets opposes the natural alignment of the discs 1104 with respect to each other. This rotational coupling method is quite practical with the dual disc configuration because there is a relatively small amount of flux from the disc magnets 1106 and 1110 which would interfere with the drive operation.

The alignment of the discs 1104, however, enables the same polarity of flux to penetrate the flow passages with flows in the same direction. Common electrodes 1114 may be conveniently used, whereby the generated signals from all of the flow passages 1112 are additive and disc rotation induced signals are self-cancelling. Where they may not be self cancelling because of any combination of flow direction, electrode usage or magnetic polarity or direction of movement as in other embodiments of this invention, an offset signal will be produced which needs to be accommodated or canceled. The offset signal is significantly reduced, if not entirely eliminated, if electrode signal detection occurs when the magnets are stationary as, for example, when stepper motors are used.

Figure 38A:
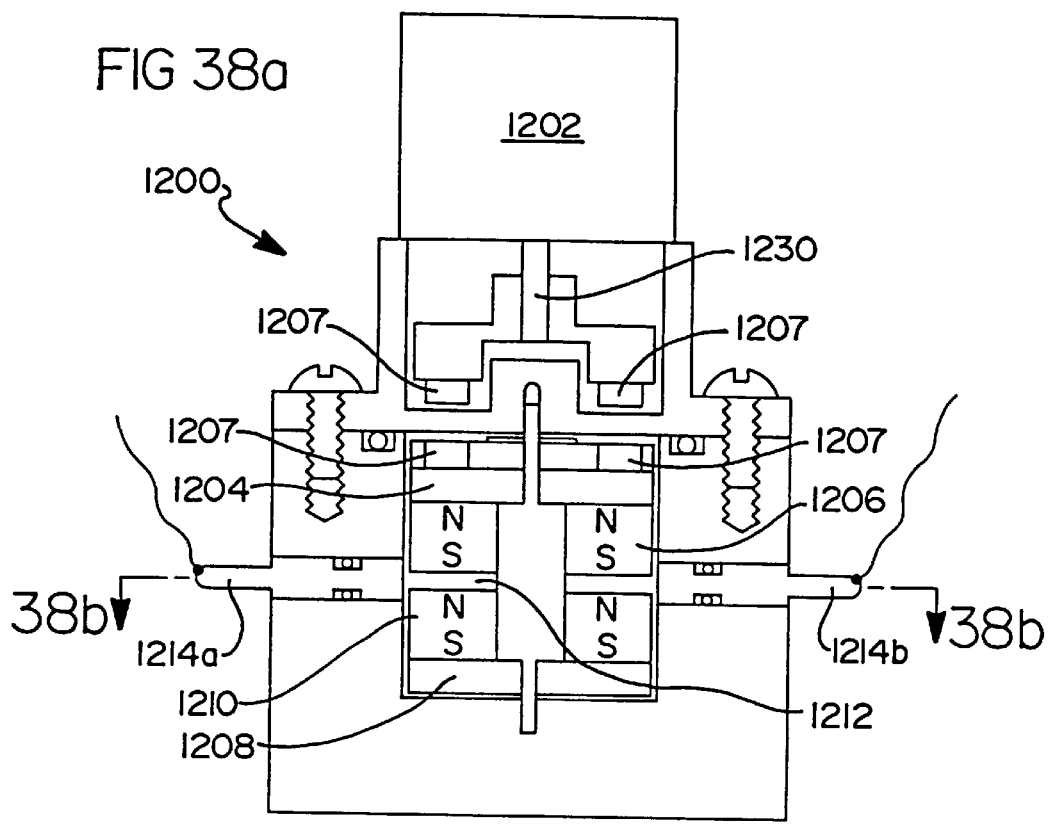
FIGS. 38a and 38b are another alternative preferred embodiment of the flow sensor of the present invention where the rotating magnets are wetted by fluid being measured.
Figure 38B:
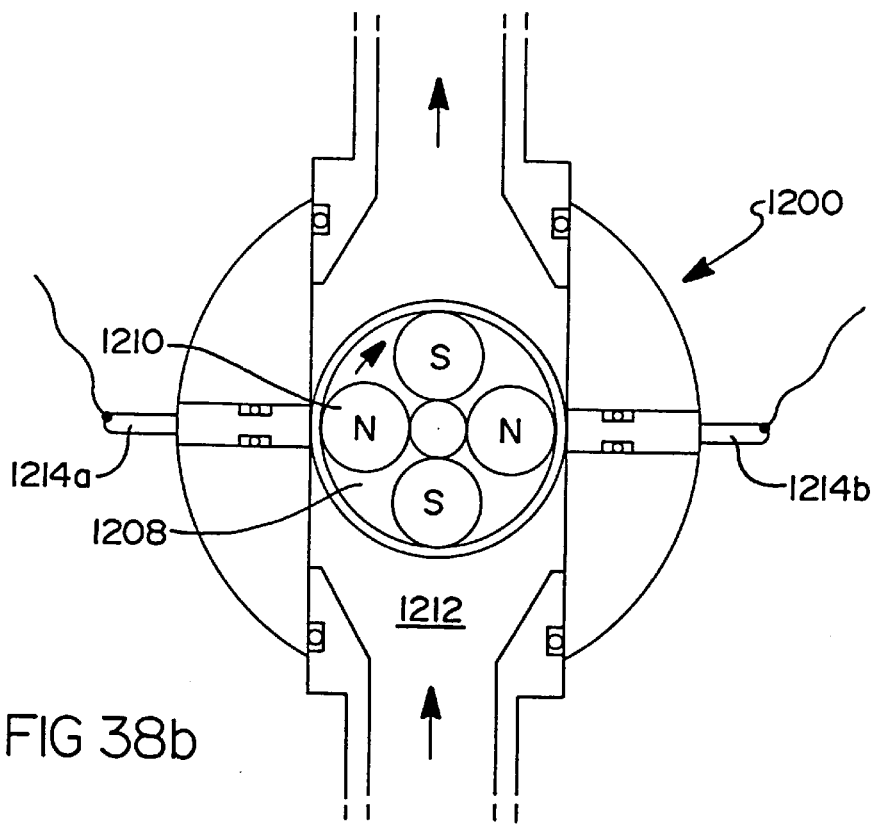

Referring now to FIGS. 38a and 38b, a magnetic flow sensor 1200 in accordance with another alternative preferred embodiment of the present invention is disclosed. With the flow sensor 1200, the rotating magnets are wetted by the fluid being measured. Both single and dual discs and probe arrangements can be made this way. The spaces between the magnets 1206 and 1210 on a magnetic disc can be filled with an inert material to form a smooth cylinder, the entire assembly then being overcoated with a protective coating such as a fluoroplastic (e.g., PTFE) to withstand the fluids' corrosive and/or abrasive effects.

Small coupling magnets 1207 are used to couple the output of the drive motor shaft 1230 to the magnetic assembly. This avoids the need for a shaft seal. The spaces between these magnets 1207 are also preferably filled with an inert material and overcoated as part of the magnetic assembly. When enclosed, the spacing of the magnetic assembly to its housing is preferably small with respect to the areas of the flow passages to facilitate most of the fluid passing through those passages.

The major advantage of this configuration is that the spacing between the magnets 1206 and 1210 can be made much smaller for the same thickness of the flow passage thereby resulting in greater magnetic flux and greater signal output. Furthermore, the fluid differential pressure is imposed on the member separating the drive magnets which can now be made relatively thick to allow for higher pressure and/or temperature operation with relative ease.

Finally, there are applications where the ability to sense flow rates over a very wide range is very important. An example would be a domestic water meter where the range of measurement may vary between a trickle of a tiny stream or over ten gallons per minute. The magnetic flow sensor of the preferred embodiments described herein, and particularly the two disc embodiment described herein, can be easily modified to increase its low flow sensitivity by a factor of two without resorting to reducing the dimensions of the flow channels. This is achieved by routing all of the flow of the fluid through series connected channels rather than through all of the channels at the same time in parallel. FIG. 35b may be used to illustrate the above principal. In the case where the discs are rotated continuously, the flow through both channels must be in the same direction to cancel the rotation induced electrode voltages. The connection between the channels can be internal or external to the device. If the discs 804 and 808 are angularly stepped and then remain stationary during the time when the electrode voltages are being measured, the flow direction is of no factor providing that the signal amplifiers or magnet polarities are adjusted so that the flow generated signals are additive.

It should also be appreciated that the use of multiple magnets can be broadened to include single magnets with multiple pole faces or single magnets attached to one or more magnetic parts which have multiple pole faces. This is particularly applicable to the magnetic couplings used in the motor drives described herein.

Referring to FIG. 39, in one basic form of the magnetic flow sensor invention the electrode signals are amplified, amplitude detected or rectified, and low pass filtered to produce a DC voltage with a magnitude proportional to flow rate. A convenient form of the rectifier is an active type using an Op amp which is ground referenced and driven to cutoff for one half of the signal cycle. An enhanced version of the rectifier using a diode or two Op amps, as in FIG. 26, provides the preferred full wave rectification. Other types of signal detectors such as peak and sample-and-hold types may be similarly employed.

The Op amp, because of various deficiencies, among these being excessive input offset and output saturation voltages and frequency limitations, introduces nonlinearities at low input signal levels. This limits the precision of measurement of the magnetic flow sensor at low flow rates if the ability to measure over a large flow range is desired.

FIG. 39 illustrates a wide dynamic range signal detector which achieves its superior performance by using two switched rectifiers driven by these same signals at different magnitudes and then equalized by signal amplification and attenuation. The upper signal channel provides the output signal for large magnitude input signals while the lower signal channel provides the output signal for the smaller input signals. The rectified signals are switched in and out in response to the magnitude of the input signal in a seamless manner so that a precision flow measurement can be made over a substantially greater flow range than practical with a single detector.

The input signal, which may be from less than a millivolt to several volts peak-to-peak in magnitude, is full wave rectified by the circuit composed of the upper half of dual Op amp 1301, resistors 1302 and 1303 and diode 1304. The resultant signal is buffered by the upper half of dual Op amp 1305 and supplies transistor 1306 and the low pass filter consisting of resistor 1307 and capacitor 1308. The resultant smoothed DC voltage enters the positive input of the upper half of the dual Op amp 1309 and is compared against its negative input voltage derived from the voltage divider consisting of resistors 1310 and 1311. When the input signal is large enough to cause the upper half of Op amp 1309 to have a high output, transistor 1306, acting as a switch, is driven into its conducting state and conveys the rectified signal to the low pass filter consisting of resistor 1312 and capacitor 1313, which provides the output signal. At the same time transistor 1314, which is also connected to resistor 1312, is switched to its nonconducting state because of the inverting action of the lower Op amp of 1309 so that the signal which would otherwise pass through it has no affect on the output. In this way only one of the two signal paths to the output is connected at one time.

For low level signals Op amp 1315, in conjunction with resistors 1318 and 1319, provides signal amplification, thereby boosting the signal magnitude and enabling the lower rectifier consisting of the lower half of Op amp 1301, resistors 1320 and 1321 and diode 1322 to operate with greater precision and/or extend the operating range of the sensor.

The voltage divider formed by resistors 1316, 1317 and 1318 attenuates the rectified signal of the lower half of Op amp 1305 by the amplification factor of the Op amp 1315 so that the singles from both rectifiers are virtually identical when switching takes place. Although two switchable signal channels are illustrated, additional channels may be similarly added to further extend signal level operating range and/or improve rectification precision.

Referring to FIG. 40, most of the previous illustrations of the magnetic flow sensor invention, for example FIG. 35b, show two (2) flow passages acted upon by the magnets of one or two rotating discs. The passages are electrically connected by the fluid or a third electrode. FIG. 40a also illustrates such an example where reference numeral 1401 represents the flow passages, 1402 denotes the path between the electrodes and 1403 denotes the electrodes. A sectional view in accordance with section line A—A is illustrated in FIG. 40c. While such an arrangement is practical and capable of good results, it should be recognized that when the magnetic flux is generally confined to a narrow area around the signal generating passage between the electrodes, there may be significant attenuation of the signal due to shunting by the surrounding fluid.

By making the passages relatively long as shown in the center section FIG. 40c, the electrically insulating walls of the flow passages act as a barrier between the passages to reduce the shunting effect of the surrounding fluid. This approach is taken further in FIGS. 40b and 40d with four flow passages. The number of passages may be increased and the magnetic flux further concentrated over the signal generating passage to further reduce output signal attenuation. It is also noted that for the same fluid pressure drop, the use of multiple parallel flow passages as in FIGS. 40b and 40d will generally enable the opposing magnets to be placed closer to each other in a dual disc configuration or closer to the flow passages in a single disc configuration, thereby increasing the flux through the flow passages for greater signal output and/or mechanical stability of the flow passages.

FIGS. 6, 12 and 13, illustrate examples of the use of stepper motors to physically relocate and thereby alternate the magnetic flux polarity of the permanent magnets and avoid electrode polarization and the performance degrading effects thereof. They are typically illustrated with a single or dual disc assembly with each disc mounting four alternating polarity magnets and driven by a 90° stepping motor whereby one or the other polarity of magnetic flux is almost always engaging the one or more flow passages.

The flow related signal path is normally disabled during the interval of the motor pulse and for a short time thereafter to prevent the related electrical noise from influencing the flow measurement signal. However with careful design taking into account the common mode rejection of balanced input amplifiers and low pass filtering, the disabling circuitry may sometimes be unnecessary and therefore omitted. An example of a general purpose electronic circuit which can be used with continuous and stepped motors is illustrated in FIG. 41.

Figure 41:
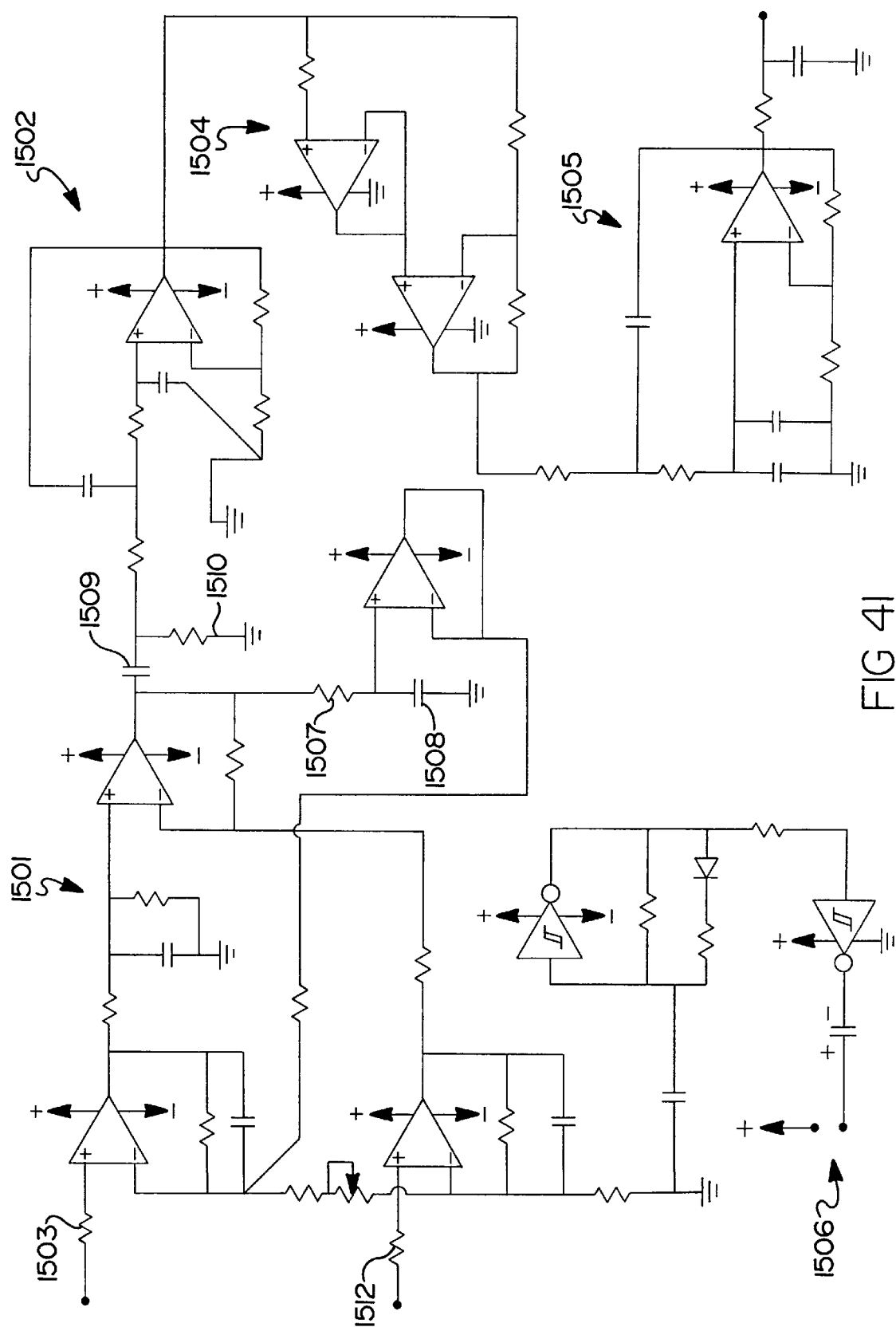
FIGS. 41–43 illustrate a simplified electrical schematics of various signal processing circuits embodied in the present invention.

In FIG. 41 the electrode signals are amplified by amplifier 1501, essentially a three Op amp instrumentation amplifier which additionally incorporates a passive low pass filter consisting of resistor 1507 and capacitor 1508 to provide negative feedback to one of the input Op amps for DC stabilization. The fourth Op amp in the group optionally provides buffering of the feedback signal which is useful for avoiding large low pass filter component values. This circuit enables the electrodes to be connected directly to the inputs of the Op amps without any signal attenuating shunting impedances as the electrolytically produced voltage offsets between the fluid and electrode surfaces will be sufficiently compensated by the feedback circuit to maintain the signals being processed within the linear operating range of the amplifiers. A magnetic flow sensor equipped with such an amplifier is less subject to measurement error because of low fluid conductivity. Resistors 1503 and 1512 are current limiting resistors to protect the front end of the amplifiers from electrical damage.

The output signal from the amplifier 1501 passes through capacitor 1509 which, in conjunction with resistor 1510, removes the DC component of the signal leaving only its AC component referenced to ground with a magnitude representative of flow rate, to enter the active filter 1502. This filter removes noise and buffers the signal for processing by the full-wave detector 1504. The detected signal is smoothed to provide a low ripple DC and amplified for output usage by the active filter 1505. A trimmer network may be added to either of the active filters or the detector to remove any residual DC offset from zero in the absence of a flow related signal. The stepper motor drive 1506 provides the pulses to rotate a stepper motor when used.

Figure 42:
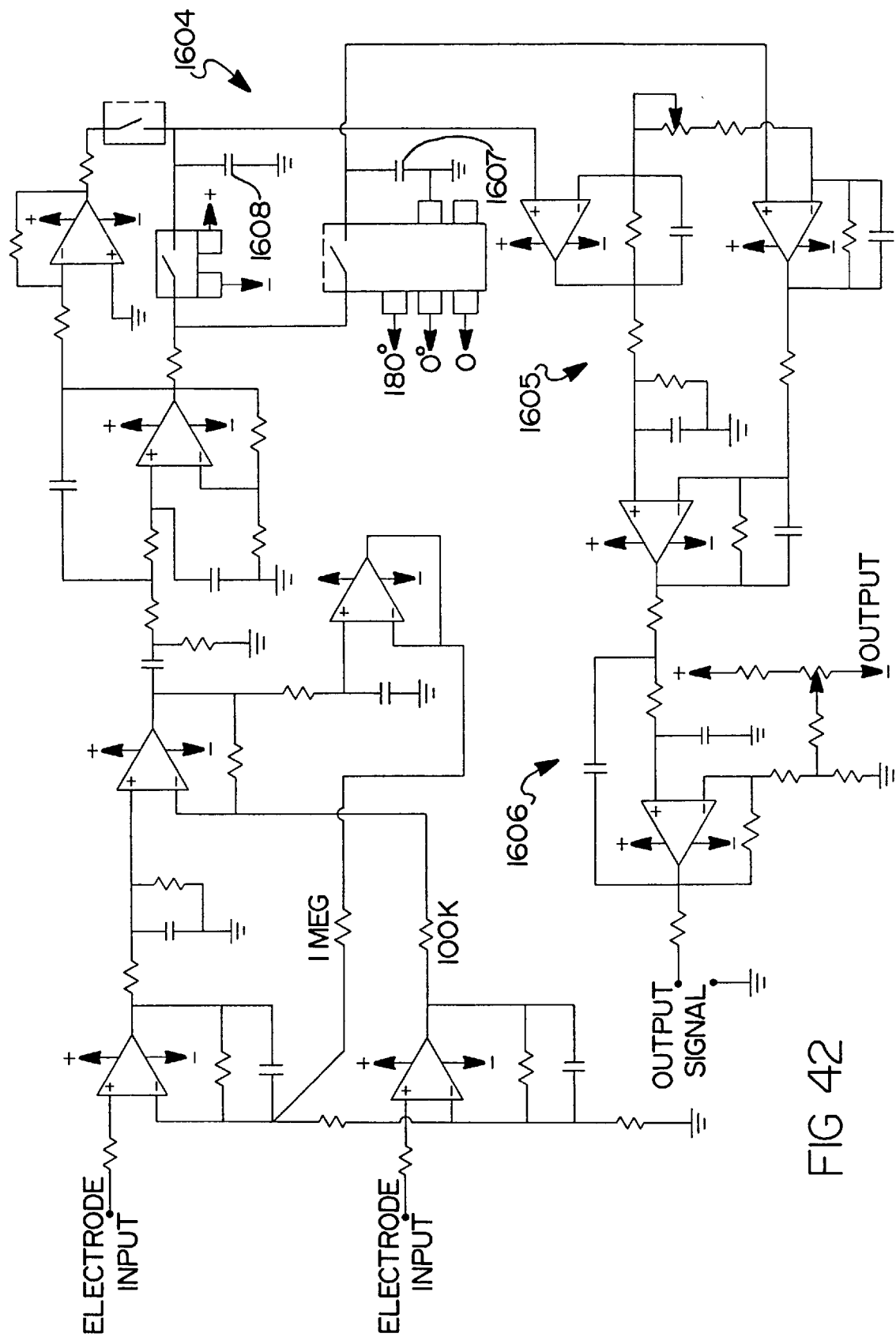
Figure 43:
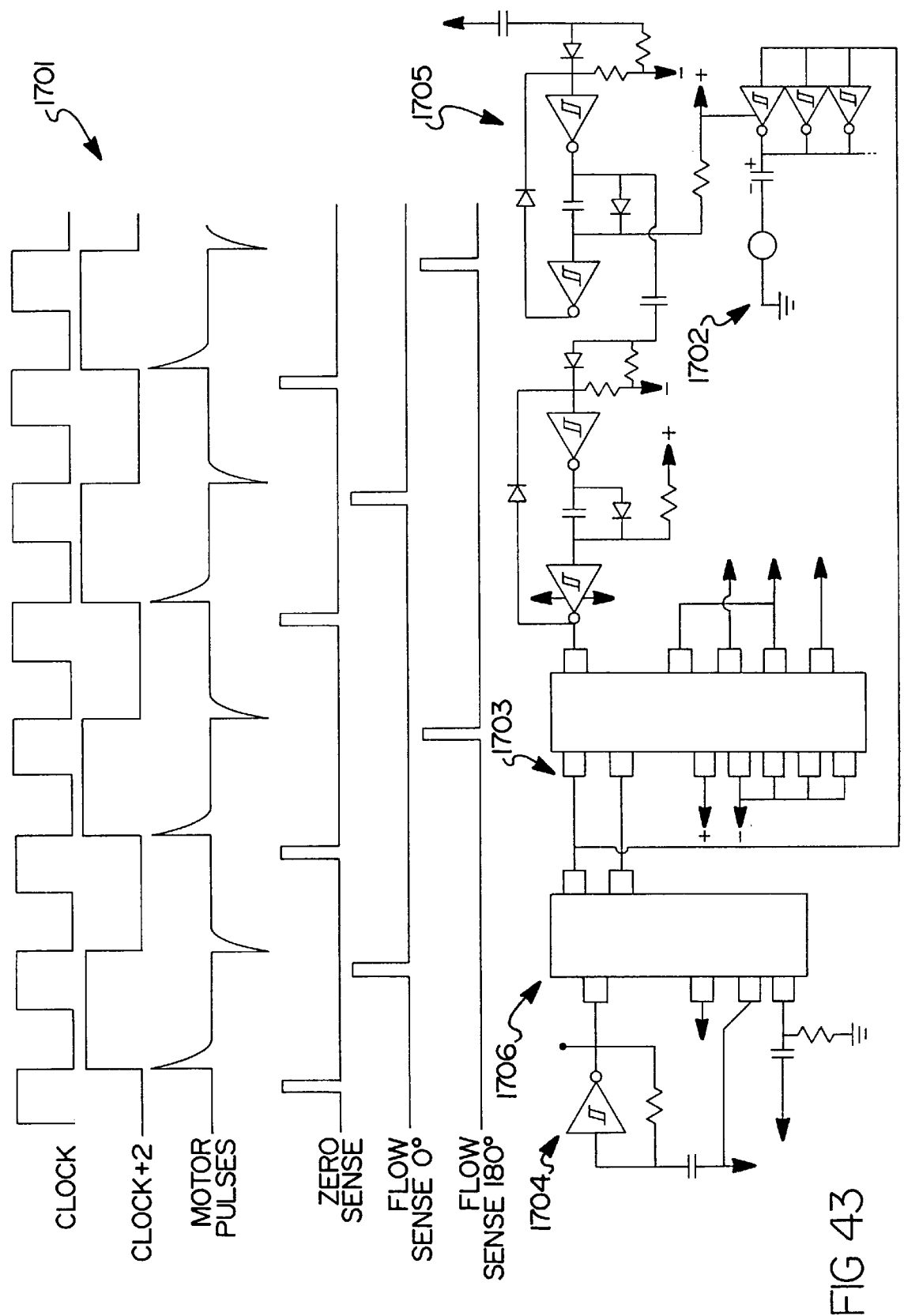

A more elaborate signal processing circuit providing for a combination of peak detection, sample and hold and stepper operation is illustrated in FIGS. 42 and 43.

As an example, a stepper motor is used whereby the motor steps in intermediate 45 degree segments rather than 90 degree segments typical of rotating a disc with four magnets. Any signal produced when the magnets are positioned midway between the 90 degree locations then is representative of zero flow rate. Such a signal can be typically detected with a sample-and-hold circuit and provides a dynamic zero reference for the flow signals when the magnetic flux does engage the flow passages. This is an alternative approach to the DC blocking capacitor 1509 and resistor 1510 of FIG. 41, and can improve the calibration stability, speed of response and noise immunity of the flow sensor.

In FIG. 42, the initial signal amplifying and processing circuits are like that of the same components of FIG. 41 up to the inverter 1603. The inverter 1603 signal and that of the direct signal enter the sample-and-hold circuit 1604, which sequentially switches the flow related signals to their charge storage capacitors. Thus, the signals corresponding to a magnetic flux orientation midway between the 90 degree locations charges capacitor 1607. Those corresponding to a magnetic flux orientation aligned with the flow passages to produce the maximum flow related signals charge capacitor 1608. The voltages on the two capacitors are then compared in the differential amplifier 1605 and the difference is amplified and routed to active filter 1606 for final smoothing and output. Using this basic approach, fully balanced and phase sensitive output responsive signals can be derived with complementary circuits enabling flow direction to be determined.

The control signals for the sample and hold circuit may be derived several ways using, for example, conventional logic circuits and digital processors. FIG. 43 illustrates a representative timing waveform 1701 and circuit example. The clock 1704 signal is frequency divided by factors of two and four by the binary divider 1706, which then inputs the multiplexer 1703 to route the control signals. The input signal into the multiplexer is synchronized with the stepper motor driver 1702 and time delayed by the one shot multivibrators 1705 so that the control pulses appear just before the stepper motor pulses are produced. This minimizes any error due to motor circuit noise and allows maximum settling of the signal amplifiers and related circuits. The 0° and 180° sense signals are connected to the corresponding input control ports of the sample-and-hold circuit 1604.

The binary divider has a reset function so that if in a particular application a phasing ambiguity exists between the position of the magnets with relation to the flow passages and the timing of the sample-and-hold circuit 1604, they may be automatically synchronized from a pulse produced for example, by photoelectric or magnetic means which senses the position of the flow sensing magnets. An alternate means is also provided then to determine flow direction if such an ambiguity exists.

As stated previously, the periodic reversal of the magnetic polarity is normally required to prevent electrode polarization and the resultant measurement inaccuracies. However, under certain flow conditions, for example, when flow occurs occasionally or only in short pulses, the electrode signals produced at zero flow rate for example, may be used as a reference and polarization affects may proceed slowly enough to enable such a flow sensor to be practical. This is particularly so with respect to the magnetic flow sensor configuration, as in FIG. 1, where closely spaced opposing magnets establish an intense magnetic field in the flow tubes. A relatively high signal magnitude is generated by the flow streams which then reduces the overall affect of any of the factors which introduce measurement error.

In its simplest form, a basic DC differential amplifier with an offset adjustment to zero its output at zero flow rate connected to the electrodes can be used to amplify the signal. The circuit in FIG. 41 could be used if the RC time constants were long enough compared to the flow modulation period. Alternatively, a sample-and-hold circuit incorporating the circuit principles of FIGS. 42 and 43, and responsive to the peak flow rate of each modulation cycle, would ideally be employed.

In one such application the electrode signals would be DC amplified whereby the DC zero drifts are corrected, the zero reference electrode signals for such correction being generated and sensed with a sample and hold circuit when orientation of the magnetic flux through the flow passage is changed from its maximum flow signal generating position to its minimum flow signal generating position. In a typical example, four alternating flux polarity magnets are used on each rotating disc whereby a 90° disc rotation reverses the polarity of the flux through the flow passage, either flux orientation producing a maximum flow related electrode signal but of opposite polarity. An intermediate rotation of 45° produces a zero flow generated signal at the electrodes and is the zero reference position whereby the signal is sampled and held as a reference signal to be compared against by the electrode signals produced when the electrodes are generating maximum flow related signals. The zero reference sampling can be performed rapidly so that most of the time the electrodes are producing maximum flow related signals which may also be sampled and stored during the interval when zero reference sampling is occurring.

With the use of high input resistance amplifiers to amplify the electrode signals, electrode polarization proceeds very slowly and only a relatively infrequent repositioning, for example once every few seconds to several minutes or even longer, of the flux to detect the zero signal is required. Furthermore, the polarity of the flux through the flow passage need not alternate since DC drifts can be automatically compensated. For the example, a rotation of only 45° total is required as in 0° to 45° and back to 0°. As a result, motor power consumption can be significantly lowered and the flow sensor can respond most of the time to the actual fluid flow rate. Since the electrode signal drifts generally diminish over a period of time the frequency of reestablishing the zero reference voltage can similarly diminish, thereby providing the advantage of reducing power consumption even further.

In another example, a magnet may be mechanically moved to enable its flux to engage the flow passage so that electrode signals with a magnitude corresponding to the fluid flow rate through the passage are detected whereby periodically, the magnet is relocated so that its flux does not engage the flow passage so that a reference signal corresponding to zero flow rate can be obtained. When the flux engages the flow passage the electrode signals are detected with a sample and hold circuit so that a signal representative of the most recent measurement of flow rate is available during the interval when the magnetic flux is not engaging the passage. When the magnet is moved so that its flux does not engage the passage, this corresponding to zero flow rate as no electrode signal should then be generated, the electrode signals are detected with another sample and hold circuit which stores the most recent measurement as a reference signal. It is not necessary to alternate the polarity of the magnetic flux and the final output signal from the flow sensor is typically the result of the flow related and reference signals interacting in a differential amplifier whereby the electrode drifts are compensated. Of particular note in this example is that since there are intervals of time when no magnetic flux enters the flow passage, magnetic debris attracted from the fluid and retained on the sensor flow passage can be easily flushed away by the fluid flow. Furthermore, multiple magnets as arranged in FIGS. 5 and 6 for example, may be used to increase the magnetic flux through the flow passage and to confine the flux as may be used. It should also be noted that the means for mechanically moving the magnet or magnets are not confined to a continuously rotating disc but also include oscillating and incrementally stepped and latched means and that all of the means are further not limited to the rotation axis. Of note is that one of the upper and its corresponding lower magnets 3 and 17 could be replaced with a bar of magnetic material such as soft iron to reduce the air gap and complete the magnetic circuit if a partial rotation were employed. The frequency of reestablishing the zero flow reference signal may also be varied to conserve power.

Magnetic flow sensors as in the probe configuration of FIG. 1, for example, may conveniently be used for flow rate measurement in open channels or even in open bodies of fluids such as lakes, rivers and oceans. Flow direction indication, when it is either in one direction or the opposite direction, can be obtained from the polarity of the flow rate related signals when they are phase detected for example with reference to the physical orientation of the signal generating magnets.

To satisfy applications which require flow rate and direction measurement in any direction in a horizontal plane, two of the above probes each with its own electronics for phase detected signals, when orthogonally oriented, will together enable the computation of the resultant flow rate and direction. The two probes including electronics may be combined into a single unit where the flow sensing components of one of them is located on top of the other and they are angularly offset from one another by 90°.

FIG. 44*a* illustrates a way of combining both probes to reduce the number of components and the overall size. It shows in central vertical section, the major components of such a device which conforms closely to previously disclosed functional configurations with the exception that the central section of signal generating magnets 1806 is mechanically restrained in a rotatable retainer and that its flux contribution is to both the upper and lower flow measurement passages. These magnets are an intermediary in rotationally slaving the upper disc 1803 to the lower one 1805 and provide additional flux to produce larger flow related signals. The two electrodes 1802 and 1810 used for the upper flow sensor portion are also shown. The two electrodes 1811 and 1812 used for the lower flow sensor portion are not shown in this figure but in FIG. 44*b*, and would typically by fabricated longer to reach to the lower flow passages for the configuration illustrated. In another configuration more typical of a flow probe, both sets of electrodes would be the same size and horizontally access their respective flow passages rather than enter from the top.

The electrodes shown in FIG. 44*a* typically have wired connectors as shown or plug into connectors on an electronic circuit board which provides the signal processing. The motor 1801 for rotating the discs is located above with the signal processing electronics. It could alternately be mounted below with possible reduced electrical noise or other advantages. The electrodes may use O-rings for sealing.

However, other sealing methods such as adhesives and insert molding, for example, are also possible.

FIG. 44*b* illustrates a horizontal section of the sensor in accordance with section line A—A in FIG. 44*a* through the center of the upper flow passage when looking down. The dotted lines other than those corresponding to the magnets, show the orthogonal relationship of the upper and lower flow passages 1807 and 1804, and all four electrodes. Fluid flow can only enter and leave the sensor through these passages. Since the flow rate through the passages varies with the angle of the flow to the passages, the angle of flow to the sensor can be computed by vector analysis of the relative magnitudes of the signals from both channels. The phase detector in determining flow direction resolves any directional ambiguity.

The opposing electrodes have a well defined signal channel between them over which the flow related signal is generated. Because of the flow passage walls and somewhat internal location of the electrodes, the shunting affect of the surrounding fluid is relatively low and consequently signal attenuation is minimal. However, the flow restriction due to confined flow passages can be significant and reduce the magnitude of the available signal, and introduce nonlinear response i0 particularly at high flow rates. This nonlinearity would typically take the form of increasing rate of signal compression with increasing flow rate and may be compensated to a certain extent by funneling the inlet and/or outlet of the flow passages. The nonlinearity characteristic could also be used to advantage by increasing the range of operation of the instrument so that it could provide usable data at much higher flow rates than otherwise possible.

FIG. 45*a* illustrates another form of the sensor in vertical cross section where the flow passages are opened to permit flow in any direction through the sensor. The signal processing electronics, some of the major components, motor drive and general operation correspond to that of FIGS. 44*a* and 44*b*. FIG. 45*b* illustrates a horizontal section of the sensor looking down.

In this embodiment, however, only 2 discs, each with their four magnets, are used. The signals from opposite electrodes determine the flow rate of the fluid flowing orthogonally between them. For example, the left and right electrodes would produce a flow related signal for flows through the flow passage which is in and out of the paper as in FIG. 45*a* or up and down as in FIG. 45*b*. The other two electrodes produce a flow related signal when the flow is horizontal.

When the fluid flow is angled with respect to the orthogonal flow passages described above, vector components of the flow produce flow related signals at both sets of electrodes from which the flow rate and angle relative to the sensor can be computed. The phase detector, in determining flow direction, resolves any directional ambiguity.

While the relatively open flow passages offer less restriction to the flow, the signal shunting affect of the surrounding fluid is relatively high. The electrodes are covered with an electrical insulation 1913 over their exposed area which is not active in producing a flow related signal to minimize this shunting affect.

The flow passage, not having connecting walls between the upper and lower sections as in that of FIG. 44, is more subject to distortion and calibration instability due to related dimensional changes, particularly the affects of liquid pressures. The four centrally positioned segments 1914 join the upper and lower surfaces of the flow passage to minimize this problem. The separation into four segments, if they are electrically insulating, is desired to optimize the signal path between the opposing electrodes.

Alternatively, the flow passages may be partially enclosed and the center location fitted with a conductive electrode. This electrode may be common to both sets of the out flow sensing electrodes and even serve as a ground reference in place of or in addition to another ground to the liquid which is normally used. This arrangement is convenient, as in FIG. 15, for a shaft through a hollow center electrode to mechanically support the attractive forces between the magnets and thereby relieve the bearings of the need to do so.

Basic magnet flow sensors in the probe configuration, as in FIG. 1, though convenient to use and relatively inexpensive, inherently suffer from low measurement precision because they sense flow rate at only one point in the cross section of a pipe and as such do not account for the bulk of the flow which may be traveling at a different rate. Full bore flow sensors sense the entire quantity of the fluid passing through them and, while more precise, are typically much more expensive. However, by enlarging a probe sensor so that it senses flow rate over a relatively large part of the pipe, its precision can be dramatically improved.

A typically configured full bore sensor has its electrodes diametrically opposed with the flow and flux being mutually orthogonal. While it would likely be impractical to duplicate this with a probe in large pipe sizes, a probe sensing across essentially a chord of significant size and at optimum depth with respect to the pipe diameter could remove some of the inherent probe limitations. When more than one are used with their output signals being averaged performance approaching that of full bore sensors may be obtained.

Although large permanent magnets may be used to build large flow probes there is a practical limit imposed by the constraints of size, weight and cost which generally limit the magnets to the smaller sizes. While several smaller magnets must obviously be used to replace a larger one, it is noted that the more efficient use of the smaller magnets may advantageously provide the desired performance, low cost and economy. This is because the magnetic flux is required primarily to be concentrated around the chord spanning the electrodes. Locating the small magnets close to and in physical alignment with the chord so that they have the same flux polarity surrounding the chord will enable a net electrode signal to be produced which sums the contribution from each magnet. Such an arrangement is exemplified with the disc and four magnet embodiment illustrated in FIG. 46.

Figure 46A:
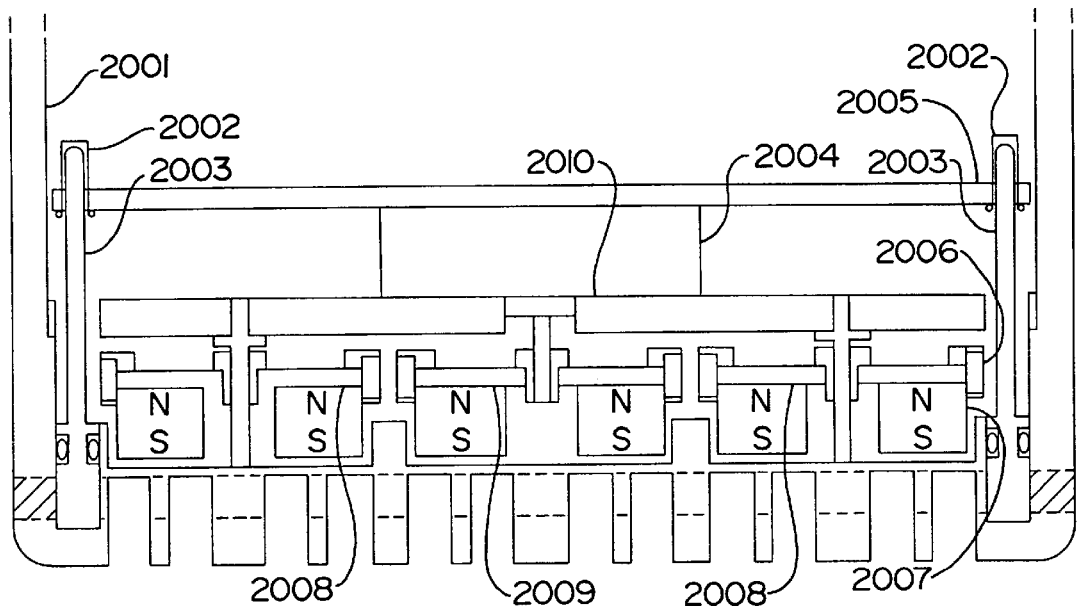
FIG. 46 illustrates another preferred embodiment of the invention in the probe form.
Figure 46B:
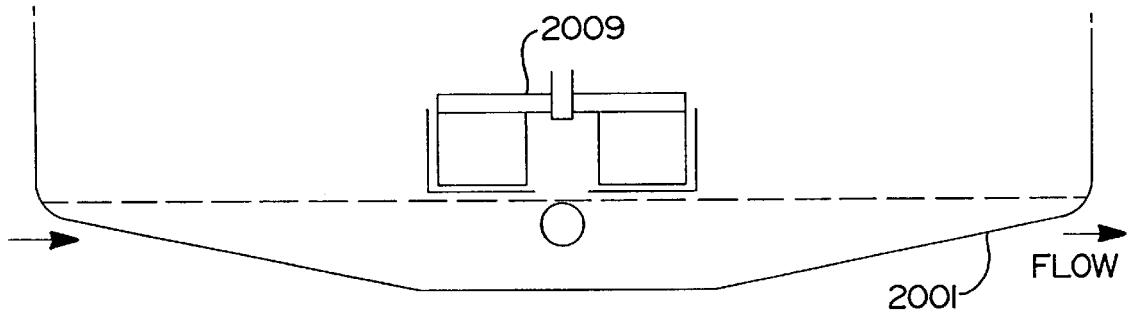
Figure 46C:
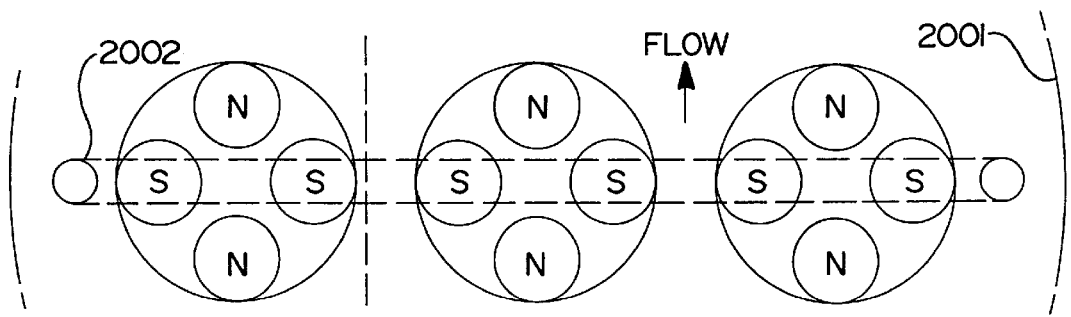

FIGS. 46*a*, 46*b* and 46*c* illustrate three views of a preferred embodiment in a large flow probe. In FIG. 46*a* the major components are shown in central section across the flow passages. The housing 2001 encloses the entire assembly consisting of the signal amplifying and processing circuit board 2005 with electrode connection sockets 2002, motor mount 2010 with motor 2004, electrode 2003, driven disc 2009, slave disc 2008, sensing magnets 2007 and drive magnets 2006. With aggressive miniaturization, the electronic circuits may be located on the motor mount 2010 and dimension reductions introduced to reduce the height of the active portion of the probe so that it minimally disturbs the surrounding flow and causes the lowest pressure drop.

The two electrodes 2003 are joined by a conductive path between them typically provided by the fluid being measured. This path is at right angles to the flow passages. Multiple flow passages are used to mechanically stabilize the housing so that it does not distort due to the liquid pressure on it and to reduce the shunting affect of the surrounding liquid on the signal. Discs like that of 2008 and 2009, with magnets 2007 located below the flow passages as in FIG. 1, could be added to increase the level of the output signal and further resist mechanical distortion, at the expense of greater complexity and greater risk of trash accumulation in the flow passages.

The outer slave discs 2008 are conveniently acted upon by magnets 2006 located on them and on the driven disc 2009, as in FIG. 37, to cause them to rotate so that all of the sensing magnets 2007 are lined up with the same polarity at the same time, thereby making the generated voltages additive.

In the magnetic drive method small peripheral magnets, large enough to dominate the stray flux of the sensing magnets, couple the rotational forces from the driven to the slave discs. The discs rotate in a synchronized manner so that the same polarity end of the magnets face the conductive passage between the electrodes at the same time. Mechanical gears could of course be used instead. The number of discs may be increased by locating the new ones in close proximity to and in line with the existing slave discs.

FIG. 46*b* shows a partial view of the probe rotated to its side where the flow is from left to right. The conductive passage typically occupied by the active fluid exists between the electrodes and approximates the location of the sensing chord. The profile of the flow passage walls can be sloped as shown to self clear debris.

FIG. 46*c* shows a view of the sensor from the bottom. The alignment of the magnet poles with the electrodes and the short flux return path to the opposite polarity poles is apparent.

The large probe sensors may be mounted on pipes with fittings as in the manner of conventional probes. They may also be mounted directly into pipe tees and crosses, for example, where the housing uses an O-ring between the two for sealing. Other possibilities include a special spool section with alignment provisions to enable interchangeability while maintaining high precision and calibration.

The low electrical noise produced within a magnetic flow sensor using the technologies described herein permits relatively small flow related electrode signals to be greatly amplified and processed to indicate flow rate. A problem arises, however, when the same sensor is required to respond accurately to both high and low flow rates. In this instance the signal detector must linearly respond over the full flow sensing range but, because of practical device limitations, does not do so.

For small signals corresponding to low flow rates, detector circuits as in FIG. 41 become nonlinear because of offset voltages at the Op amp input and output with respect to ground. In FIGS. 42 and 43, the linearity is improved with the use of a sample-and-hold circuit. Linearity is also improved with the technique relating to the embodiment of FIG. 39, which provides additional signal amplification for smaller signals so that the detector imperfections produce relatively less error.

Figure 47:
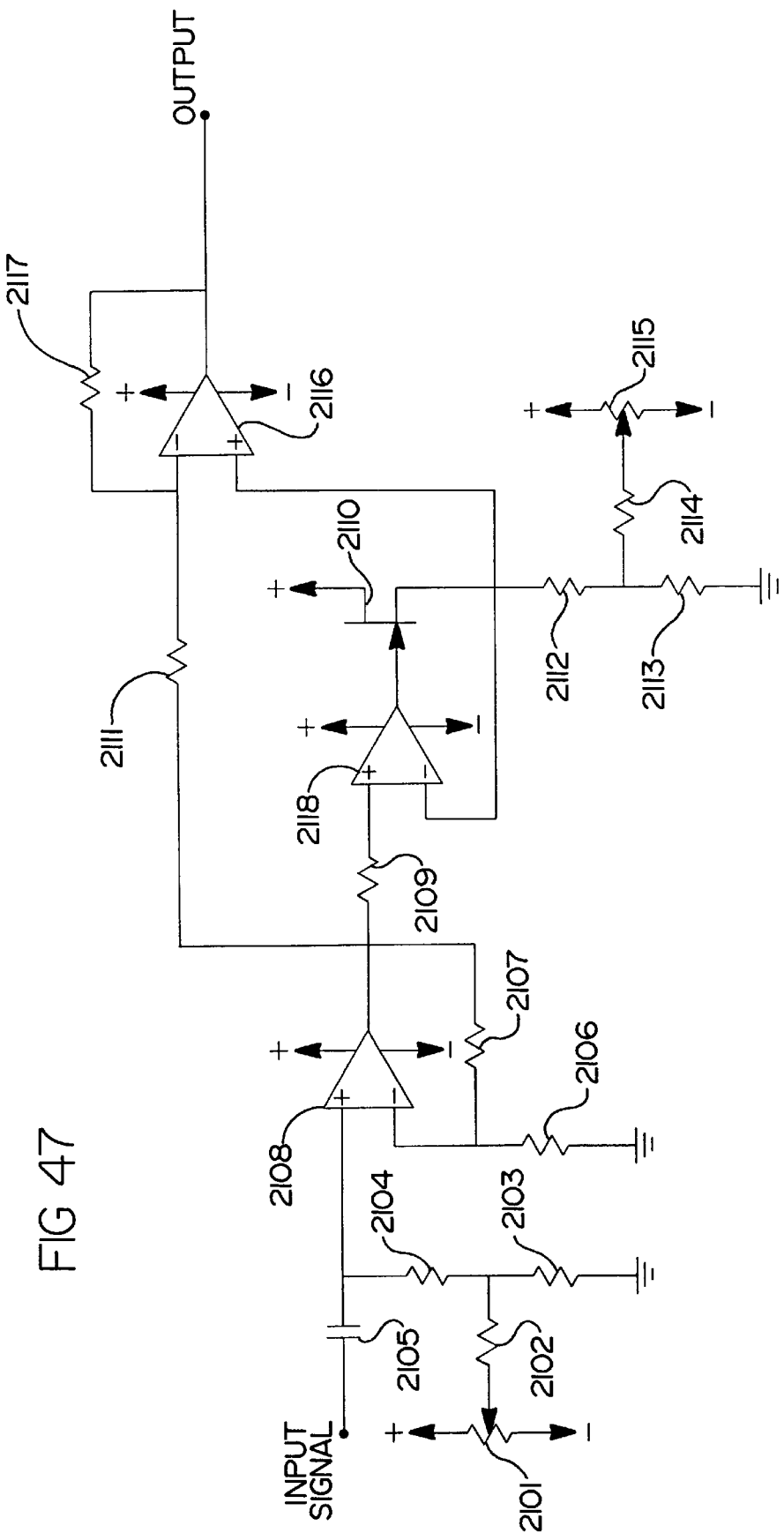
FIG. 47 illustrates another simplified electrical schematic of a very wide range signal detector.

FIG. 47 illustrates the circuit of a relatively simple full wave signal detector with inherently very wide dynamic range. The DC component of the input signal is removed by capacitor 2105 and the resistive network of resistors 2101, 2102, 2103 and 2104. Resistor 2101 provides an adjustment of the DC operating point of Op amp 2108 above ground while its gain is set by the resistances 2106 and 2107. Op amp 2108 could be part of a previous signal filter.

The output of Op amp 2108 drives resistors 2109 and 2111. The value of resistor 2117 typically equals that of resistor 2111, whereby Op amp 2116 acts as either an inverter or follower with an output equal to that produced by the Op amp 2118, transistor 2110 follower combination. Resistor 2109 is a protective current limiting resistor.

The voltage at the top of resistor 2112 must follow the positive half of the signal while the negative half disappears because resistor 2113 is referenced to ground so that transistor 2110 is at cut off. This positive signal half into the Op amp 2116 positive input produces a positive half of the signal at the Op amp 2116 output even though the same signal is imposed on resistor 2111. An examination of the circuit operation reveals that the voltage divider action of resistor 2111 and resistor 2117, in conjunction with the offset trimming provided by resistors 2114 and 2115, establishes a difference voltage at the negative input of Op amp 2116 which forces Op amp 2116 to act as a follower. When the negative half of the signal appears at the output of Op amp 2108, the output from transistor 2110 into Op amp 2116 is at ground potential and Op amp 2116 operates as an inverter providing a positive going signal so that a full wave rectified output signal is produced.

The combined adjustments of resistors 2101 and 2115 can compensate for all of the offsets of the input voltages and output saturation voltages of the Op amps so that the output signal from Op amp 2116 exhibits good balance and low distortion even with very small signals. This output signal may have its zero offset from ground, and an output zero adjustment typically incorporated as part of an output low pass filter/amplifier would be used to trim it to zero.

Several figures such as 12, 13, and 21–25 already describe applicable stepper motor drives for the discs mounting the flow sensing magnets. The motor drive configuration of FIG. 48 is yet another drive method which is applicable to single, dual and multiple disc sensing configurations.

FIGS. 48*a* and 48*b* illustrate in simplified form and as an example, the major elements, in cross section, of an insertion probe type magnetic flow sensor using a single disc. The stem 2201 is attached to the body 2203 and sealed with O-ring seal 2202. The body 2203 contains four electromagnets 2204 mounted on a magnetic disc 2216 with pole pieces 2218. The magnets are connected so that when energized, the adjacent pole pieces 2218 exhibit opposite polarity.

Just below the pole pieces 2218 is the rotating disc 2217 with attached permanent magnets 2206. The rotating disc 2217 has holes or, alternatively, slots under each magnet 2206 so that some of the flux from each magnet 2206 can be acted upon by the flux from the nearby pole pieces 2218 of the electromagnets 2204. The above arrangement may be modified, for example, by eliminating the holes or slots and using additional permanent magnets 507a as in FIGS. 21–25 either to the side of or directly under the pole pieces.

The electromagnet coils 2204 are energized with alternating current pulses. A force of repulsion between the magnets then exists which causes the lower disc 2217 to rotate 90 degrees where attractive forces will again be established. When the coils are energized again with the next pulse, but this time of the opposite polarity, the lower disc 2217 rotates in the same direction another 90 degrees and so forth.

With the alternating flux polarities of the adjacent magnets 2206, the disc 2217, being mounted on a low friction bearing system 2205, will rotate to position itself where the electromagnet pole pieces 2218 are in coaxial alignment with the magnets 2216. When they are in perfect alignment, electrical current to the electromagnets 2204 produce magnetic flux of a polarity to cause repulsive forces between the electromagnets 2204 and the permanent magnets 2206 will not cause disc 2217 rotation. However, by angularly offsetting disc 2217 at all of its four stationary positions, rotation in one direction is readily produced. This angular offset is provided by one or more magnetic bias plugs 2208 which produce the required disc 2217 rotation to assure reliable and efficient operation. The electromagnets 2204 and pole pieces 2218 are angularly offset a small amount with respect to the flow channels 2207 so that the permanent magnets will be in perfect alignment with the flow passages. In the example shown, the fluid flow is into the paper through the four flow passages 2207. The fluid fills the openings in the passages between the electrodes 2209, thereby providing a direct path between the electrodes.

Although stepper motor drives are satisfactory for many of the magnetic flow sensor applications they are limited to the slower speed rotational rates. This is because they must come to a rest, or nearly so, at a starting position which has the proper rotational offset before another stepping pulse can be applied. However, with the use of a Hall effect sensor, magnetic reed switch or photoelectric sensor for example, which detects the position of the disc 2217 so that it can control timing and polarity of the pulses through coils 2204, the stepper motors just described, as well as many others, may be used as linear motors and efficiently produce a smooth, continuous rotation. The motor speed can be controlled so that as it attempts to increase beyond a preset amount, the increase is detected and activates a pulse width or magnitude controller to substantially reduce the pulse energy level to maintain the desired speed. A particular advantage of such use of stepper motors for the magnetic flow sensors described herein is that for low power operation, when largely unpowered as in a no flow standby condition to conserve battery power, they can always be relied upon to assume a stable position in which the flow sensing magnets are automatically aligned over the flow passages. In this manner the beginning of flow can be detected so that full power may then be automatically supplied to the sensor for normal operation.

FIG. 48c illustrates the block diagram of another type of electronic controller which can be used to operate stepper motors, for example, the one described in FIGS. 48a and 48b, as linear motors. From a stationary starting position the pulse generator 2212 supplies the motor coils 2119 with relatively low repetition rate, short duration, high energy pulses of both polarities. Starting from a random state, one polarity of pulse will produce magnetic flux which will cause an attraction between the permanent and electromagnets and will not produce disc 2217 rotation while the other pulse polarity will produce rotation. However, after the completion of the first 90 degree rotation of disc 2217, the flux from the permanent magnets 2206 induces into the electromagnets 2204 a voltage signal which the pulse detector 2213 then uses to trigger the pulse generator 2212 to produce another high energy pulse to advance the disc another 90° and so forth. The pulse detector 2213 is inhibited from responding to the pulses used to produce rotation. It responds only to the magnetically induced signals corresponding to the passage of the magnetic flux through the coils 2204 after each 90° rotation has been completed.

The output from the pulse detector 2213 is also used by the pulse-to-DC converter 2214 to produce a DC level corresponding to the frequency of the pulses and therefore to the speed of rotation. This level is compared in the difference detector 2215 to a preset voltage level. The difference between the levels is used as an error feedback signal to control the power regulator 2211 which regulates the energy of the pulses to the electromagnets 2204. This becomes a feedback control circuit for controlling the speed of rotation.

During the duration of the pulse from the pulse generator 2212, and for a short period of time thereafter to allow any ringing in the coils to dissipate to a low value, the pulse detector 2213 is disabled. When enabled thereafter, it would be receptive to alternately positive and negative pulses, the polarity of which would be determined by the preceding pulse polarity from the pulse generator 2212.

With a single pulse of sufficient energy to rotate the disc more than 45 degrees from a stationary starting position, the rotating disc 2217 will continue to rotate beyond 90 degrees because of mechanical inertia. As the disc 2217 approaches 90 degrees and significant magnetic flux from the permanent magnets 2206 begins to link the coils, a coil signal will begin to build up in magnitude. When the coils 2204 are directly over the magnets 2206, the signal will drop to zero and then build up again in the opposite polarity as the disc 2217 overshoots because of the inertia, before dropping off as the magnets move further away from the coils. This opposite polarity signal will then be used to trigger the pulse generator 2212 to rotate the disc 2217 another 90 degrees, the polarity of the pulse from the pulse generator 2212 and the signal from the coils 2204 having both been reversed. The polarities would reverse again for the next 90 degree rotation and so forth.

Once the disc 2217 has begun to rotate, it would increase in speed until the feedback control regulated the speed at the preset amount. In the magnetic flow sensor application, rotation may be maintained with very low power consumption since bearing friction will probably be the primary energy loss factor. Low power consumption is important here for reducing battery requirements and electrical noise. It is also noted that once a stepper motor begins to rotate at a moderate speed, its speed may be controlled directly with the frequency of the pulses and exhibit operational characteristics like that of a synchronous motor.

While maintaining the same principle of operation, many practical implementations of the technology are possible. For example, only two electromagnets may be used which are angularly positioned in between the pickup electrodes. This configuration offers the advantage of reduced noise pickup since the electrodes and their connecting wires are further away from the electromagnets. In the most general case, even a single coil electromagnet which uses low reluctance magnetic material to convey the flux through two or more pole faces to the vicinity of two or more magnetic poles on a rotor, or to directly act on two or more magnetic poles on a rotor is applicable to this method of operation and speed control.

This invention provides an alternate method for constructing a cost effective "brushless" DC motor. The conventional methods for doing so typically use Hall effect or photoelectric sensors to control pulse timing and polarity. The embodiments disclosed herein, though requiring additional control electronics, make more efficient use of materials and energy and, with a custom integrated circuit, would ultimately be the overall simpler approach. It further offers the advantage of relatively precise speed control as the motor may be operated as a synchronous motor. If the conventional approaches also incorporated speed control, the complexity levels would be comparable. Any of the means above used for rotation detection can so be used to supply the reference signal to the synchronous detector when such a detector is used for flow rate sensing.

FIG. 49 illustrates an improved synchronous detector integrated with signal amplifiers and active filters, and a means for obtaining a phase reference signal, all of which are an embodiment of the magnetic flow sensor technology described herein and particularly to the sensor configuration illustrated in FIGS. 44 and 45. The signal amplifier 2301 and active filters 2302 and 2305 correspond to similar elements and functional features in FIG. 42.

The flow response output signals from the active filter 2302 directly enter the synchronous detector along with those which have been inverted by the inverter 2303. The poles of switch 2307 are closed by the in-phase and inverted reference signals to route both flow responsive signals to the upper low pass filter 2308 and lower low pass filter 2309 so that each filter receives a full wave phase related rectified signal. The output from each filter is compared in the differential amplifier 2310, its output then being input to the active filter 2305 for smoothing and additional amplification.

The reference signals are derived photoelectrically with a pair of differentially operated photodetectors which sense the reflected radiant energy from a rotating disc 2311 with alternating more and less reflective segments that are illuminated by an LED 2312. The photodetectors 2313 are arranged with the LED 2312 between them, all in close proximity, so that the reflected radiant energy to the sensors, and therefore their current flow, changes differentially when sensing at the transition of the adjacent segments as the disc 2311 is rotated. The disc is attached to or part of the disc that the flow signal generating magnets are mounted on so that the signals are synchronized with the mechanical position of those magnets and the flow passages to produce the greatest magnitude of flow related output signal.

The pulses provided at the common connection of the photodetectors into Op amp 2314 have capacitive decoupling of the DC component and are alternating in polarity. Op amp 2314 is arranged as a flip-flop and changes state at each segment transition. The flip-flop output is a square wave which may, with the phase inverter 2315, directly provide the reference signals to the switch 2307.

If the rotational rate of the disc 2311 should vary substantially, the phase angle of the amplified electrode signals may also vary substantially with reference to the mechanical orientation of the disc. This is because of the reactive elements in the amplifier 2301, which can result in an unacceptable flow related signal magnitude error. To minimize this problem, similar frequency dependent phase shift is introduced into the reference signal Op amps 2316.

The phase angle tracking provision described above enables motors with relatively poor speed regulation to rotate the disc without the risk of serious error being introduced. Of course, motors with good speed regulation and/or stepper motors may be used with or without the phase angle tracking provision.

Means other than photodetection in the configuration illustrated may be used for rotation detection. This would include at least photoelectric, as with rotating vanes, which block radiant energy from the LED from reaching the pair of suitably arranged photodetectors; a single photodetector; a magnetic reed switch or other type of magnetic sensor such as a Hall effect device; a magnetic inductive sensor such as a coil or wire near which the moving alternating polarity magnets pass; and a capacitive pickup to name a few.

In all of the preceding signal amplifying and processing circuits the signal common or ground is normally by direct connection, at the same potential as that of the fluid being measured. If this is not the case, the electrode signal amplifier must have extended dynamic range to still respond correctly or other means must be incorporated such as the use of the circuit in FIG. 16 to provide satisfactory operation.

Figure 50:
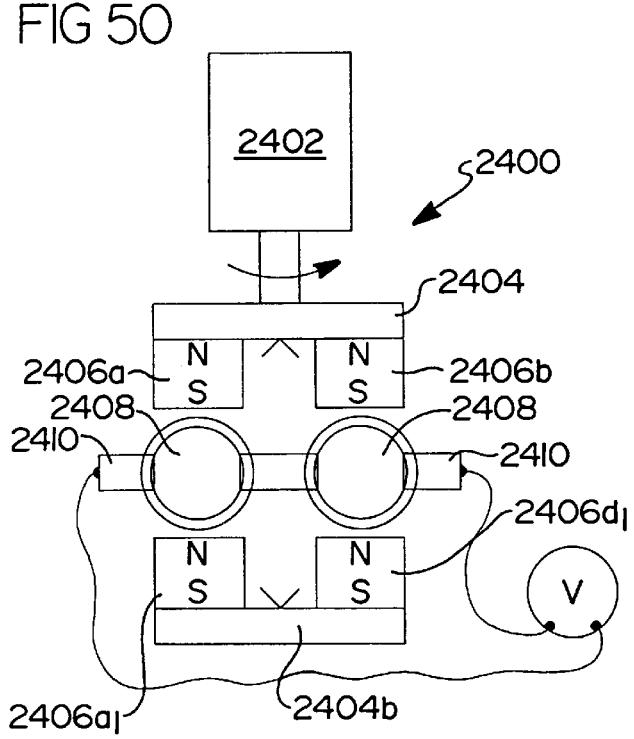
FIGS. 50–52 illustrate a magnetic pump produced in accordance with the flow sensing principles of the present invention.
Figure 51:
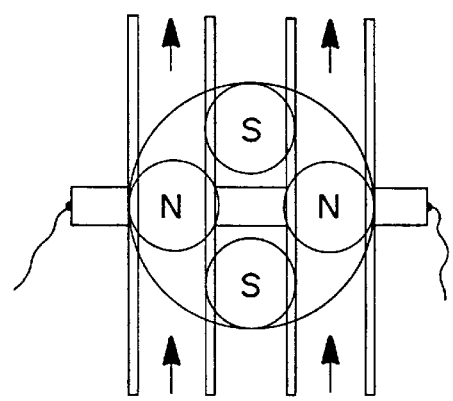
Figure 52:
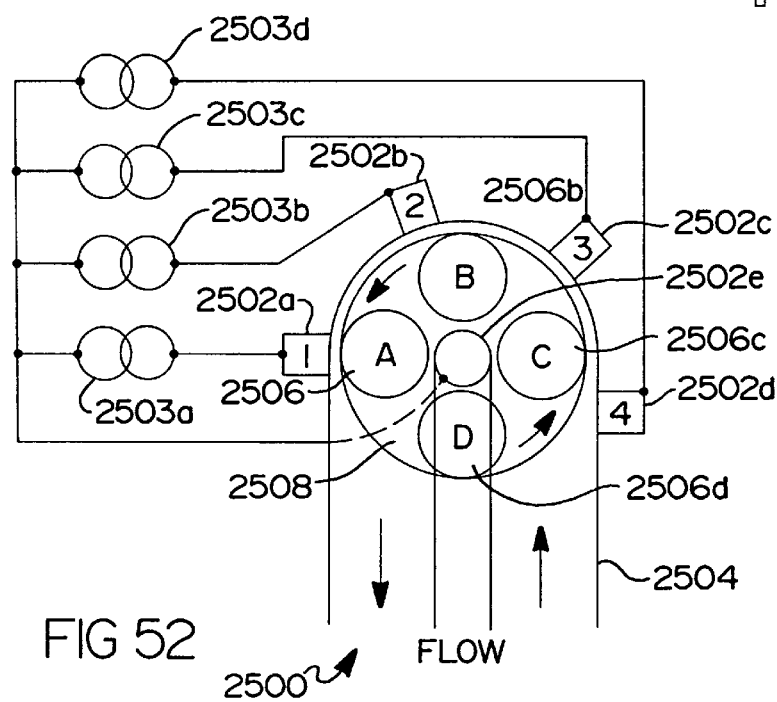

Referring now to FIGS. 50–52, a magnetic pump in accordance with the principles of the present invention will be described. Referring first to FIGS. 50 and 51, some of this technology, such as the highly efficient magnetic circuit and overall configuration is applicable to producing a magnetic pump. FIGS. 50 and 51 illustrate simplified side and top views of the principal elements of such a sensor 2400. A motor 2402 rotates a magnetic disc 2404*a* mounting four alternating polarity permanent magnets 2406*a*–2406*d* (only two of which are visible) above two electrically insulating flow passages 2408. A similar disc 2404*b* and magnet assembly 2406*a*,–2406*d*, (only magnets 2406*a*, and 2406*d*, being visible) mounted below the passages and magnetically slaved to it as shown or, alternatively, mechanically attached to it with attracting magnetic polarities. When flow is present through the flow paths 2408, an alternating voltage whose magnitude is a function of flow rate is produced at electrodes 2410.

Given the above sensor configuration, a pump can be made by passing an alternating current having the same periodic occurrence rate as that of the alternating magnetic flux through the electrodes as the flux is periodically aligned with the electrodes. Since the current and flux polarities are reversed at the same time, the pumping is in the same direction. By reversing the phase relationship between the current and the flux, the flow direction is reversed. Relatively high speed control of flow rate is possible and because of the balanced configuration and the undirectional flow through the flow passages, the pumping affect can be the same in both directions. Electromagnets may of course be used in place of the upper and lower disc permanent magnets to provide the alternating magnetic field and thereby eliminate any pump component which has mechanical movement. The pump may be also configured whereby the flow through one flow path is returned to enter the other tube from which it then exits the pump. This enables all of the pumping action to apply to a single tube.

While pumps made as described above can be useful, the flow pulsates and may therefore not be suitable for some applications. The relatively large size of the pump for the pumping capacity is another disadvantage. Both of these items are addressed in the improved pump configuration below which may also use either permanent or electromagnets for the alternating magnetic field.

Referring to FIG. 52, a pump 2500 is illustrated in simplified form. The 2500 includes a plurality of electrodes 2502*a*–2502*e* each with its own signal source 2503*a*–2503*d*, supplying alternate polarity electrical current. A U-shaped tube 2504 is provided for forming the flow passages.

The center electrode 2502e is a common connection to all of signal sources. The electrodes 2502a–2502e are mechanically located to have a smaller angular displacement than the disc magnets. Only one electrode can be aligned with a pair of the magnets 2506a–2506d at one time, wherein its signal source will then be active. The signal sources 2503a–2503d are phase shifted with respect to each other so that as discs 2508 rotate and a new electrode/magnet pair are aligned, that electrode's 2502 signal source operates. The sequential pumping action produces a relatively smooth flow.

As shown in FIG. 52, magnet 2506a and electrode 2502a are in alignment and provide the pumping action. The discs 2508 (only one being visible in FIG. 52) rotate so that 2506b and 2502b are then pumping. Then 2506c and 2502c; then 2506d and 25-02d; then 2506b and 2502a and so forth. A greater number and more optimally shaped magnets and/or optimally shaped (rectangular for example) electrode/signal sources may be used for increased pumping ability. It is also possible to energize a plurality of angularly distributed parallel connected electrodes in conjunction with the corresponding magnet pairs to further improve the pumping performance. Furthermore, the electric current can pass between opposing electrodes when the magnetic fields of the magnets are of the opposite polarity so that their pumping effects are cumulative.

Since several and even many electrodes, such as electrodes 2502 may be used in a pump, a relatively large amount of the liquid contained by it can be acted upon in a near continuous manner to produce the desired pumping action. This enables a smaller sized pump to be made and also reduces the electric current density in the liquid for the same pumping capacity.

The signal sources 2503 can be synchronized to the motor shaft position by a variety of present day methods to provide their currents when in proper alignment with the corresponding disc magnet pairs. These methods include photoelectric, magnetic and inductive. However, it is also possible to use the induced voltage at each electrode due to the alternating magnetic field to trigger and thereby synchronize a pulse generator as the signal source. This source would also change the polarity of its output current to correspond to that of its trigger pulse.

Periodic reversal of the electrode current is required to minimize the effects of electrode polarization which is detrimental to pump operation. Even with nominally conductive liquids the current flow due to the liquid's capacitance may be appreciable and at a high enough reversal rate may dominate the current flow. An electrode signal source phase adjustment may then be required for peak pumping efficiency.

Figure 53:
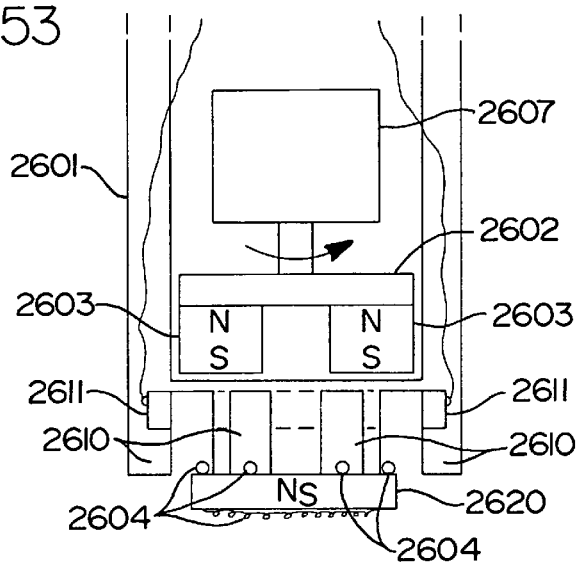
FIG. 53 illustrates another alternative preferred embodiment of the present invention which incorporates a permanent magnet positioned below the flow path for magnetically capturing magnetic debris entrained in the fluid flowing through the flow path.

Another form of the present invention provides means integral to the flow sensor or as a separately mounted nearby component for attracting and accumulating magnetic debris to prevent, or to at least substantially reduce, debris-caused sensor error or failure. A preferred embodiment 2600 of such a sensor is shown in FIG. 53. In FIG. 53, components of the sensor common to those components of embodiments of FIG. 1 are denoted with reference numerals increased by 2600 over those used with the components of the sensor of FIG. 1. FIG. 53 illustrates the sensor components whereby a motor 2607 rotates a disc 2602. On the disc 2602 are mounted magnets 2603. The disc 2602 is mounted within a housing 2601 which also contain the electrodes 2611, and the flow passages 2610. A new component, magnet 2620, is mounted below the flow passages.

Magnet 2620, in the preferred embodiment, is round, stationary, protected as necessary from the fluid medium, and concentric with the rotational axis of the four alternating polarity poles of magnets 2603. The magnet 2620 has one of its poles facing the magnets 2603. Since the magnetic attractive and repulsive forces between magnet 2620 and magnets 2603 are equal and are radially balanced with respect to the axis of rotation, they cancel each other and no additional mechanical force is required to rotate the disc 2602.

The flux from the two magnets 2603 is enhanced by the flux from magnet 2620 because their poles face each other and are of opposite polarity. This results in a larger signal magnitude at the electrodes 2611 than that produced by the other two magnets 2603, as their flux is opposed by that of magnet 2620. As a result, the electrode 2611 signals have a small DC component. This is not a problem, however, as the DC component can be easily removed. For example, in FIG. 41 the DC component is compensated to a certain extent with the input offset compensation feedback loop and finally eliminated with the DC blocking components comprising capacitor 1509 and resistor 1510 within the amplifier 1501. As a result, the magnitude of the AC component of the signals from electrode 2611, which is the basis for determining fluid flow rate, remains essentially the same as before the addition of the magnet 2620.

The magnetic fields of magnets 2603, due to their opposing polarities, are generally confined to the immediate vicinity of the flow passages 2610 of the sensor. Magnet 2620, having a single stationary magnetic polarity relative to magnets 2603 and being larger in size, if desired, can attract magnetic debris 2604 at a greater distance than the four sensing magnets 2603 and typically is able to attract all of the debris. Magnet 2620 may be mounted at the flow passages 2610 or located a distance away. Magnet 2620 may even be attached to the opposite wall of a pipe, for example, with its own fitting, so that a large accumulation could be had before the sensor's precision of measurement is significantly affected. The magnet 2620, either as an integral part of the sensor assembly as in FIG. 53 or as a separate coaxially mounted component, can be temporarily removed to allow for cleaning off of the debris 2604. If the debris were not at least periodically removed by flow stream forces, removal of the debris could be accomplished by other means such as low frequency or ultrasonic vibrations applied to the magnet 2620.

Figure 54A:
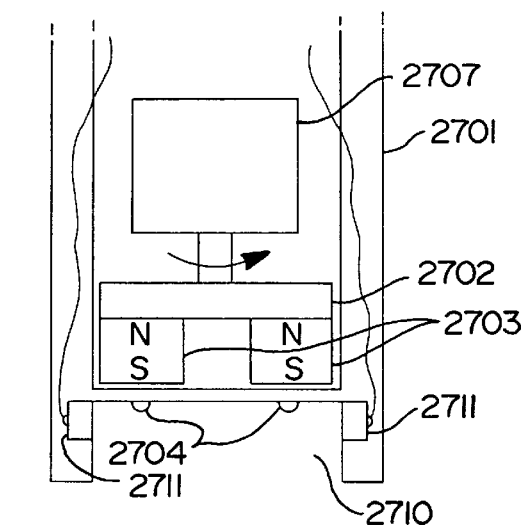
FIG. 54A illustrates a building of magnetic debris or a magnet used to same.
Figure 54B:
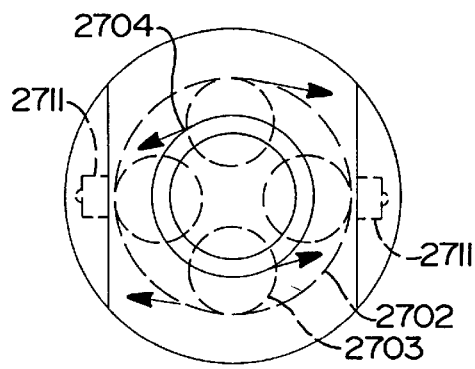
FIG. 54B illustrates a preferred flow channel management to eliminate the circular magnetic debris buildup shown in FIG. 54A.

FIGS. 54A and 54B disclose an embodiment 2700 similar to that shown in FIG. 53. Components common with those in the embodiment of FIG. 53 are denoted by reference numerals increased by 100 over those used in FIG. 53. The embodiment of FIGS. 54A and 54B shows a sensor having a modified flow passage 2710 and without magnet 2620. FIGS. 54A and 54B illustrate typical accumulation of magnetic debris 2704 on a bottom surface of the housing 2701, wherein the sensor has a rotating disc 2702 mounting four alternating polarity magnets 2703. The debris 2704 forms a pattern of a circle and rotates slowly in a direction opposite to that of the disc 2702. This pattern is the result of the magnetic particles which constitute the debris acting as small permanent magnets and tending to roll or tumble on the surface of the housing 2701 in an attempt to maintain their poles aligned in a mutually attractive way with those of the alternating and rotating fields of magnets 2703.

The circular pattern of the magnetic debris 2704 has a potentially detrimental effect on the operation of the sensor. The magnetic debris 2704, by its electrical conductivity and its proximity to the path between the electrodes 2711, could attenuate the flow related signals at the electrodes 2711, obstruct the flow passage 2710 and distort the magnetic field pattern produced by the magnets 2703. To ensure against this, the debris 2704 needs to have its pattern altered.

Figure 55:
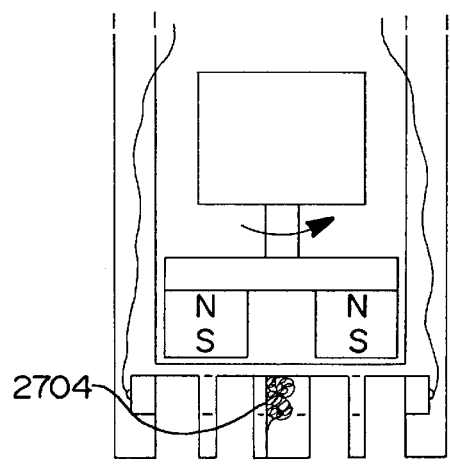
FIG. 55 illustrates another alternative preferred embodiment of the present invention including flow channels formed so as to provide compartments to prevent the circular build-up of magnetic debris therein.
Figure 56:
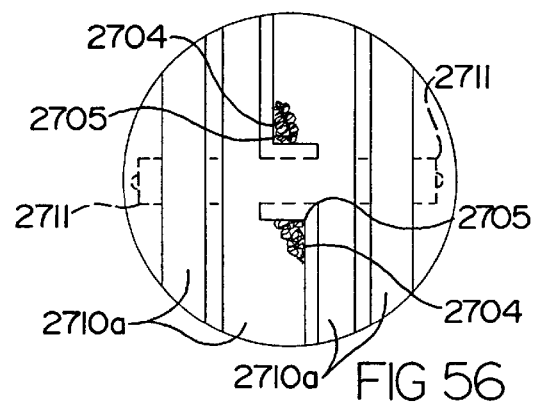
FIG. 56 is a bottom view of the embodiment of FIG. 55 in accordance with directional line 56—56 in FIG. 55.

The embodiment shown in FIG. 55 prevents the circular formation of the magnetic debris 2704. The embodiment in FIG. 55 is identical to that shown in FIGS. 54A and 54B except for the addition of flow passages 2710a, similar to those in FIG. 53, which are shaped to include compartments 2705 shown in FIG. 56 for capturing and holding the debris 2704. The circular shape and rotation of the debris 2704 as illustrated in FIG. 54B, actively moves the debris 2704 into the compartments 2705 in FIG. 56. The compartments 2705 can hold a relatively large amount of the debris 2704 and do so at locations relatively far away from the path between the electrodes 2711, thereby minimizing degradation of flow sensor operation.

The foregoing has been described with general reference to flow sensors which have one or more flow passages for bounding the liquid flow as in the flow channels 10 of FIG. 1 or to similarly configured flow sensors, with the exception of an open bottom as in FIG. 48, it being noted that passages 2207 are generally open to the flow, whereby the partitions in the flow path need not be present for the sensor to function. These flow sensors are distinctive in their mechanical configurations by having their rotational axes parallel to the direction of the magnetic flux through the liquid which is generating the flow related signal. A similar flow sensor may also be configured where its rotational axis is perpendicular to the direction of the magnetic flux as in FIG. 57. This form of sensor typically does not concentrate as such magnetic flux in the signal generating region of the flow sensor and, as much, is of lower sensitivity. However, such a flow sensor tends to be more tolerant of the flow environment and mechanically more rugged. Such a sensor is also better able to sustain higher operating pressures, particularly when using moving permanent magnets as the sensor housing, where wall thickness is minimal to promote the maximum utilization of the magnetic flux and in a cylindrical shape rather than flat as with the former configurations.

FIG. 57A illustrates in simplified cross section a preferred embodiment of a magnetic flow sensor 3000. Sensor 3000 has a motor 3707 which is attached to magnet mount 3702 upon which are located 4 alternating polarity magnets 3703. The magnets 3703 move near 4 electrodes 3711, all of which are mechanically supported by an electrically insulating housing 3701 and stem 3702. Motor 3707 rotation causes the magnets 3703 to move in a plane between the pairs of electrodes 3711 located on each side of the housing 3701. Liquid flow 3722 occurs on the outside of the housing 3701 and is identified by the dots on each side of the housing 3701. The liquid flow 3722 may be mechanically confined so as to be concentrated in the vicinity of the electrodes. A voltage is generated by each vertical pair of electrodes 3711 in proportion to the flux from magnet 3703 and the rate of liquid flow 3722. The polarity of the generated voltages for each vertical pair of electrodes 3711 is reversed so that when the lower electrodes 3711 on opposite sides of the sensor housing 3701 are connected together by wire 3722, the generated voltages from both sets of electrodes 3711 are additive. The voltages generated at the electrodes 3711 due to magnet movement, however, are canceled. Electronic signal amplifying and processing as in the magnetic flow sensors previously described and exemplified by FIGS. 41 and 49 are likewise applicable. The lower electrodes 3711 may be combined into a single electrode and centrally located on the bottom of the sensor, and further serve as liquid flow 3722 ground reference to the processing electronics. The stem 3720, if electrically conductive, or another dedicated electrode may also serve as the ground reference.

FIG. 57B illustrates a partial cross section view of the sensor of FIG. 57A. Angular motion of the magnets 3703 and liquid flow 3722 is shown, whereby for the instantaneous position depicted, signal generation at the electrodes 3711 is at a maximum.

FIGS. 44 and 45 illustrate a sensor configuration for the measurement of flow direction as well as flow rate. Similarly, the sensors of FIGS. 7 and 8, which use electromagnets in place of permanent magnets, will also provide signals responsive to flow rate with an additional set of electrodes and suitable processing electronics. Correspondingly, FIG. 57C illustrates an alternative preferred embodiment of the sensor shown in FIG. 57B. This embodiment includes a second pair of the sensor of FIG. 57A at section A—A with the electrodes 3711 spaced evenly between the first pair 3711 on opposite sides of the first pair. With this embodiment, liquid flow 3722 related signals corresponding to flow rates horizontally or vertically or to such flow components due to an intermediate angle of fluid flow 3722 can be detected and then electronically processed to provide flow rate and angle responsive output signals.

FIG. 57D illustrates a partial cross sectional view of a sensor similar to that of FIG. 57B with corresponding components noted with a prime designation. The moving permanent magnets 3703 have been replaced with a corresponding set of electromagnets 3703 and the mounting 3702 and motor 3707 have been eliminated as exemplified by FIGS. 7 and 8. The adjacent magnets 3703 similarly have opposite polarities which alternate to produce an alternating polarity signal at the electrodes 3711 with a magnitude responsive to fluid flow rate 3722. An additional set of electrodes 3711 as in FIG. 57C may be incorporated to enable the sensor to detect flow rate and direction as in FIG. 57C. As applicable to FIGS. 7 and 8, the electromagnets are typically energized with electrical pulses of sufficient duration to enable to magnetic flux to stabilize, at which time the electrode signal amplifiers, signal detectors or combination thereof are enabled to detect, sample and hold the flow responsive signals and process them to provide flow rate and angle indications as desired.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A flow sensor for measuring a rate of flow of a fluid, the sensor comprising:

at least one electrically insulated flow passage;

at least a pair of permanent magnets located outside of the flow passage and orthogonal to a direction of the fluid flow and providing magnetic flux orthogonally through the flow passage and the fluid flow;

a drive for mechanically repositioning the magnet to alternate the magnetic flux polarity to produce an alternating voltage having a magnitude proportional to the flow rate of the fluid;

at least two electrically conducting electrodes spaced apart from one another on opposite sides of the flow passage and generally orthogonally to a direction of flow of said fluid, for contacting the fluid and sensing the alternating voltage, said electrodes being located substantially outside the path of magnetic flux generated by said pair of magnets to thereby minimize the generation of voltages at said electrodes, and said electrodes further being symmetrically located with respect to said magnetic flux from said magnets to detect, due to alternation of said magnetic flux through said flow passage, equal voltages of opposite polarity which cancel one another.

2. A flow sensor for measuring a rate of flow of a fluid, the sensor comprising:

at least one electrically insulated flow passage;

at least a pair of permanent magnets located outside of the flow passage and orthogonal to a direction of said fluid flow, and providing magnetic flux orthogonally through the flow passage and the fluid flow to generate a voltage in the fluid flow having a magnitude proportional to the flow rate of the fluid flow;

at least two electrically conducting electrodes spaced apart from one another on opposite sides of the flow passage and generally orthogonally to a direction of flow of said fluid, for contacting the fluid and sensing the alternating voltage, said electrodes being located substantially outside the path of magnetic flux generated by said pair of magnets to thereby minimize the generation of voltages at said electrodes, and said electrodes further being symmetrically located with respect to said magnetic flux from said magnets to detect, due to alternation of said magnetic flux through said flow passage, equal voltages of opposite polarity which cancel one another, a drive for mechanically repositioning the magnets periodically to prevent the magnetic flux from passing through the flow passage and fluid flow so as to generate a flow related voltage; and means for periodically detecting said electrode voltage and generating an output signal indicative of said fluid flow rate, and for using said detected voltage as a reference in cancelling voltage drifts in said output signal when said electrodes are not sensing said flow related signal.

3. The flow sensor as in claim 1, further comprising means for shedding electrical loads during no flow conditions to substantially reduce overall power consumption by the flow sensor.

4. The flow sensor of claim 1, wherein said drive operates to reposition said permanent magnet during conditions of substantially zero fluid flow such that said magnet is aligned over said flow passage, such that the start of an active flow period is automatically sensed by said flow sensor.

5. The flow sensor as in claim 1, wherein a span calibration of the sensor is effected by adjustment of the distance between the permanent magnet and the flow passage.

6. The flow sensor as in claim 2, wherein a span calibration of the sensor is effected by adjustment of the distance between each of said permanent magnets.

7. The flow sensor as in claim 1, further comprising a mechanism for changing the mechanical orientation of the magnet to alternate the polarity of its flux with respect to the flow passage so that the axis of the electrodes are parallel to an axis about which said magnet is moved by said drive.

8. The flow sensor as in claim 1, further comprising an oscillating means for changing the mechanical orientation of the magnet to alternate the polarity of its flux with respect to said flow passage at the resonant frequency of the combined magnetic and mechanical components.

9. The flow sensor as in claim 2, wherein said magnets are arranged on opposite sides of said flow passage, and wherein the mutual attractive forces of said permanent magnets on opposite sides of said flow passage stabilizes the mechanical position of said magnets.

10. The flow sensor as in claim 1, wherein said drive is powered by electrical pulses for repositioning said permanent magnet to reverse the polarity of its magnetic field across the flow passage, and further comprises means for amplifying signals output by said electrodes, said signals having magnitudes proportional to flow rate, where the amplifying means is further made nonresponsive during the periods said electrical signals are generated and for a time thereafter such that the amplifying means rejects pulse related noise and signal distortion, and responds only to flow related signals.

11. The flow sensor as in claim 1, wherein a dielectric capacitance of the fluid flow within the flow passage is used as electrodes in place of designated ones of said electrodes to convey flow representative signals from the sensor.

12. The flow sensor as in claim 1, further comprising capacitors forming discrete electrodes for sensing changes in a rate of fluid flow through said flow passage.

13. The flow sensor as in claim 1, further comprising a shield including a shunting surface for at least a portion of said surrounding electrode, and wherein said shield is driven by amplifying means in phase at nearly the magnitude of the signals from said electrodes to thereby reduce the affects of shunt capacitance and leakage paths on said electrode signals.

14. The flow sensor as in claim 1, further comprising a charge coupled amplifier for amplifying a flow related signal output from said electrodes.

15. The flow sensor as in claim 1, wherein the drive for repositioning the magnet so that its flux polarity across the flow passage is reversed, comprises:

a stepper motor, where the direction of stepping and angular bias of said stepper motor required to offset the position of a rotor thereof while stationary with a consistent angular displacement is derived from said permanent magnet.

16. The flow sensor as in claim 1, further comprising a DC amplifier for amplifying flow related signals from said electrodes, said DC amplifier being direct coupled to said electrodes, and further including at least one negative feedback signal incorporating a low pass filter which provides a constant amplification of the flow related signals while reducing the effects of the related DC signal component.

17. The flow sensor as in claim 1, wherein the rate for changing the mechanical repositioning of the permanent magnet is related to the flow rate to extend the life of the flow sensor and to reduce power consumption by the flow sensor.

18. The flow sensor as in claim 1, further comprising amplifying and detecting means for detecting the flow related signals at the electrodes when the permanent magnet is positioned optimally over the flow passage to maximize the detected flow related signal and when the permanent magnet is positioned optimally over the flow passage to minimize the detected flow related signal and the result of noise and interfering signals, whereby the difference in magnitude between said signals is a measure of the fluid flow rate.

19. The flow sensor as in claim 1, wherein said permanent magnet is also used for facilitating periodic mechanical repositioning thereof over said flow passage.

20. The flow sensor as in claim 1, further comprising a plurality of pairs of mutually attracting permanent magnets which are rotated about a common axis with said flow passage disposed therebetween one pole of a secondary permanent magnet being included and made to oscillate or rotate a small amount on either side of a neutral flux polarity position between said pluralities of pairs of permanent magnets by remote means near their periphery, causing said plurality of pairs of permanent magnets to be repositioned to thereby provide said alternating magnetic flux.

21. The flow sensor as in claim 1, wherein a magnetic coupling system incorporating multiple coupling permanent magnets is used to periodically reposition said permanent magnet by providing, and being capable of providing alternating pole polarities, a speed change by the use of a dissimilar number of coupling magnets on drive and driven members of said sensor.

22. The flow sensor as in claim 1, whereby said flow passage and said electrodes form a modular component of said flow sensor and are easily removed and replaced as may be required for field servicing.

23. The flow sensor as in claim 1, whereby said flow passage comprises an electrically insulating tubular member into which said electrodes are mounted orthogonally to a longitudinal axis extending through member, and wherein a modular assembly containing the permanent magnet and supporting electronics is disposed over said member.

24. The flow sensor as in claim 1, further comprising multiple flow passages each comprising associated permanent magnets and electrodes, whereby said drive is used to reposition all of said magnets of the sensor, and output signals from all of said electrodes in all of said flow passages are summed.

25. The flow sensor as in claim 24, wherein common electrodes are used between adjacent ones of said sensing passages.

26. The flow sensor as in claim 1, whereby said permanent magnet is disposed in said flow passage.

27. The flow sensor as in claim 1, wherein a signal magnitude detecting means is used which has extended linear dynamic range because it automatically switches in and out signal amplifying and attenuating circuits in relation to the magnitude of the signal.

28. The flow sensor as in claim 1, further comprising a dual Op-amp rectifier circuit and a signal magnitude detecting means having extended linear dynamic range for operating a low leakage amplifying device in cutoff, to establish a cutoff reference voltage;
said cut off reference voltage enabling said Op-amp rectifier circuit to balance input voltage offsets and saturation voltage for both halves of the flow related signal output.

29. The flow sensor as in claim 1, wherein said flow passage is divided into multiple flow passages, there being a continuous fluid path between said electrodes for sensing the flow related signal output by said electrodes.

30. The flow sensor as in claim 15, whereby the detector reference signal is derived with respect to the mechanical orientation of the sensor and flow so that the detector output will indicate flow direction as well as magnitude.

31. The flow sensor as in claim 18, whereby the detector reference signal is derived with respect to the mechanical orientation of the flow sensor and flow therethrough so that the detector output indicates flow direction as well as the magnitude of said flow related signal.

32. The flow sensor as in claim 30, whereby a plurality of said sensors are used and mechanically oriented to sense flow in different directions such that a resultant flow rate and flow direction therefor determined.

33. The flow sensor as in claim 30, further comprising at least a third electrode, and wherein the same permanent magnet provides magnetic flux across said flow passage and through fluid flowing through said flow passage in more than one direction and produces a flow related signal at each of said electrodes.

34. The flow sensor in claim 1, wherein said drive comprises a stepper motor for mechanically repositioning said magnet, whereby said motor is operated to rotate continuously in one direction by including means to sense the angular orientation of a rotor thereof and thereby apply a corresponding polarity of electric current to the electromagnetic coils thereof.

35. The flow sensor as in claim 1, wherein said drive comprises a stepper motor for mechanically repositioning said magnet, whereby said motor is operated to rotate continuously in one direction by sensing the generated voltage in coils thereof due to the inertia of a rotor thereof after having been electrically pulsed and rotating one step, and using said sensed generated voltage to produce a subsequent stepping pulse signal to cause further rotation of said motor.

36. The flow sensor as in claim 1, whereby an electrical current is provided from an alternating current source to said electrodes and phased with operation of a magnet location detecting means so that magnetic flux generated by said magnet is in general alignment between said electrodes to produce fluid pumping action in one direction or the other.

37. The flow sensor as in claim 36, further comprising a plurality of stationary electromagnets powered by an alternating current generator synchronized to the electrode currents for generating a reversing magnetic field in alignment between said electrodes.

38. The flow sensor of claim 37, further comprising:
a plurality of electrodes disposed across and displaced along said flow passage; and
an alternating current generator for supplying an alternating current to the electrodes, and being phased to the position of the magnet so that the magnetic flux field generated is in general alignment between the electrodes to thereby produce a fluid pumping action in at least one direction.

39. The flow sensor of claim 1, further comprising:
at least one pole of a permanent magnet located in line with and upstream of the flow passage and distanced far enough away from the said alternating polarity magnet so as not to interfere with their magnetic field and yet effectively attract and retain magnetic debris in the fluid flow.

40. The flow sensor as in claim 31, said permanent magnets are replaced by electromagnets producing alternating polarity magnetic fields.

41. A flow sensor for measuring a rate of flow of a cyclically flowing fluid, the sensor comprising:
a housing;
at least a pair of permanent magnets associated with said housing and disposed outside of a flow passage of said flowing fluid, and further orthogonal to a direction of said fluid flow, for providing magnetic flux orthogonally through said flowing fluid to generate a voltage in said flowing fluid having a magnitude proportional to the flow rate of said fluid;
at least two electrically insulated electrodes associated with said housing which are spaced apart from one another and in contact with said fluid for sensing said voltage, said electrodes being disposed on opposite sides of said flow passage and generally orthogonally to said direction of flow of said flowing fluid, for contacting the fluid and sensing the voltage, said electrodes being located substantially outside the path of magnetic flux generated by said pair of magnets to thereby minimize the generation of voltages at said electrodes, and said electrodes further being symmetrically located with respect to said magnetic flux from said magnets; and means for detecting said voltage and providing an output signal indicative of said fluid flow rate and for detecting said voltage at independently determined said flow rates to be used as a reference for canceling voltage drifts in said output signal.

42. The flow sensor of claim 41, wherein said independently determined flow rate comprises a zero flow rate.

43. A flow sensor for measuring the rate of flow of a fluid, the sensor comprising:

at least one electrically insulated flow passage;

at four pairs of alternating polarity magnetic poles disposed around a central rotational axis, and located such that one of each pair of said magnets is disposed on opposite sides of said flow passage and orthogonally to a direction of flow of said fluid flow, and providing magnetic flux orthogonally into the fluid flow;

a drive for mechanically repositioning the said magnetic poles to alternate their magnetic polarity across the flow passage to produce an alternating voltage having a magnitude proportional to the flow rate of the fluid;

at least two electrically conducting electrodes spaced apart from one another on opposite sides of the flow passage and generally orthogonally to a direction of flow of said fluid, for contacting the fluid and sensing the alternating voltage, said electrodes being located substantially outside the path of magnetic flux generated by said pair of magnets to thereby minimize the generation of voltages at said electrodes, and said electrodes further being symmetrically located with respect to said magnetic flux from said magnets to detect, due to alternation of said magnetic flux through said flow passage, equal voltages of opposite polarity which cancel one another.

44. A flow sensor according to claim 43, wherein:

a magnetic pole is included which is located near the flow passage, axially centered with the central rotational axis of said alternating polarity magnetic poles, and has its pole facing the alternating polarity magnetic poles so that it can attract and retain magnetic particles in the fluid flow.

45. A flow sensor according to claim 44, wherein:

the flow passage is shaped to retain magnetic particles in the fluid flow which are attracted to and moved by the rotation of said magnetic poles, in compartments which are generally removed from the space between the electrode thereby reducing their effect on the operation of the sensor.

46. The flow sensor as in claim 31, further comprising at least a third electrode, and wherein one of said permanent magnets provides magnetic flux across said flow passage and through said fluid flowing through said flow passage in more than one direction, and produces a flow related alternating voltage at each of said electrodes from which a resultant flow rate and direction can be determined.

47. The flow sensor as in claim 31, wherein a plurality of said sensors are used and mechanically oriented to sense flow in different directions such that a resultant flow rate and flow direction can be determined.

48. A flow sensor for measuring a rate of flow of a fluid, the sensor comprising:

a housing disposed at least partially within a flow path of said fluid;

at least a pair of permanent magnets disposed internally of the sensor for providing magnetic flux orthogonally through said fluid flow;

a drive for mechanically repositioning said magnets to alternate the polarity of the magnetic flux to produce an alternating voltage in said fluid having a magnitude proportional to the flow rate of the said fluid;

at least two electrically conducting electrodes spaced apart from one another on opposite sides of the flow passage and generally orthogonally to a direction of flow of said fluid, for contacting the fluid and sensing the alternating voltage, said electrodes being located substantially outside the path of magnetic flux generated by said pair of magnets to thereby minimize the generation of voltages at said electrodes, and said electrodes further being symmetrically located with respect to said magnetic flux from said magnets to detect, due to alternation of said magnetic flux through said flow passage, equal voltages of opposite polarity which cancel one another; and a system responsive to said alternating voltage for processing said alternating voltage to produce an electrical signal representative of said rate of flow of said fluid.

49. The flow sensor as in claim 48, further comprising four said permanent magnets arranged to generate alternating magnetic flux in said fluid polarities when driven by said drive.

50. The flow sensor of claim 49, wherein said four permanent magnets are arranged with a common plane about a central axis extending orthogonally through said plane.

51. The flow sensor as in claim 50, wherein said sensor is disposed in said flow path to create a pair of independent, electrically isolated flow paths, each said flow path being alternately subjected to the same polarity magnetic flux from diametrically opposite ones of said permanent magnets, and wherein said sensor further comprises a second pair of sensors, one sensor pair being arranged in spaced apart relation adjacent one of said flow paths and the other sensor pair being arranged in spaced apart relation adjacent the other one of said flow paths, and wherein said system functions to add the voltages generated in each said flow path while cancelling the voltages generated due to the movement of said magnets.

52. The flow sensor of claim 48, wherein said system operates to generate a reference signal with respect to the orientation of said permanent magnets for assisting in determining the direction of said flow as well as the magnitude from said electrical signal.

53. The flow sensor as in claim 52 further comprising at least three of said electrodes orientated to sense fluid flow in different directions such that a resultant flow rate and flow direction is determined.

54. The flow sensor as in claim 48 further comprising at least three electrodes, and wherein said permanent magnet provides magnetic flux for used for sensing said fluid rate flow in more than one direction and produces a flow related alternating voltage at each of said electrodes from which a resultant flow rate and flow direction is determined.

55. The flow sensor of claim 40, wherein said magnet comprises a permanent magnet.

56. The flow sensor of claim 55, wherein said magnet comprises an electromagnet.

* * * * *